US00RE47753E

(19) United States
(12) Reissued Patent
Oh et al.

(10) Patent Number: US RE47,753 E
(45) Date of Reissued Patent: Dec. 3, 2019

(54) REFRIGERATOR INCLUDING MULTIPLE STORAGE COMPARTMENTS

(71) Applicant: LG Electronics Inc., Seoul (KR)

(72) Inventors: Seungjin Oh, Gyeongsangnam-do (KR); Jonghwa Lee, Gyeongsangnam-do (KR); Changbong Choi, Gyeongsangnam-do (KR); Manho Park, Gyeongsangnam-do (KR); Kiyoung Lim, Gyeongsangnam-do (KR)

(73) Assignee: LG Electronics Inc., Seoul (KR)

(21) Appl. No.: 15/963,465

(22) Filed: Apr. 26, 2018

Related U.S. Patent Documents

Reissue of:
(64) Patent No.: 9,322,591
Issued: Apr. 26, 2016
Appl. No.: 14/609,005
Filed: Jan. 29, 2015

U.S. Applications:
(63) Continuation of application No. 13/500,980, filed as application No. PCT/KR2010/006297 on Sep. 15, 2010, now abandoned.

(30) Foreign Application Priority Data

Jan. 4, 2010 (KR) ..... 10-2010-0000086

(51) Int. Cl.
*A47B 96/04* (2006.01)
*F25D 23/02* (2006.01)
(Continued)

(52) U.S. Cl.
CPC ..... *F25D 23/028* (2013.01); *E05B 65/0042* (2013.01); *E05D 7/00* (2013.01);
(Continued)

(58) Field of Classification Search
CPC ..... F25D 23/028; F25D 23/025; F25D 23/04; F25D 11/02; Y10T 292/1043; Y10T 292/2075; Y10T 292/1083
(Continued)

(56) References Cited

U.S. PATENT DOCUMENTS 1,275,511 A 8/1918 Welch
1,581,776 A 4/1926 Altschul
(Continued)

FOREIGN PATENT DOCUMENTS

AU 2010339263 9/2014
AU 2010339263 B2 9/2014
(Continued)

OTHER PUBLICATIONS

Russian Notice of Allowance dated Aug. 16, 2013 for Application No. 2012127794/13(043305) in English, 6 pages.
(Continued)

*Primary Examiner* — Beverly M Flanagan
(74) *Attorney, Agent, or Firm* — Fish & Richardson P.C.

(57) ABSTRACT

A refrigerator includes a cabinet that defines a first storage compartment; a first door that is opened or closed to allow or prevent access to an interior of the first storage compartment; a storing device coupled to the first door to define a second storage compartment, wherein, when the first door is closed, the second storage compartment is disposed in the first storage compartment; and a second door connected to the first door and configured to be opened or closed to allow or prevent access to an interior of the second storage compartment, wherein the interior of the second storage compartment is accessible when the first door is closed and the second door is opened, wherein the first door includes a plurality of first coupling parts to which the storing device is coupled, wherein the storing device includes: a frame; and a basket installed on the frame, wherein each of the frame
(Continued)

and the basket includes at least one second coupling part interacting with at least one of the plurality of first coupling parts, wherein a front surface of the second door is positioned to be generally coplanar with at least a portion of a front surface of the first door.

10 Claims, 66 Drawing Sheets

(51) Int. Cl.

| | |
|---|---|
| *F25D 23/00* | (2006.01) |
| *F25D 25/02* | (2006.01) |
| *E05D 11/00* | (2006.01) |
| *E05F 5/00* | (2017.01) |
| *F25D 23/08* | (2006.01) |
| *E05D 7/081* | (2006.01) |
| *E05D 7/00* | (2006.01) |
| *E05B 65/00* | (2006.01) |
| *E05D 11/10* | (2006.01) |
| *F25D 23/04* | (2006.01) |
| *E05D 11/06* | (2006.01) |

(52) U.S. Cl.
CPC ..... *E05D 7/081* (2013.01); *E05D 11/0081* (2013.01); *E05D 11/06* (2013.01); *E05D 11/1078* (2013.01); *E05F 5/00* (2013.01); *F25D 23/00* (2013.01); *F25D 23/02* (2013.01); *F25D 23/025* (2013.01); *F25D 23/04* (2013.01); *F25D 23/087* (2013.01); *F25D 25/027* (2013.01)

(58) Field of Classification Search
USPC ..... 16/365, 366, 317, 284; 312/405, 321.5, 312/291, 292, 293.1, 293.2, 326, 328, 312/329, 324, 204, 405.1; 49/61–63, 65, 49/142, 98, 104, 109; 292/197, 198
See application file for complete search history.

(56) References Cited

U.S. PATENT DOCUMENTS

| | | | |
|---|---|---|---|
| 1,915,249 | A | 6/1933 | Gotfred |
| 1,927,398 | A | 9/1933 | Glasser |
| 2,046,909 | A | 7/1936 | Terry |
| 2,051,132 | A | 8/1936 | Dart |
| 2,095,811 | A | 10/1937 | Goulooze |
| 2,112,771 | A | 3/1938 | Goulooze |
| 2,129,923 | A | 9/1938 | Mortimer |
| 2,130,617 | A | 9/1938 | Dockham |
| 2,131,680 | A | 9/1938 | Zahodiakin |
| 2,135,878 | A | 11/1938 | Sekyra |
| 2,136,558 | A | 11/1938 | Charles |
| 2,150,064 | A | 3/1939 | Robert |
| 2,213,274 | A | 9/1940 | Flamm |
| 2,276,937 | A | 3/1942 | Arturo |
| 2,281,430 | A | 4/1942 | Grant |
| 2,284,293 | A | 5/1942 | Mills |
| 2,653,851 | A | 9/1953 | Davidson |
| 2,692,813 | A | 10/1954 | Toronto |
| 2,942,438 | A | 6/1960 | Schmeling |
| 3,086,830 | A | 4/1963 | Peter |
| 3,140,134 | A | 7/1964 | Nairn |
| 3,218,111 | A | 11/1965 | Steiner |
| 3,389,424 | A | 6/1968 | Fellwock |
| 3,510,986 | A | 5/1970 | Berkowitz |
| 3,518,716 | A | 7/1970 | Larson |
| 3,628,845 | A | 12/1971 | Grimm |
| 3,643,464 | A | 2/1972 | Hilliker |
| 3,822,925 | A | 7/1974 | Osroff |
| 3,836,221 | A | 9/1974 | Whistler |
| 4,087,140 | A | 5/1978 | Linstromberg |
| 4,302,907 | A | 12/1981 | Canals |
| 4,368,622 | A | 1/1983 | Brooks |
| 4,514,021 | A | 4/1985 | Sundermeier |
| 4,572,427 | A | 2/1986 | Selfridge |
| 4,801,182 | A | 1/1989 | Metcalfe |
| 5,111,618 | A | 5/1992 | Kaspar |
| 5,209,082 | A | 5/1993 | Ha |
| RE35,120 | E | 12/1995 | Heaney |
| 5,579,606 | A | 12/1996 | Kim |
| 5,584,902 | A | 12/1996 | Hartig |
| 5,785,363 | A * | 7/1998 | Stopfer ..... E05B 65/0014 292/165 |
| 5,966,963 | A | 10/1999 | Kovalaske ..... F25D 23/02 312/405 |
| 6,055,823 | A | 5/2000 | Baker ..... F25D 17/065 62/265 |
| 6,070,300 | A | 6/2000 | Shin |
| 6,085,542 | A | 7/2000 | Johnson |
| 6,155,616 | A | 12/2000 | Akright |
| 6,193,340 | B1 | 2/2001 | Schenker et al. |
| 6,268,594 | B1 | 7/2001 | Leutner |
| 6,371,581 | B1 | 4/2002 | Ring |
| 6,375,291 | B1 | 4/2002 | Nam |
| 6,722,142 | B1 | 4/2004 | Pagel |
| 6,782,710 | B2 | 8/2004 | Eveland |
| 7,008,032 | B2 | 3/2006 | Chekal |
| D522,541 | S | 6/2006 | Kim |
| 7,104,621 | B2 | 9/2006 | Choi |
| 7,243,394 | B2 | 7/2007 | Kao |
| 7,257,958 | B2 | 8/2007 | Bush |
| 7,360,374 | B2 | 4/2008 | LaRose |
| 7,404,298 | B2 * | 7/2008 | Kim ..... F25D 23/12 248/27.1 |
| 7,472,974 | B2 | 1/2009 | Czach |
| 8,322,805 | B2 | 12/2012 | Kwon |
| 8,388,078 | B2 | 3/2013 | Kwon |
| 8,752,918 | B2 | 6/2014 | Kang |
| 2004/0137235 | A1 | 7/2004 | Paul |
| 2005/0006997 | A1 | 1/2005 | Yoshioka |
| 2005/0144970 | A1 * | 7/2005 | Cho ..... E05C 19/028 62/441 |
| 2005/0188506 | A1 | 9/2005 | Lee |
| 2005/0258724 | A1 | 11/2005 | Hwa |
| 2006/0005484 | A1 | 1/2006 | Riblier |
| 2006/0086130 | A1 | 4/2006 | Anselmino |
| 2006/0150661 | A1 | 7/2006 | Kim |
| 2006/0226751 | A1 | 10/2006 | Park |
| 2006/0250063 | A1 | 11/2006 | Czach et al. |
| 2006/0265979 | A1 | 11/2006 | Cording |
| 2006/0279188 | A1 | 12/2006 | Alitalo |
| 2007/0018548 | A1 | 1/2007 | Ertz |
| 2007/0256715 | A1 | 11/2007 | Oppel |
| 2008/0006042 | A1 | 1/2008 | Lee |
| 2008/0168794 | A1 | 7/2008 | Cho |
| 2008/0265729 | A1 | 10/2008 | Netzer |
| 2009/0075069 | A1 | 3/2009 | Myli |
| 2009/0261701 | A1 | 10/2009 | Yun |
| 2009/0272136 | A1 | 11/2009 | Knoell |
| 2010/0033067 | A1 | 2/2010 | Kim |
| 2010/0107679 | A1 | 5/2010 | Park |
| 2010/0308705 | A1 | 12/2010 | Kwon |
| 2012/0032572 | A1 | 2/2012 | Lee |
| 2013/0147337 | A1 | 6/2013 | Lim |
| 2014/0139089 | A1 | 5/2014 | Oh |
| 2014/0139090 | A1 | 5/2014 | Oh |
| 2014/0139091 | A1 | 5/2014 | Oh |
| 2014/0139092 | A1 | 5/2014 | Oh |
| 2014/0139093 | A1 | 5/2014 | Oh |
| 2014/0139094 | A1 | 5/2014 | Oh |

FOREIGN PATENT DOCUMENTS

| | | |
|---|---|---|
| CN | 1382950 | 12/2002 |
| CN | 1502960 | 6/2004 |
| CN | 1576757 | 2/2005 |
| CN | 1576757 A | 2/2005 |
| CN | 1677035 | 10/2005 |
| CN | 1847763 | 10/2006 |

(56) References Cited

FOREIGN PATENT DOCUMENTS

| | | | |
|---|---|---|---|
| CN | 101023306 | | 8/2007 |
| CN | 101023306 | A | 8/2007 |
| CN | 101071018 | | 11/2007 |
| CN | 101071018 | A | 11/2007 |
| CN | 1627016 | A | 6/2008 |
| CN | 101226025 | | 7/2008 |
| CN | 101226025 | A | 7/2008 |
| CN | 101261062 | | 9/2008 |
| CN | 101261062 | A | 9/2008 |
| CN | 101566414 | | 10/2009 |
| DE | 102007052607 | | 7/2008 |
| DE | 102007052607 | A1 | 7/2008 |
| DE | 102007021555 | | 11/2008 |
| DE | 102007021555 | A1 | 11/2008 |
| EP | 0 539 558 | A1 | 12/1992 |
| EP | 1 424 529 | A3 | 6/2005 |
| EP | 1617160 | | 1/2006 |
| EP | 1 653 178 | A2 | 5/2006 |
| EP | 1 724 539 | | 11/2006 |
| EP | 1 724 539 | A2 | 11/2006 |
| EP | 1 726 897 | | 11/2006 |
| EP | 1 726 897 | A2 | 11/2006 |
| EP | 1 617 160 | B1 | 7/2011 |
| FR | 2390887 | | 12/1978 |
| FR | 2390887 | A7 | 12/1978 |
| JP | 56-164495 | | 12/1981 |
| JP | 56-164495 | U | 12/1981 |
| JP | 63-142582 | U | 9/1988 |
| JP | 63-142682 | | 9/1988 |
| JP | 06-066473 | | 3/1994 |
| JP | 06-066473 | A | 3/1994 |
| JP | 10-009757 | | 1/1998 |
| JP | 10-009757 | A | 1/1998 |
| JP | 2000-065459 | | 3/2000 |
| JP | 2000-065459 | A | 3/2000 |
| JP | 2001-108357 | | 4/2001 |
| JP | 2001-108357 | A | 4/2001 |
| JP | 2002-323287 | | 11/2002 |
| JP | 2002-323287 | A | 11/2002 |
| JP | 2006-038437 | | 2/2006 |
| JP | 2006-038437 | A | 2/2006 |
| JP | 2009-103395 | | 5/2009 |
| JP | 2009-103395 | A | 5/2009 |
| KR | 1990-0008203 | | 9/1990 |
| KR | 1990-0008203 | Y1 | 9/1990 |
| KR | 1996-0011364 | | 4/1996 |
| KR | 1996-0011364 | A | 4/1996 |
| KR | 1999-042339 | | 6/1999 |
| KR | 1999-042339 | A | 6/1999 |
| KR | 1999-062159 | | 7/1999 |
| KR | 1999-062159 | A | 7/1999 |
| KR | 1999-037440 | | 10/1999 |
| KR | 1999-037440 | A | 10/1999 |
| KR | 1999-0039593 | | 11/1999 |
| KR | 1999-0039593 | A | 11/1999 |
| KR | 20-0164322 | | 2/2000 |
| KR | 20-0164322 | Y1 | 2/2000 |
| KR | 20-0168373 | | 2/2000 |
| KR | 20-0168373 | Y1 | 2/2000 |
| KR | 10-2002-0080938 | | 10/2002 |
| KR | 10-2002-0080938 | A | 10/2002 |
| KR | 2002-0083115 | | 11/2002 |
| KR | 2002-0083115 | A | 11/2002 |
| KR | 10-0376167 | | 3/2003 |
| KR | 10-0376167 | B1 | 3/2003 |
| KR | 20-0314145 | | 5/2003 |
| KR | 20-0314145 | Y1 | 5/2003 |
| KR | 2003-0083813 | | 11/2003 |
| KR | 2003-0083813 | A | 11/2003 |
| KR | 10-2005-0103722 | | 11/2005 |
| KR | 10-2005-0103722 | A | 11/2005 |
| KR | 2005-0111094 | | 11/2005 |
| KR | 2005-0111094 | A | 11/2005 |
| KR | 10-0596533 | | 7/2006 |
| KR | 10-0596533 | B1 | 7/2006 |
| KR | 10-0660708 | | 12/2006 |
| KR | 10-0660708 | B1 | 12/2006 |
| KR | 10-0733309 | | 6/2007 |
| KR | 10-0733309 | B1 | 6/2007 |
| KR | 2008-0047148 | | 5/2008 |
| KR | 2008-047148 | A | 5/2008 |
| KR | 10-0887575 | | 3/2009 |
| KR | 10-0887575 | B1 | 3/2009 |
| KR | 10-2009-0077564 | | 7/2009 |
| KR | 10-2009-0077564 | A | 7/2009 |
| KR | 2009-0077564 | | 7/2009 |
| KR | 2009-0077564 | A | 7/2009 |
| KR | 10-2009-0085181 | | 8/2009 |
| KR | 10-2009-0085181 | A | 8/2009 |
| KR | 10-1275987 | | 6/2013 |
| KR | 10-1275987 | B1 | 6/2013 |
| KR | 10-1346866 | | 1/2014 |
| KR | 10-1346866 | B1 | 1/2014 |
| KR | 10-1347002 | | 1/2014 |
| KR | 10-1347002 | B1 | 1/2014 |
| RU | 2350859 | | 3/2009 |
| RU | 2350859 | C1 | 3/2009 |
| RU | 2370713 | | 10/2009 |
| RU | 2370713 | C2 | 10/2009 |
| RU | 2503898 | | 1/2014 |
| RU | 2503898 | C1 | 1/2014 |
| WO | WO 2004/029528 | | 4/2004 |
| WO | WO2004029528 | A1 | 4/2004 |
| WO | WO 2004/059228 | | 7/2004 |
| WO | WO 2004/059228 | A1 | 7/2004 |
| WO | WO 2005/024318 | | 3/2005 |
| WO | WO 2005/024318 | A1 | 3/2005 |
| WO | WO 2006/011116 | | 2/2006 |
| WO | WO 2006/011116 | A1 | 2/2006 |
| WO | WO 2010/140836 | | 2/2011 |
| WO | WO 2010/140836 | A3 | 2/2011 |
| WO | WO 2011/081279 | | 7/2011 |

OTHER PUBLICATIONS

U.S. Office Actions dated Jul. 1, 2013 for U.S. Appl. No. 13/390,946, 24 pages.

Non-final Office Action dated Sep. 29, 2014 for U.S. Appl. No. 13/500,980, 60 pages.

Non-Final Office Action dated Oct. 2, 2014 for U.S. Appl. No. 14/165,847, 24 pages.

Non-Final Office Action dated Oct. 29, 2014 for U.S. Appl. No. 13/500,980, 24 pages.

Search Report dated Jun. 3, 2015 from related Chinese Patent Application No. 201310525098.8, 4 pages.

PCT International Search Report dated Apr. 15, 2011 for Application No. PCT/KR2010/006297, 3 pages.

Russian Notice of Allowance dated Aug. 16, 2013 for Application No. 2012127794/13(043305) in English, 5 pages.

U.S. Office Actions dated Mar. 29, 2013 for U.S. Appl. No. 13/391,632, 10 pages.

Chinese Office Action dated Feb. 17, 2014 for Application No. 2010800606134, with English Translation, 11 Pages.

Australian Office Action dated Jan. 2, 2014 for Application No. 2010339263, 3 pages.

U.S. Office Action dated Jun. 5, 2014 for U.S. Appl. No. 14/165,696, 31 pages.

European Search Report dated May 16, 2014 for EP Application No. 14 15 5607, 5 pages.

Supplementary European Search Report dated May 16, 2014 for EP Application No. 10 84 1112, 6 pages.

European Search Report dated Jun. 26, 2014 for EP Application No. 14 15 6045, 5 pages.

European Search Report dated Jul. 7, 2014 for EP Application No. 14 16 2101, 6 pages.

Non-final Office Action dated Oct. 2, 2014 for U.S. Appl. No. 14/165,706, 48 pages.

Non-final Office Action dated Oct. 1, 2014 for U.S. Appl. No. 14/165,798, 37 pages.

(56) References Cited

OTHER PUBLICATIONS

Non-final Office Action dated Oct. 1, 2014 for U.S. Appl. No. 14/165,708, 38 pages.
Non-final Office Action dated Oct. 1, 2014 for U.S. Appl. No. 14/165,696, 32 pages.
Non-final Office Action dated Oct. 1, 2014 for U.S. Appl. No. 14/165,834, 36 pages.
Non-final Office Action dated Oct. 2, 2014 for U.S. Appl. No. 14/165,872, 49 pages.
Non-final Office Action dated Oct. 2, 2014 for U.S. Appl. No. 14/165,847, 41 pages.
U.S. Office Action dated Oct. 2, 2014 for U.S. Appl. No. 14/165,847, 24 pages.

* cited by examiner

REFRIGERATOR INCLUDING MULTIPLE STORAGE COMPARTMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a *reissue application of U.S. application Ser. No. 14/609,005, filed on Jan. 29, 2015, now U.S. Pat. No. 9,322,591, issued Apr. 26, 2016, which is a* divisional of U.S. application Ser. No. 13/500,980, filed Oct. 17, 2012, now [pending] *abandoned*, which is a U.S. National Phase of International Application PCT/KR2010/006297, filed on Sep. 15, 2010, which claims the benefit of a foreign priority application filed in Korea as Serial No. 10-2010-0000086, on Jan. 4, 2010, the entire contents of the prior applications are hereby incorporated by reference in their entireties.

TECHNICAL FIELD

The present disclosure relates to a refrigerator.

BACKGROUND ART

Refrigerators are apparatuses configured to store food under low temperature conditions.

Such a refrigerator includes a main body provided with a storage compartment, and a door movably connected to the main body to open and close the storage compartment.

For example, the storage compartment may be divided into a refrigerator compartment and a freezer compartment, and the door includes a refrigerator compartment door opening and closing the refrigerator compartment, and a freezer compartment door opening and closing the freezer compartment.

Thus, a user should open the refrigerator compartment door and the freezer compartment door to take out food stored in the refrigerator compartment door and the freezer compartment door.

DISCLOSURE OF INVENTION

Technical Problem

Embodiments provide a refrigerator that includes a large storage compartment in a first door to improve a storing efficiency and a user's convenience, and the first door and a second door configured to close the storage compartment provide the sense of unity, thus improving the appearance.

Solution to Problem

In one embodiment, a refrigerator includes: a cabinet that defines a first storage compartment; a first door that is opened or closed to allow or prevent access to an interior of the first storage compartment; a storing device coupled to the first door to define a second storage compartment, wherein, when the first door is closed, the second storage compartment is disposed in the first storage compartment;

and a second door connected to the first door and configured to be opened or closed to allow or prevent access to an interior of the second storage compartment, wherein the interior of the second storage compartment is accessible when the first door is closed and the second door is opened, wherein the first door includes a plurality of first coupling parts to which the storing device is coupled, wherein the storing device includes: a frame; and a basket installed on the frame, wherein each of the frame and the basket includes at least one second coupling part interacting with at least one of the plurality of first coupling parts, wherein a front surface of the second door is positioned to be generally coplanar with at least a portion of a front surface of the first door.

In another embodiment, a refrigerator includes: a cabinet that defines a first storage compartment; a first door that is opened or closed to allow or prevent access to an interior of the first storage compartment; a storing device coupled to a rear surface of the first door to define a second storage compartment, wherein, when the first door is closed, the second storage compartment is disposed in the first storage compartment; and a second door connected to the first door and configured to be opened or closed to allow or prevent access to an interior of the second storage compartment, wherein the storing device includes: a frame that defines the second storage compartment; a basket installation part disposed at the second storage compartment; and a basket slidably installed on the basket installation part, wherein the basket installation part and the basket are accessible when the first door is closed and at least the second door is opened, wherein a front surface of the second door is positioned to be generally coplanar with at least a portion of a front surface of the first door.

In another embodiment, a refrigerator includes: a cabinet that defines a first storage compartment; a first door that is opened or closed to allow or prevent access to an interior of the first storage compartment; a storing device coupled to the first door to define a second storage compartment, wherein the second storage compartment is disposed within the first storage compartment when the first door is closed; and a second door connected to the first door and configured to be opened or closed to allow or prevent access to an interior of the second storage compartment when the storing device is disposed within the first storage compartment, wherein the storing device includes: a frame that defines the second storage compartment; a basket installation part disposed at the second storage compartment, and defining a receiving part; a first basket received in the receiving part of the basket installation part such that the first basket is taken out; and a second basket removably placed on an upper surface of the basket installation part, wherein a front surface of the second door is positioned to be generally coplanar with at least a portion of a front surface of the first door.

In another embodiment, a refrigerator includes: a cabinet that defines a first storage compartment; a first door that is opened or closed to allow or prevent access to an interior of the first storage compartment; a storing device coupled to the first door to define a second storage compartment that is disposed within the first storage compartment when the first door closes; and a second door connected to the first door to open and close the second storage compartment, wherein the storing device includes: a frame that defines the second storage compartment; a first basket fixed to the frame; a basket installation part disposed at the second storage compartment; and a second basket removably installed on the basket installation part, wherein the second door is configured to be opened when the first door is closed to provide access to the storing device, wherein a front surface of the second door is positioned to be generally coplanar with at least a portion of a front surface of the first door.

In another embodiment, a refrigerator includes: a cabinet that defines a first storage compartment; a first door that is opened or closed to allow or prevent access to an interior of the first storage compartment; a storing device coupled to the first door to define a second storage compartment, wherein, when the first door is closed, the second storage compartment is disposed in the first storage compartment; a second door connected to the first door and configured to be opened or closed to allow or prevent access to an interior of the second storage compartment, wherein the interior of the second storage compartment is accessible when the first door is closed and the second door is opened; a first hinge that rotatably connects the first door to the cabinet; and a second hinge that rotatably connects the second door to the first door, wherein a hinge shaft of the second hinge is disposed nearer to a side surface of the first door than a hinge shaft of the first hinge is.

In another embodiment, a refrigerator includes: a cabinet that defines a first storage compartment; a first door that is opened or closed to allow or prevent access to an interior of the first storage compartment; a storing device coupled to the first door to define a second storage compartment, wherein, when the first door is closed, the second storage compartment is disposed in the first storage compartment; a second door connected to the first door and configured to be opened or closed to allow or prevent access to an interior of the second storage compartment, wherein the interior of the second storage compartment is accessible when the first door is closed and the second door is opened; a locking unit provided to a rear surface of the first door and a rear surface of the second door to selectively confine the first door to the second door by a pressing operation; and a limiting member provided to one of a front surface of the first door and the rear surface of the second door to prevent a rotation of the second door from inertia.

In another embodiment, a refrigerator includes: a cabinet that defines a first storage compartment; a first door that is opened or closed to allow or prevent access to an interior of the first storage compartment; a storing device coupled to the first door to define a second storage compartment, wherein, when the first door is closed, the second storage compartment is disposed in the first storage compartment; a second door connected to the first door and configured to be opened or closed to allow or prevent access to an interior of the second storage compartment, wherein the interior of the second storage compartment is accessible when the first door is closed and the second door is opened; a locking unit provided to the first door and the second door to selectively confine the second door to the first door; and a release member provided to the first door and the second door and pressed to release the locking unit.

In another embodiment, a refrigerator includes: a cabinet that defines a first storage compartment; a first door that is opened or closed to allow or prevent access to an interior of the first storage compartment; a storing device coupled to the first door to define a second storage compartment, wherein, when the first door is closed, the second storage compartment is disposed in the first storage compartment; a second door connected to the first door and configured to be opened or closed to allow or prevent access to an interior of the second storage compartment, wherein the interior of the second storage compartment is accessible when the first door is closed and the second door is opened; a shelf rotatably connected to the first door; and a connection assembly that connects the shelf to the second door to rotate the shelf forward when the second door is opened.

In another embodiment, a refrigerator includes: a cabinet that defines a first storage compartment; a first door that is opened or closed to allow or prevent access to an interior of the first storage compartment; a storing device coupled to the first door to define a second storage compartment, wherein, when the first door is closed, the second storage compartment is disposed in the first storage compartment; and a second door connected to the first door and configured to be opened or closed to allow or prevent access to an interior of the second storage compartment, wherein the interior of the second storage compartment is accessible when the first door is closed and the second door is opened, wherein the second door includes: a door case forming a rear exterior thereof; a pair of cap decors respectively coupled to an upper end and a lower end of the door case; a pair of side decors respectively coupled to a left end and a right end of the door case; a door plate placed on upper surfaces of the cap decors and the side decors to form a frontal exterior thereof; and an insulation layer between the door plate and the door case, wherein the door plate is formed of tempered glass.

In another embodiment, a refrigerator includes: a cabinet that defines a first storage compartment; a first door that is opened or closed to allow or prevent access to an interior of the first storage compartment; a storing device coupled to the first door to define a second storage compartment, wherein, when the first door is closed, the second storage compartment is disposed in the first storage compartment; and a second door connected to the first door and configured to be opened or closed to allow or prevent access to an interior of the second storage compartment, wherein the interior of the second storage compartment is accessible when the first door is closed and the second door is opened, wherein the second door includes: a door case forming a rear exterior thereof; a pair of cap decors respectively coupled to an upper end and a lower end of the door case; a pair of side decors respectively coupled to a left end and a right end of the door case; a door plate placed on upper surfaces of the cap decors and the side decors to form a frontal exterior thereof; and an insulation layer between the door plate and the door case, wherein a portion of the door case between a lower end and a middle of the second door is provided with an ingate through which a foaming agent for forming the insulation layer is injected.

In another embodiment, a method for manufacturing refrigerator includes: a cabinet that defines a first storage compartment; a first door that is opened or closed to allow or prevent access to an interior of the first storage compartment; a storing device coupled to the first door to define a second storage compartment, wherein, when the first door is closed, the second storage compartment is disposed in the first storage compartment; and a second door connected to the first door and configured to be opened or closed to allow or prevent access to an interior of the second storage compartment, wherein the interior of the second storage compartment is accessible when the first door is closed and the second door is opened, the second door including: a door case forming a rear exterior thereof; a pair of cap decors respectively coupled to upper and lower ends of the door case; a pair of side decors respectively coupled to left and right side ends of the door case; a door plate mounted on upper surfaces of the cap decors and the side decors to form a frontal exterior thereof; and an insulation layer formed in a space between the door plate and the door case, wherein an ingate into which a foaming agent is injected for forming the insulation layer is formed in the door case at a predetermined position between a lower end and a center of the second door, the method including: injecting the foaming agent to form the insulation layer into the ingate in a state where the second door is inclined such that the lower end of the second door is higher than the upper end of the second door.

In another embodiment, a refrigerator includes: a cabinet that defines a first storage compartment; a first door that is opened or closed to allow or prevent access to an interior of the first storage compartment; a storing device coupled to the first door to define a second storage compartment, wherein, when the first door is closed, the second storage compartment is disposed in the first storage compartment; a second door connected to the first door and configured to be opened or closed to allow or prevent access to an interior of the second storage compartment, wherein the interior of the second storage compartment is accessible when the first door is closed and the second door is opened; the second door including: a door case forming a rear exterior thereof; a gasket extending along an edge of the door case; a pair of metal cap decors respectively coupled to upper and lower ends of the door case; a pair of side decors respectively coupled to left and right ends of the door case; a door plate mounted on upper surfaces of the cap decors and the side decors to form a frontal exterior thereof; an insulation layer formed in a space between the door plate and the door case; and a ground member connecting the side decors.

In another embodiment, a refrigerator includes: a cabinet that defines a first storage compartment; a first door that is opened or closed to allow or prevent access to an interior of the first storage compartment, the first door having an opening; a storing device coupled to the first door to define a second storage compartment, wherein, when the first door is closed, the second storage compartment is disposed in the first storage compartment, and the opening is configured to communicate with the second storage compartment; a second door connected to the first door and configured to be opened or closed to allow or prevent access to an interior of the second storage compartment, wherein the interior of the second storage compartment is accessible through the opening when the first door is closed and the second door is opened; an inclined surface disposed on an inner border of the opening; and a gasket attached to a rear surface of the second door, wherein the gasket contacts the inclined surface when the second door is closed.

In another embodiment, a refrigerator includes: a cabinet that defines a first storage compartment; a first door that is opened or closed to allow or prevent access to an interior of the first storage compartment; a storing device coupled to the first door to define a second storage compartment, wherein, when the first door is closed, the second storage compartment is disposed in the first storage compartment; a second door connected to the first door and configured to be opened or closed to allow or prevent access to an interior of the second storage compartment, wherein the interior of the second storage compartment is accessible when the first door is closed and the second door is opened; a gasket provided to one of the first door and the second door; a metal attachment member provided to one of the first door and the second door; and a magnetic member provided to the door contacting the door provided with the attachment member and selectively contacting the attachment member, wherein the first door is provided with an opening that allow access to the storing device while the first door is closed, and the gasket, the attachment member, and the magnetic member are disposed in a region adjacent to an edge of the opening.

The details of one or more embodiments are set forth in the accompanying drawings and the description below. Other features will be apparent from the description and drawings, and from the claims.

Advantageous Effects of Invention

According to the embodiments, the baskets arrayed along the up and down direction can be used to effectively store food in the second storage compartment.

In addition, since the baskets can be removed from the accommodation device, and be taken out through the opening of the first door, food can be easily put in or taken out to or from the baskets.

In addition, since the second door has the same left and right length as the left and right length of the first door, the appearance of the refrigerator compartment door is improved.

In addition, one group of the second coupling parts is disposed on the frame, and the other group is disposed on the basket. Thus, the load of the frame applied to the basket can be reduced. In addition, the load of the basket applied to the frame can be reduced. Thus, the damages of the boundaries respectively between the second coupling parts and the first basket or the frame can be prevented.

In addition, since the space in which a portion of the second coupling part is inserted is disposed between the first projection part and the second projection part, the second coupling part contacts the first projection part to prevent the rotation of the accommodation device and maintain stable coupling of the accommodation device to the refrigerator compartment door.

In addition, since the storage compartment of the first door is large, a storing efficiency can be improved.

In addition, since the second door and the first door rotate in the same direction, the large storage compartment can be easily opened and closed, thus improving a user's convenience.

In addition, since the first door and the second door share the upper, left, and right surfaces, and the lower end of the second door is provided with the door handle, the first door and the second door can be perceived as a single body from the front side. Thus, the exterior of the refrigerator can be improved.

MODE FOR THE INVENTION

Reference will now be made in detail to the embodiments of the present disclosure, examples of which are illustrated in the accompanying drawings.

Figure 1:
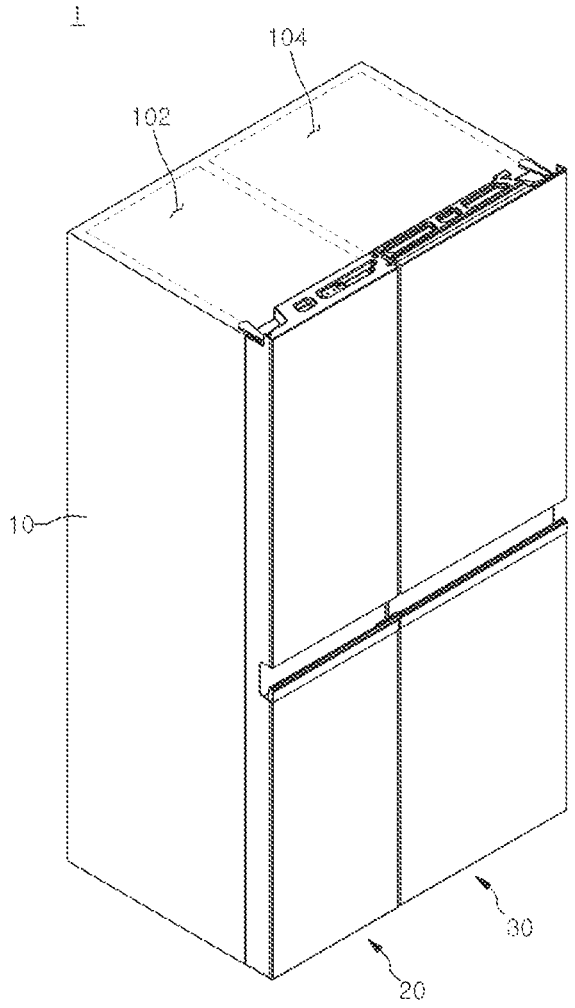
FIG. 1 is a perspective view illustrating a refrigerator according to an embodiment.
Figure 2:
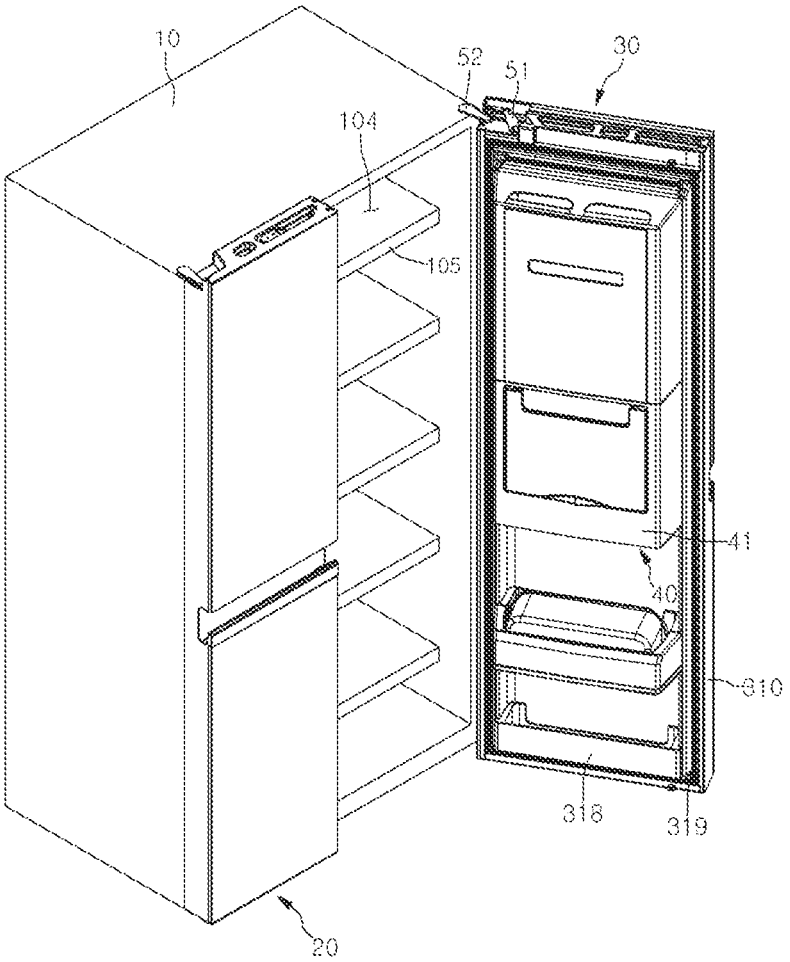
FIG. 2 is a perspective view illustrating a refrigerator with a first storage compartment being opened, according to an embodiment.
Figure 3:
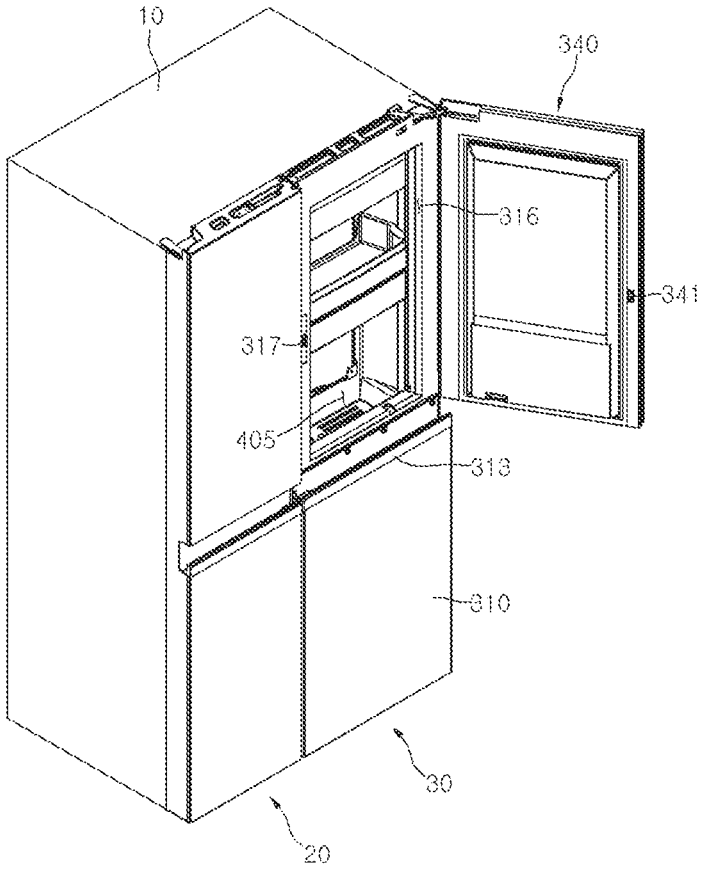
FIG. 3 is a perspective view illustrating a refrigerator with a second storage compartment being opened, according to an embodiment.

FIG. 1 is a perspective view illustrating a refrigerator according to an embodiment. FIG. 2 is a perspective view illustrating a refrigerator with a first storage compartment being opened, according to an embodiment. FIG. 3 is a perspective view illustrating a refrigerator with a second storage compartment being opened, according to an embodiment.

Referring to FIGS. 1 to 3, a refrigerator 1 according to an embodiment includes a cabinet 10 providing a storage compartment, and doors 20 and 30 opening and closing to provide or prevent access to an interior of the storage compartment.

The storage compartment includes a freezer compartment 102 and a refrigerator compartment 104. The freezer compartment 102 and the refrigerator compartment 104 may be arrayed along the left and right direction, and be separated by a separation part.

The doors 20 and 30 include a freezer compartment door (which is also denoted by 20), and a refrigerator compartment door (which is also denoted by 30), respectively. The freezer compartment door 20 and the refrigerator compartment door 30 open and close to provide or prevent access to an interior of the freezer compartment 102, and open and close to provide or prevent access to an interior of the refrigerator compartment 104, respectively.

A storing device 40 is disposed in the rear surface of the refrigerator compartment door 30 to accommodate food. The storing device 40 includes a frame 41 providing an accommodation space. The frame 41 is removably coupled to the rear surface of the refrigerator compartment door 30.

The refrigerator compartment 104 may be divided into a plurality of spaces by one or more shelves 105.

When the refrigerator compartment door 30 closes the refrigerator compartment 104, the frame 41 is disposed in the refrigerator compartment 104. In other words, when the refrigerator compartment door 30 is closed, the accommodation space provided by the frame 41 of the storing device 40 is disposed in the refrigerator compartment 104. In the current embodiment, the refrigerator compartment 104 may be referred to as a first storage compartment, and a space provided by the frame 41 may be referred to as a second storage compartment 405. Hereinafter, the first storage compartment is also denoted by 104.

Thus, when the refrigerator compartment door 30 closes the first storage compartment 104, the second storage compartment 405 is disposed within the first storage compartment 104.

The refrigerator compartment door 30 includes a first door 310 opening and closing the first storage compartment 104, and a second door 340 rotatably connected to the first door 310 to open and close the second storage compartment 405. Thus, the second storage compartment 405 is accessible when the second door 340 opens.

The first door 310 is rotatably coupled to the cabinet 10 through a hinge assembly.

The hinge assembly includes a second hinge 51 connecting the second door 340 to the first door 310, and a first hinge 52 connecting the first door 310 to the cabinet 10.

An opening 316 is disposed in the first door 310 such that food is taken out from or put in to the second storage compartment 405 when the first door 310 closes the first storage compartment 104. Thus, when the first door 310 closes the first storage compartment 104, the opening 316 is opened to put in or take out food to or from the second storage compartment 405.

The left and right width of the second door 340 is the same as that of the first door 310. Thus, oneness of the second door 340 and the first door 310 is improved, so that the appearance of the refrigerator compartment door 30 can be improved.

The rear surface of the second door 340 is provided with a latch hook 341 for coupling to the first door 310, and a second part 312 of the first door 310 is provided with a latch slot 317 for coupling with the latch hook 341.

Since the structures of the latch hook 341 and the latch slot 317 are well known in the art, descriptions thereof will be omitted.

Thus, in the state where the first door 310 closes the first storage compartment 104, when the front surface of the second door 340 is pressed, the latch hook 341 is released from the latch slot 317, so that the second door 340 can be rotated.

The rear surface of the first door 310 is provided with a sealer 319 for preventing chilly air of the first storage compartment 104 from leaking. A magnet is disposed in the sealer 319, and attraction between the magnet and the front surface of the cabinet 10 maintains the state where the first door 310 closes the first storage compartment 104.

The rear surface of the first door 310 may be coupled with one or more baskets 318 for storing food.

Figure 4:
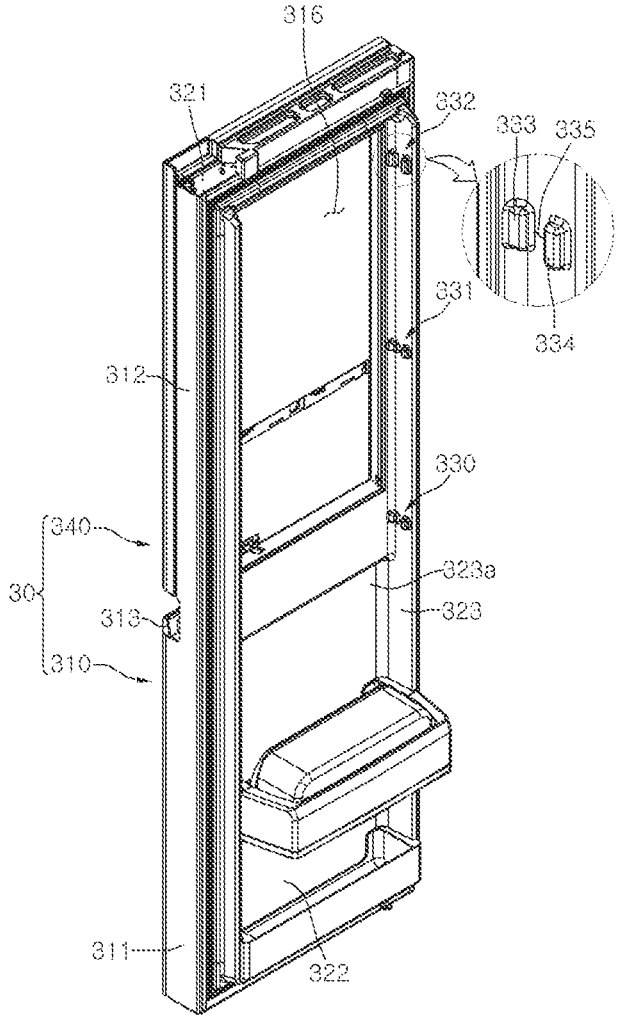
FIG. 4 is a perspective view illustrating the rear surface of a refrigerator compartment door according to an embodiment.

FIG. 4 is a perspective view illustrating the rear surface of a refrigerator compartment door according to an embodiment.

Referring to FIGS. 2 to 4, the refrigerator compartment door 30 includes the first door 310 and the second door 340 as described above.

A side surface of the first door 310 has a stepped shape. In detail, the first door 310 includes a first part 311, and the second part 312 extending to the upper side of the first part 311. The second part 312 has a thickness less than that of the first part 311.

The opening 316 is disposed in the second part 312, and the second door 340 is connected to the second part 312, so as to open and close the opening 316 and the second storage compartment 405.

The upper side of the first part 311 is provided with a grip part 313 that is held by a user. The grip part 313 extends upward from the upper surface of the first part 311.

For a user to hold the grip part 313, the grip part 313 is spaced apart from the front surface of the second part 312 and the lower surface of the second door 340. That is, the up and down length of the second door 340 is less than that of the second part 312.

When the grip part 313 held by a user is pulled, the first door 310 is rotated to open the first storage compartment 104.

The first door 310 includes an outer case 321 and a door liner 322 coupled to the outer case 321. Substantially, the door liner 322 closes the first storage compartment 104.

The door liner 322 includes a plurality of dikes 323 that are spaced apart from each other along the left and right direction. Each of the dikes 323 is elongated along the up and down direction. The dikes 323 constitute a portion of the door liner 322.

The storing device 40 and a part of the baskets 318 are disposed between the dikes 323.

Each of the dikes 323 includes one or more first coupling parts for coupling with the storing device 40. To stably couple the storing device 40 to each of the dikes 323, a plurality of first coupling parts 330, 331, and 332 may be disposed on each of the dikes 323. The first coupling parts 330, 331, and 332 are spaced apart from one another along the up and down direction.

Each of the first coupling parts 330, 331, and 332 includes a first projection part 333 and a second projection part 334. The first and second projection parts 333 and 334 protrude from each of the dikes 323 in the direction in which they come closer to each other.

The first and second projection parts 333 and 334 are spaced apart from each other along the front and rear direction of the refrigerator compartment door 30. Thus, a space is formed between the first and second projection parts 333 and 334.

The first projection part 333 is adjacent to the opening 316 of the first door 310. That is, the distance between the first projection part 333 and the opening 316 is less than the distance between the second projection part 334 and the opening 316.

A stepped part 323a that is stepped with a predetermined depth is disposed in the rear surface of the first door 310 corresponding to the lower side of the storing device 40. Thus, a horizontal protrusion length of the dikes 323 in the region provided with the storing device 40 is shorter than a horizontal protrusion length in the region corresponding to the lower side of the storing device 40. Accordingly, a back and forth width of a basket installed on the rear surface of the first door 310, that is, on the rear surface of the first door 310 corresponding to the lower side of the storing device 40 can be greater than a back and forth width of a basket installed in the storing device 40.

A coupling relationship between the storing device 40 and the first coupling parts 330, 331, and 332 will be described with reference to FIG. 8.

Figure 5:
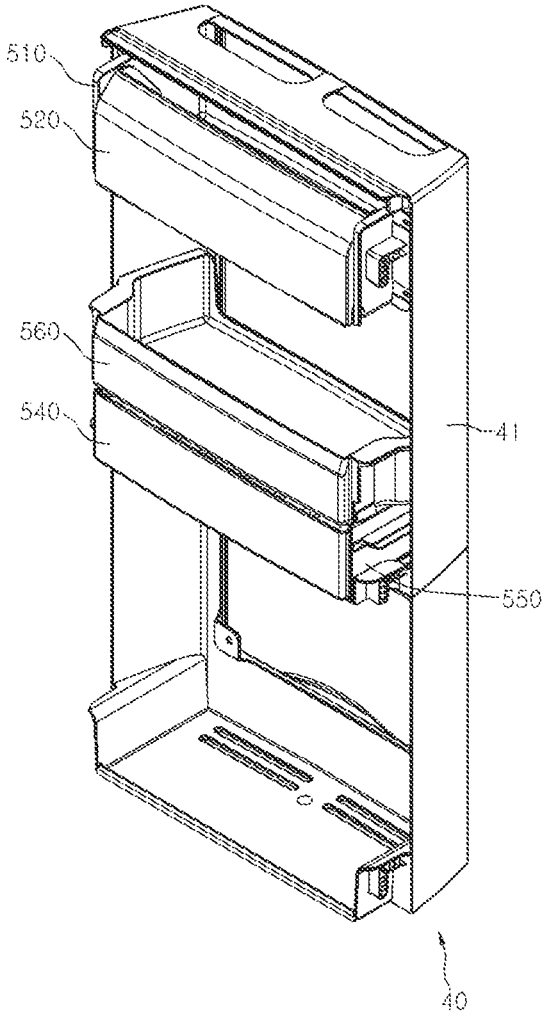
FIG. 5 is a perspective view illustrating a storing device according to an embodiment.
Figure 6:
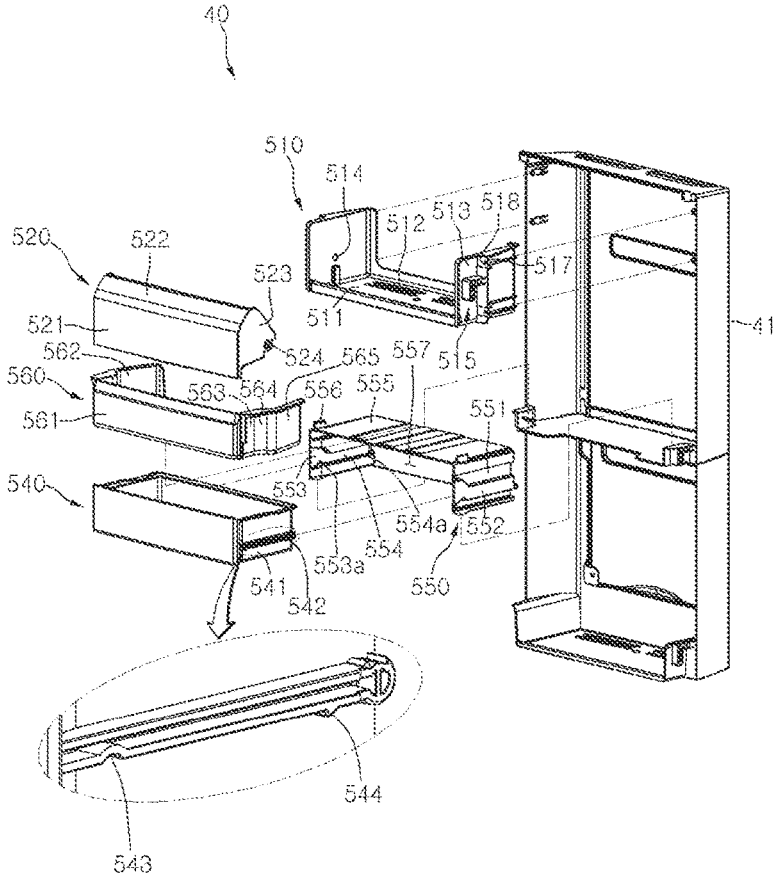
FIG. 6 is an exploded perspective view illustrating a storing device according to an embodiment.
Figure 7:
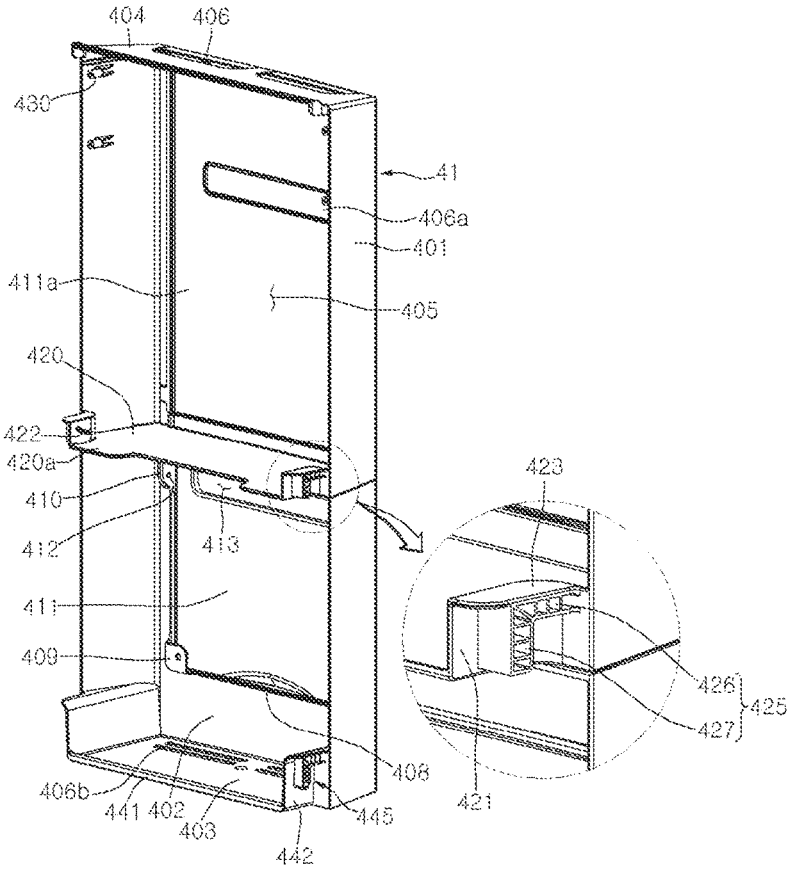
FIG. 7 is a perspective view illustrating a frame according to an embodiment.

FIG. 5 is a perspective view illustrating a storing device according to an embodiment. FIG. 6 is an exploded perspective view illustrating a storing device according to an embodiment. FIG. 7 is a perspective view illustrating a frame according to an embodiment.

Referring to FIGS. 4 to 7, the storing device 40 includes the frame 41, and a plurality of baskets 510, 540, and 560 for storing food. The baskets 510, 540, and 560 are spaced apart from one another along the up and down direction on the frame 41.

The baskets 510, 540, and 560 include a first basket that is also denoted by 510, a second basket that is also denoted by 540 and disposed at the lower side of the first basket 510, and a third basket that is also denoted by 560 and disposed between the first basket 510 and the second basket 540.

The first basket 510 is fixed to the frame 41 through a coupling member such as a screw. The second basket 540 and the third basket 560 are removably coupled to the frame 41. As a matter of course, the first basket 510 may be removed from the frame 41.

When the second door 340 opens the second storage compartment 405, the second basket 540 and the third basket 560 can be taken out to the outside of the second storage compartment 405 through the opening 316 of the first door 310.

Thus, food can be effectively stored in the second storage compartment 405, using the first basket 510, the second basket 540, and the third basket 560, which are arrayed along the up and down direction.

The frame 41 includes both side surfaces 401, a rear surface 402, a lower surface 403, and an upper surface 404 to provide the second storage compartment 405.

The frame 41 includes one or more communication holes 406 such that the first storage compartment 104 communicates with the second storage compartment 405.

The rear surface 402 of the frame 41 is provided with an opening 408 to put in or take out food to or from the second storage compartment 405 in the state where the first door 310 opens the first storage compartment 104. The opening 408 can be opened and closed by a cover 411.

The rear surface 402 is provided with a hinge coupling part 410 for coupling with a hinge 412 provided to the cover 411. The hinge 412 may be disposed at the upper portion of the cover 411. Thus, the cover 411 can rotate about the hinge 412 disposed at the upper portion of the cover 411.

The rear surface 402 is provided with a stopper 409 that stops the cover 411 at a predetermined position when the cover 411 rotates in a direction closing the opening 408. Thus, a user can put food into or take food out from the second storage compartment 405 through the opening 316 of the first door 310, or the opening 408 of the frame 41. The cover 411 is provided with a hole 413 such that the first storage compartment 104 communicates with the second storage compartment 405.

The upper portion of the frame 41 is provided with a plurality of coupling bosses 430 for coupling with the first basket 510. In detail, the coupling bosses 430 are disposed at the upper portions respectively of the side surfaces 401.

A supporter 420 is integrally formed with the middle portion of the frame 41. Alternatively, the supporter 420 may be removably coupled to the frame 41.

The supporter 420 connects the side surfaces 401 to each other. The front and rear length of the supporter 420 is greater than that of the side surfaces 401. That is, the supporter 420 includes an extension part 420a that extends to the front side of the side surfaces 401 in a side view of the frame 41.

The extension part 420a includes a plurality of vertical surfaces 421 that are respectively disposed at both sides of the extension part 420a, and horizontal surfaces 423 that horizontally extend from the vertical surfaces 421. The horizontal surfaces 423 extend in directions going away from the vertical surfaces 421, respectively.

Sides respectively of the vertical surfaces 421 are provided with second coupling parts 425 that interact with the first coupling parts 331. The second coupling parts 425 may be integrally formed with the vertical surfaces 421 and the horizontal surfaces 423.

Thus, a load applied to the supporter 420 is prevented from damaging the boundaries between the second coupling parts 425 and the supporter 420 when the second coupling parts 425 are coupled to the first coupling parts 331.

The second coupling parts 425 include a placement part 426 extending horizontally and an insertion part 427 extending downward from an end of the placement part 426. The insertion part 427 is inserted in a space 335 between the first and second projection parts 333 and 334, and the placement part 426 is placed on the upper surface of the second projection part 334. That is, the second projection part 334 supports the placement part 426.

The width of the space 335 may be equal to or greater than the width of the insertion part 427.

Alternatively, the insertion part 427 may be disposed in the middle of the placement part 426. In this case, when the insertion part 427 is inserted in the space 335, the first projection part 333 and the second projection part 334 may support the placement part 426.

Surfaces of the vertical surfaces 421, which face each other, that is, another surface of each of the vertical surfaces 421 is provided with guide ribs 422 that guide installation of a basket installation part 550 to be described later.

The lower surface 403 of the frame 41 includes an extension part 441 extending to the front side of the side surfaces 401 in the side view of the frame 41. Vertical surfaces 442 are disposed at both sides of the extension part 441, respectively. The vertical surfaces 442 are respectively provided with second coupling parts 445 that interact with the first coupling parts 330.

The second coupling parts 445 disposed in the lower portion of the frame 41 have the same shapes as those of the second coupling parts 425 disposed in the middle portion of the frame 41. That is, in the current embodiment, the frame 41 includes the second coupling parts 425 and 445 that are arrayed along the up and down direction. Thus, loads of the frame 41 and food can be distributed to the second coupling parts 425 and 445.

The first basket 510 has open front, upper and rear surfaces. That is, the first basket 510 includes a closed lower surface 511 and both closed side surfaces 513. The lower surface 511 is provided with one or more holes 512 through which chilly air can pass.

The side surfaces 513 are respectively provided with second coupling parts 515 that interact with the first projection parts 333. Since the second coupling parts 515 have the same shapes as those of the second coupling parts 425 and 445 provided to the frame 41, descriptions thereof will be omitted.

The side surfaces 513 are respectively provided with fixation parts 517 to be fixed to the frame 41. The fixation parts 517 are provided with coupling holes 518 through which coupling members pass. The coupling members pass through the coupling holes 518 are coupled to the coupling bosses 430 of the frame 41.

Each of the second coupling parts 515 is integrally formed with the side surface 513 and the fixation part 517. Thus, loads of the first basket 510 and food can be prevented from damaging the boundaries between the first basket 510 and the second coupling parts 515.

According to the current embodiment, one group of the second coupling parts is disposed on the frame 41, and the other group is disposed on the first basket 510. Thus, the load of the frame 41 to the first basket 510 can be reduced. In addition, the load of the first basket 510 to the frame 41 can be reduced. Thus, damages of the boundaries between the second coupling parts and the first basket, or between the second coupling parts and the frame can be prevented.

The first basket 510 is connected with a cover 520 for covering food placed on the first basket 510. The cover 520 includes a front surface 521, an oblique surface 522 obliquely extending from the front surface 521, and a couple of side surfaces 523 connected to the front surface 521 and the oblique surface 522. Rotation shafts 524 are disposed on the side surfaces 523, respectively. The rotation shafts 524 are inserted in shaft insertion holes 514 disposed in the side surfaces 513 of the first basket 510. Thus, the cover 520 covers food on the first basket 510 through a rotational motion.

Since the cover 520 covers food placed on the first basket 510, when the second door 340 opens the second storage compartment 405, the food placed on the first basket 510 is prevented from being exposed to the outside.

The basket installation part 550 is placed on the supporter 420. The basket installation part 550 includes a couple of side surfaces 551 and an upper surface 555. The side surfaces 551 and the upper surface 555 provide a receiving part 557 that receives the second basket 540.

The side surfaces 551 are provided with second guide parts 552 for guiding a sliding installation along the front and rear direction of the second basket 540. The second guide parts 552 interact with first guide parts 542 provided to the second basket 540. For example, the first guide parts 542 may slide into the second guide parts 552.

The second guide parts 552 extend along the front and rear direction on the side surfaces 551, respectively. The second guide parts 552 include first parts 553 and second parts 554 extending from the first parts 553 to the rear side (to the rear surface of the frame 41). Along the up and down direction, the first part 553 has a height greater than that of the second part 554. The height of the first part 553 may decrease toward the second part 554.

The upper surface 555 of the basket installation part 550 is provided with a plurality of movement prevention parts 556 to prevent a front and rear movement and a left and right movement of the third basket 560 when the third basket 560 is placed on the upper surface 555. The movement prevention parts 556 are disposed at both ends of the upper surface 555.

The second basket 540 has an open upper surface. When the second basket 540 is installed on the basket installation part 550, the open upper surface of the second basket 540 is covered by the upper surface 555 of the basket installation part 550.

Both side surfaces 541 of the second basket 540 are provided with the first guide parts 542 that interact with the second guide parts 552. The first guide parts 542 extend along the front and rear direction on the side surfaces 541 of the second basket 540, respectively.

The second guide parts 552 receive the first guide parts 542. The up and down lengths of inlets of the first parts 553 are greater than those of the first guide parts 542. The up and down lengths of the second parts 554 are equal to or greater than those of the first guide parts 542.

Since the up and down lengths of the inlets of the first parts 553 are greater than those of the first guide parts 542, the first guide parts 542 can be easily inserted into the first parts 553.

The first parts 553 of the second guide parts 552 are provided with first projection parts 553a inserted in the first guide parts 542, and the first guide parts 542 are provided with first insertion recesses 543 in which the first projection parts 553a are inserted. The first guide parts 542 are provided with second projection parts 544, and the second parts 554 of the second guide parts 552 are provided with second insertion recesses 554a in which the second projection parts 544 are inserted.

The second projection parts 544, the first projection parts 553a, the first insertion recesses 543, and the second insertion recesses 554a prevent the front and rear movement of the second basket 540 in the state where the second basket 540 is installed on the basket installation part 550.

The left and right length of the second basket 540 may be less than that of the opening 316 such that the second basket 540 can be taken out from the basket installation part 550 through the opening 316.

The third basket 560 is placed on the upper surface 555 of the basket installation part 550. The third basket 560 is placed on and removed from the basket installation part 550 along the up and down direction.

The third basket 560 has an open upper surface, a front surface 561, both side surfaces 562, and a lower surface (not shown).

Each of the side surfaces 562 of the third basket 560 includes a first side surface 563 extending rearward from the front surface 561, a second side surface 564 obliquely extending rearward from the first side surface 563, and a third side surface 565 extending rearward from the second side surface 564.

The first side surfaces 563 are substantially parallel to the third side surfaces 565. The second side surfaces 564 obliquely extend in directions in which they go away from each other (in outward directions) from the first side surfaces 563.

Because of the second side surfaces 564, the distance between the first side surfaces 563 is less than the distance between the third side surfaces 565.

When the third basket 560 is placed on the basket installation part 550, the movement prevention parts 556 are disposed at the outsides of the first side surfaces 563 of the third basket 560. The movement prevention parts 556 prevent the left and right movement of the third basket 560, and prevent the forward removal of the third basket 560 when the first door 310 or the second door 340 is moved. Thus, when the first door 310 is closed, the second door 340 can be opened to access the frame 41, the basket installation part 550, and the plurality of baskets 510, 540, and 560.

Figure 8:
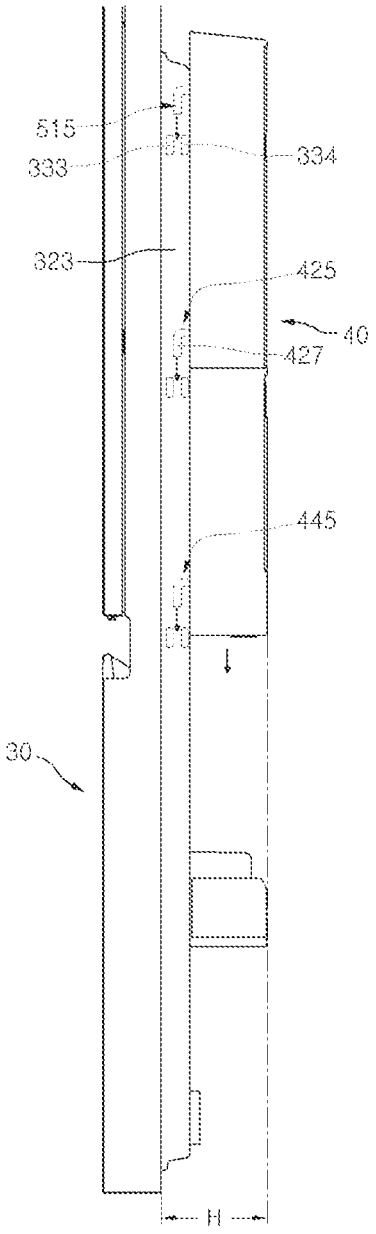
FIG. 8 is a side view illustrating a state where a storing device is coupled to a refrigerator compartment door.

FIG. 8 is a side view illustrating a state where a storing device is coupled to a refrigerator compartment door.

Referring to FIGS. 4 and 8, first, the second coupling parts 425, 445, and 515 of the storing device 40 are disposed between the dikes 323 of the refrigerator compartment door 30 to couple the storing device 40 to the refrigerator compartment door 30.

At this point, the second coupling parts 425, 445, and 515 are disposed between the dikes 323 in the manner where the second coupling parts 425, 445, and 515 not interfere with the first coupling parts 330, 331, and 332.

As illustrated in FIG. 8, the second coupling parts 425, 445, and 515 do not interfere with the first coupling parts 330, 331, and 332.

When the second coupling parts 425, 445, and 515 are disposed between the dikes 323, the insertion parts 427 respectively of the second coupling parts 425, 445, and 515 are aligned with the spaces 335 between the first projection parts 333 and the second projection parts 334, respectively.

In this state, the storing device 40 is moved downward to be coupled to the refrigerator compartment door 30. Then, the insertion parts 427 are inserted into the spaces 335, and the second projection parts 334 support the placement parts 426 of the second coupling parts 425, 445, and 515.

Since food is accommodated in the storing device 40 at positions spaced apart from the second coupling parts 425, 445, and 515, when food is accommodated in the storing device 40, the storing device 40 tends to rotate about the second coupling parts 425, 445, and 515.

However, in the current embodiment, the spaces 335 are provided to dispose the insertion parts 427 between the first projection parts 333 and the second projection parts 334. Thus, the insertion parts 427 contact the first projection parts 333 to prevent the rotation of the storing device 40 and maintain stable coupling of the storing device 40 to the refrigerator compartment door 30.

When the storing device 40 is installed on the first door 310, the rear surface of the storing device 40 protrudes a predetermined distance H from the rear surface of the first door 310. At least one of the baskets 318 may be installed on the rear surface of the first door 310 corresponding to the lower side of the storing device 40. The rear surface of the basket 318 may protrude the predetermined distance H from the rear surface of the first door 310.

In detail, when the storing device 40 and the basket 318 are installed on the first door 310, the rear surfaces thereof protrude the same distance. That is, the rear surfaces of the storing device 40 and the basket 318 are disposed in the same extension line. Thus, when the first door 310 is closed, the storing device 40 and the basket 318 do not interfere with shelves and drawers within the first storage compartment 104.

Figure 9:
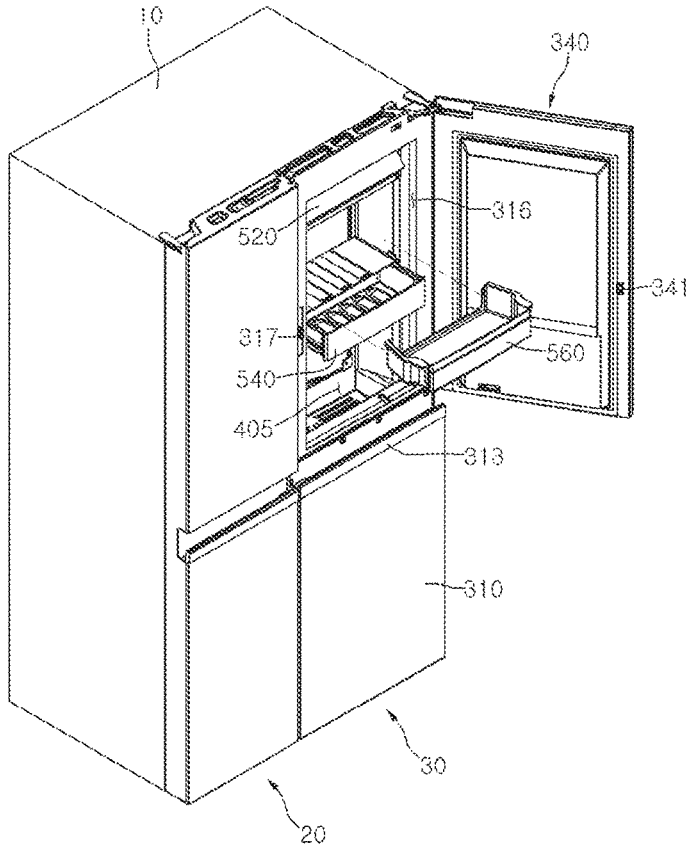
FIG. 9 is a perspective view illustrating a state where a basket is taken out when a second door opens a second storage compartment.

FIG. 9 is a perspective view illustrating a state where a basket is taken out when a second door opens a second storage compartment.

Referring to FIGS. 1 to 9, first, the front surface of the second door 340 is pressed to put in or take out food to or from the second storage compartment 405. Then, the latch hook 341 and the latch slot 317 are released from each other, so that the second door 340 can be rotated.

After the second door 340 is rotated, a user can rotate the cover 520 covering the first basket 510.

In addition, a user can raise the third basket 560 to the upper side of the basket installation part 550 to remove the third basket 560 from the basket installation part 550.

In addition, a user can pull the second basket 540 forward such that the second basket 540 slides out of the second storage compartment 405.

According to the embodiments, the baskets arrayed along the up and down direction can be used to effectively store food in the second storage compartment.

In addition, since the baskets can be removed from the accommodation device, and be taken out through the opening of the first door, food can be easily put in or taken out to or from the baskets.

In addition, since the second door has the same left and right length as the left and right length of the first door, the appearance of the refrigerator compartment door is improved.

In addition, one group of the second coupling parts is disposed on the frame, and the other group is disposed on the basket. Thus, the load of the frame applied to the basket can be reduced. In addition, the load of the basket applied to the frame can be reduced. Thus, the damages of the boundaries respectively between the second coupling parts and the first basket or the frame can be prevented.

In addition, since the space in which a portion of the second coupling part is inserted is disposed between the first projection part and the second projection part, the second coupling part contacts the first projection part to prevent the rotation of the accommodation device and maintain stable coupling of the accommodation device to the refrigerator compartment door.

Figure 10:
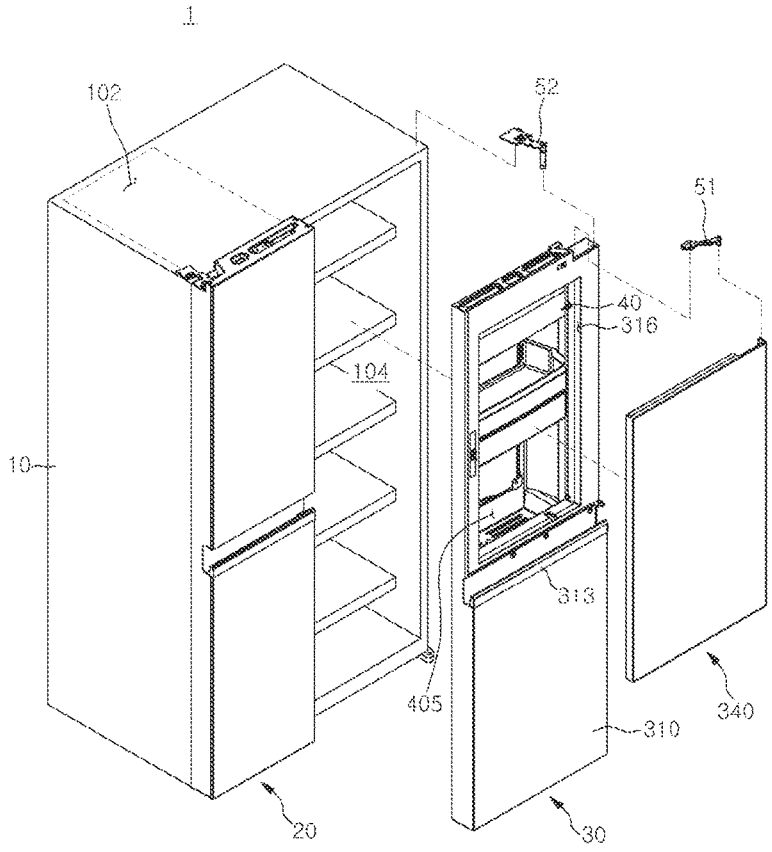
FIG. 10 is an exploded perspective view illustrating a refrigerator including a first door and a second door according to an embodiment.
Figure 11:
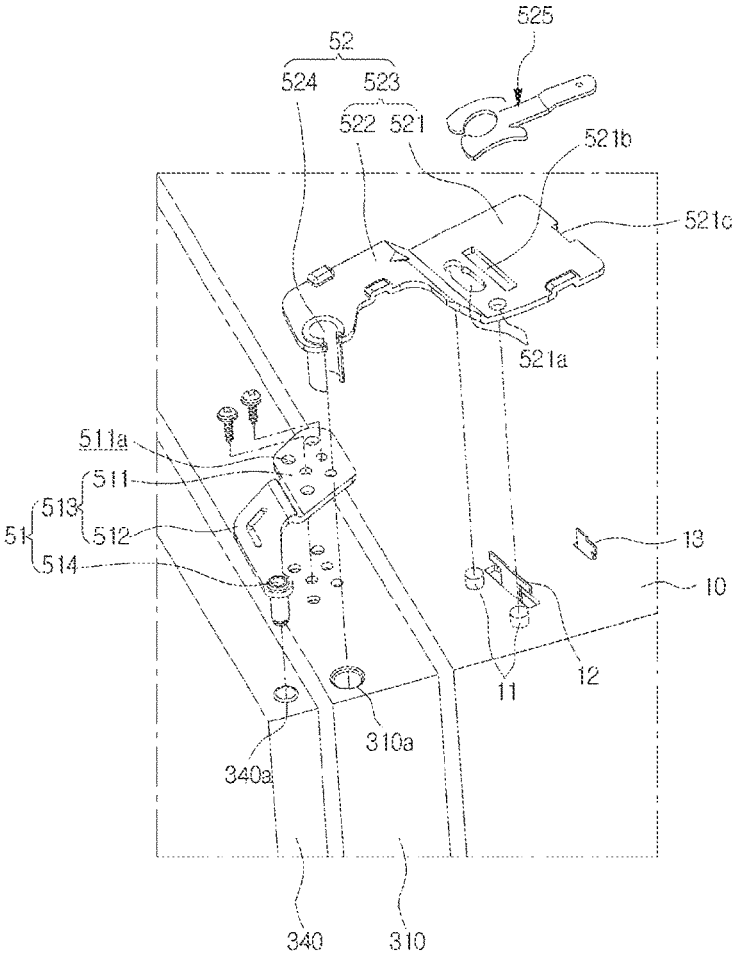
FIG. 11 is an exploded perspective view illustrating a first hinge and a second hinge according to an embodiment.
Figure 12:
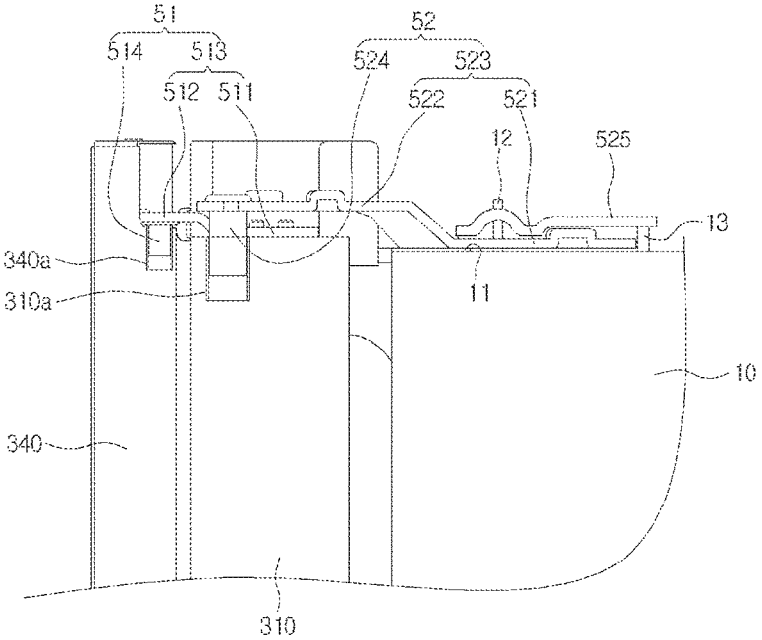
FIG. 12 is a side view illustrating an installation state of the first and second hinges of FIG. 11.
Figure 13:
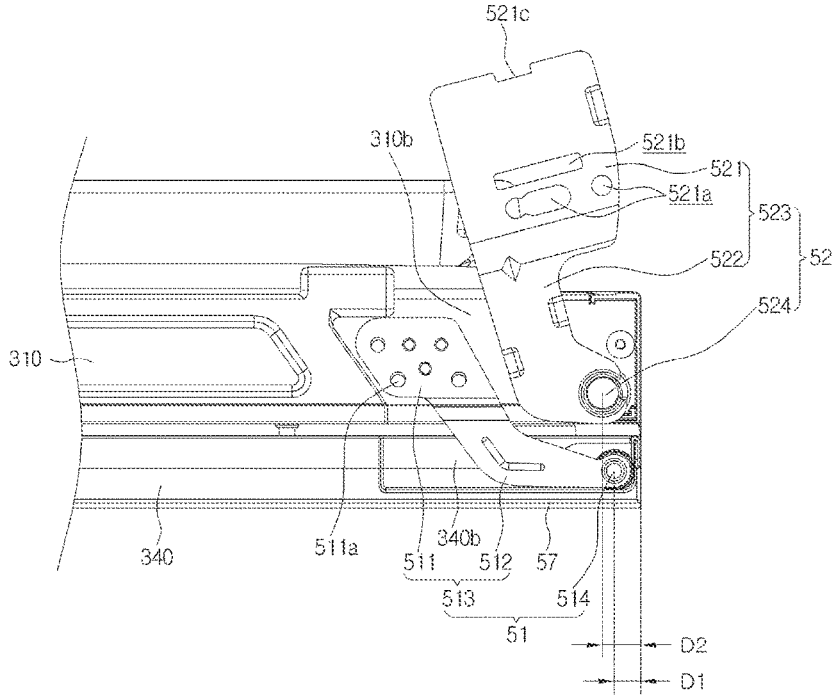
FIG. 13 is a plan view illustrating the first and second hinges of FIG. 11 when the first and second doors of FIG. 10 are closed.

FIG. 10 is an exploded perspective view illustrating a refrigerator including a first door and a second door according to an embodiment. FIG. 11 is an exploded perspective view illustrating a first hinge and a second hinge according to an embodiment. FIG. 12 is a side view illustrating an installation state of the first and second hinges of FIG. 11. FIG. 13 is a plan view illustrating the first and second hinges of FIG. 11 when the first and second doors of FIG. 10 are closed.

Hereinafter, a description of the same configuration as that of the refrigerator 1 will be omitted.

Referring to FIGS. 10 to 13, as described above, the exterior of the refrigerator 1 may be formed by the cabinet 10 and the doors 20 and 30. The cabinet 10 defines a storage space, and the doors 20 and 30 open and close the storage space. The refrigerator 1 may be a side by side type refrigerator in which the freezer compartment 102 and the refrigerator compartment 104 are disposed at the left and right sides, respectively. The second door 340 may be provided to the refrigerator compartment door 30 that opens and closes the refrigerator compartment 104.

The opening 316 provided to the first door 310 may extend from the grip part 313 to an adjacent position to the upper end of the first door 310 and to adjacent positions to the left and right ends of the first door 310. The front surface of the storing device 40 is open to communicate with the opening 316 of the first door 310.

A first installation part 310b is disposed on the upper surface of the first door 310. The second hinge 51 is fixed to the first installation part 310b, and a portion of the first hinge 52 is disposed on the first installation part 310b. The first installation part 310b extends to a side end of the first door 310. A portion of the upper surface of the first door 310 has a stepped shape, and the first hinge 52 is disposed on the first installation part 310b that is recessed downward. Thus, the first hinge 52 is disposed at a lower position than the upper surface of the first door 310.

The second door 340 opens and closes the opening 316, and is rotatably connected to the first door 310 through the second hinge 51. The second hinge 51 has an end fixed to the first installation part 310b of the first door 310, and is rotatably connected to the upper surface of the second door 340. A lower hinge assembly to be described later is installed at the lower end of the second door 340, and is fixed to the front surface of the second door 340 through a hinge bracket to be described later. According to this structure, even when the first door 310 is closed, the second door 340 can independently rotate and selectively opens and closes the opening 316. The second door 340 rotates in the rotation direction of the first door 310.

A second installation part 340b provided with the second hinge 51 is recessed in the upper surface of the second door 340. The second installation part 340b extends to a side end of the second door 340. A portion of the upper surface of the second door 340 has a stepped shape for the second installation part 340b. Thus, the second hinge 51 is disposed on the second installation part 340b that is recessed downward, so that the second hinge 51 is disposed at a lower position than the upper end of the second door 340.

In detail, a shield part 57 is disposed in front of the second installation part 340b. The shield part 57 forms the front surface of the second door 340. That is, the upper and side ends of the shield part 57 and the upper and side ends of the second door 340 are disposed in the same planes, respectively. This is because the second installation part 340b is recessed at the rear side of the upper surface of the second door 340. The shield part 57 covers the first hinge 52 and the second hinge 51 placed on the first installation part 310b and the second installation part 340b. That is, when being viewed from the front side of the refrigerator 1, the first hinge 52 and the second hinge 51 are not exposed to the outside, and the second door 340 and the first door 310 can be perceived as a single body.

The first hinge 52 is configured such that the first door 310 is rotatably installed on the cabinet 10. A portion of the first hinge 52 is disposed on the cabinet 10, and the other portion is disposed on the first installation part 310b. The first hinge 52 may include a first hinge plate 523 and a first hinge shaft 524.

The first hinge plate 523 may have a plate shape, so that the first hinge 52 can be fixed to the cabinet 10. The first hinge plate 523 may include a first coupling part 521 fixed to the cabinet 10, and a first extension 522 extending from the first coupling part 521 to the first door 310.

The first coupling part 521 has fixing holes 521a for fixing the first hinge plate 523, an insertion hole 521b, and a fixing recess 521c. In detail, the fixing holes 521a are perforated such that fixing protrusions 11 of the upper surface of the cabinet 10 can be inserted in the fixing holes 521a. The insertion hole 521b is opened with a predetermined length and a predetermined width. A confinement part 12 protruding from the upper portion of the cabinet 10 to fix a confinement lever 525 is inserted in the insertion hole 521b. The fixing recess 521c is recessed at the rear end of the first coupling part 521 to receive a fixing segment 13 protruding from the upper surface of the cabinet 10.

The confinement lever 525 is installed to fix the first hinge 52 installed on the cabinet 10, and is placed on the upper surface of the first coupling part 521 to fix the first hinge plate 523.

The first extension 522 may extend from an end of the first coupling part 521, and may have a stepped or inclined portion to be disposed above the first coupling part 521. An end of the first extension 522 may be bent toward the outside of the first door 310, and is provided with the first hinge shaft 524.

The first hinge shaft 524 vertically extends downward from the end of the first extension 522, and is inserted in a first hinge recess 310a of the first door 310 to function as a rotation center of the first door 310. The first hinge shaft 524 may have a tube shape that is opened at the upper and lower sides, and have a cut out. Thus, an electric wire, a ground wire, or a water supply tube, which is guided into the first door 310, can be guided through the inside of the first hinge shaft 524.

The first hinge shaft 524 has a greater diameter than that of a second hinge shaft 514. This is because the first door 310 is larger than the second door 340. Furthermore, since the storing device 40 is installed on the first door 310, when food is stored in the storing device 40, the first door 310 becomes heavier. Thus, the diameter of the first hinge shaft 524 may be large to stably support the rotating first door 310. Also, the diameter of the first hinge recess 310a in which the first hinge shaft 524 is inserted may be large.

The second hinge 51 is configured such that the second door 340 is rotatably installed on the first door 310. A portion of the second hinge 51 is installed in the first installation part 310b, and the other portion is installed in the second installation part 340b. The second hinge 51 may include a second hinge plate 513 and a second hinge shaft 514.

The second hinge plate 513 has a plate shape to be coupled to the upper surface of the first door 310. In detail, the second hinge plate 513 may include a second coupling part 511 coupled to the first door 310 and a second extension 512 extending from the second coupling part 511 to a rotation shaft of the second door 340. The second coupling part 511 is provided with a plurality of coupling holes 511a, and is coupled to the upper surface of the first door 310 through a coupling member such as a screw.

The second coupling part 511 is disposed at the inside of the first hinge 52 (left side in FIG. 13). The second extension 512 extends outward from the second coupling part 511, and may be bent to a side surface of the second door 340. An end of the second extension 512 is disposed at the outside of an end of the first extension 522 of the first hinge 52 (right side in FIG. 13).

In detail, the end of the second extension 512 may be provided with the second hinge shaft 514. Thus, the second hinge shaft 514 is disposed nearer to the side edge of the second door 340 than the first hinge shaft 524. That is, a distance D1 from the outer end of the refrigerator compartment door 30 to the center of the second hinge shaft 514 is less than a distance D2 from the outer end of the refrigerator compartment door 30 to the center of the first hinge shaft 524.

The first hinge shaft 524 has relatively larger diameter, and supports the first door 310 applying a large load. Thus, when the first hinge shaft 524 is disposed nearer to the side edge than the second hinge shaft 514, the first hinge shaft 524 may be broken. However, since the second door 340 does not have a separate storing space and is significantly smaller in thickness and size than the first door 310, the second hinge shaft 514 may be disposed nearer to the outside than the first hinge shaft 524. As the second hinge shaft 514 is disposed nearer to the outside than the first hinge shaft 524 and closes to the outer edge of the second door 340, the second door 340 is prevented from interfering with the first door 310 during the rotation of the second door 340. As a result, when the second door 340 is closed, the distance between the first door 310 and the second door 340 can be further decreased. Thus, when being viewed from the outside, the first door 310 and the second door 340 can be perceived as a single door, thus improving the sense of unity.

The second hinge shaft 514 vertically extends downward from the end of the second extension 512, and is inserted in a second hinge recess 340a of the second door 340 to function as a rotation center of the second door 340. The second hinge shaft 514 may have a tube shape that is opened at the upper and lower sides, and have a cut out. Thus, an electric wire, a ground wire, or a water supply tube, which is guided into the second door 340, can be guided through the inside of the second hinge shaft 514.

As the second hinge shaft 514 may have a smaller diameter than that of the first hinge shaft 524, the second hinge recess 340a in which the second hinge shaft 514 is installed has a small diameter.

Hereinafter, opening and closing of a first door and a second door will now be described with reference to the accompanying drawings according to an embodiment.

Figure 14:
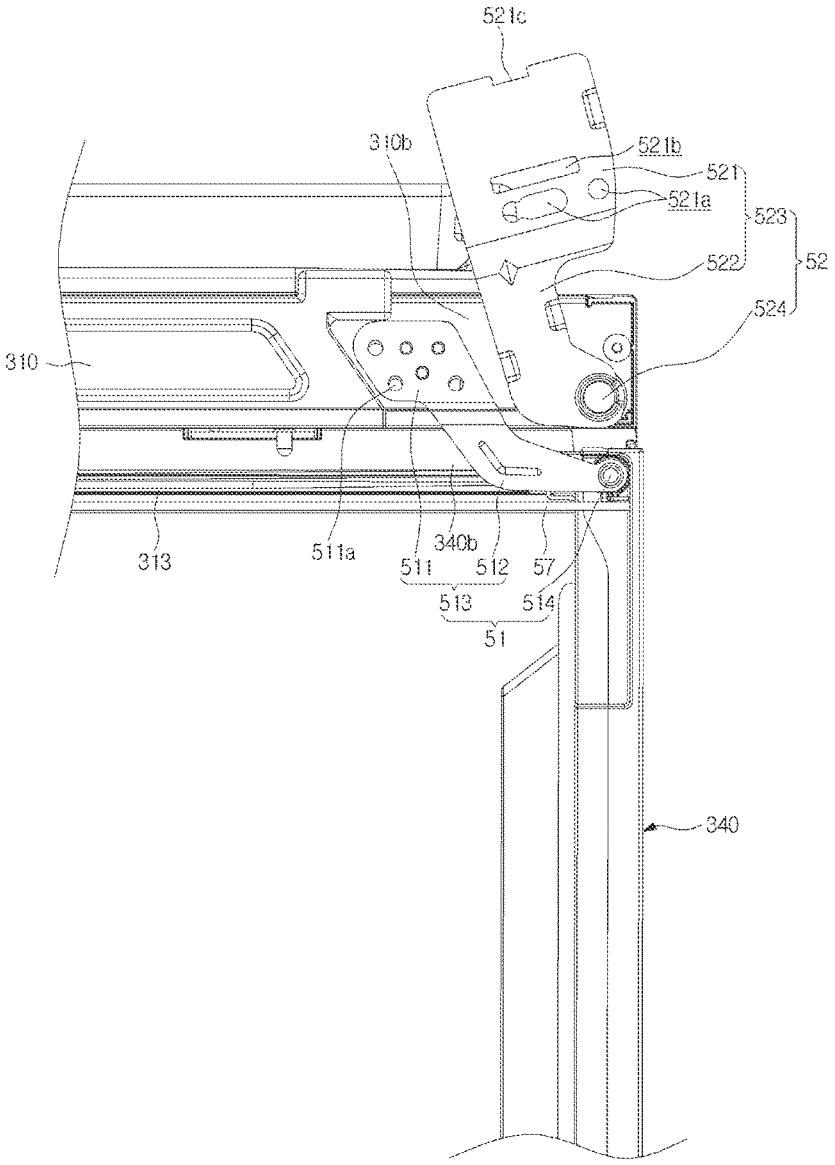
FIG. 14 is a plan view illustrating first and second hinges when a first door is opened.
Figure 15:
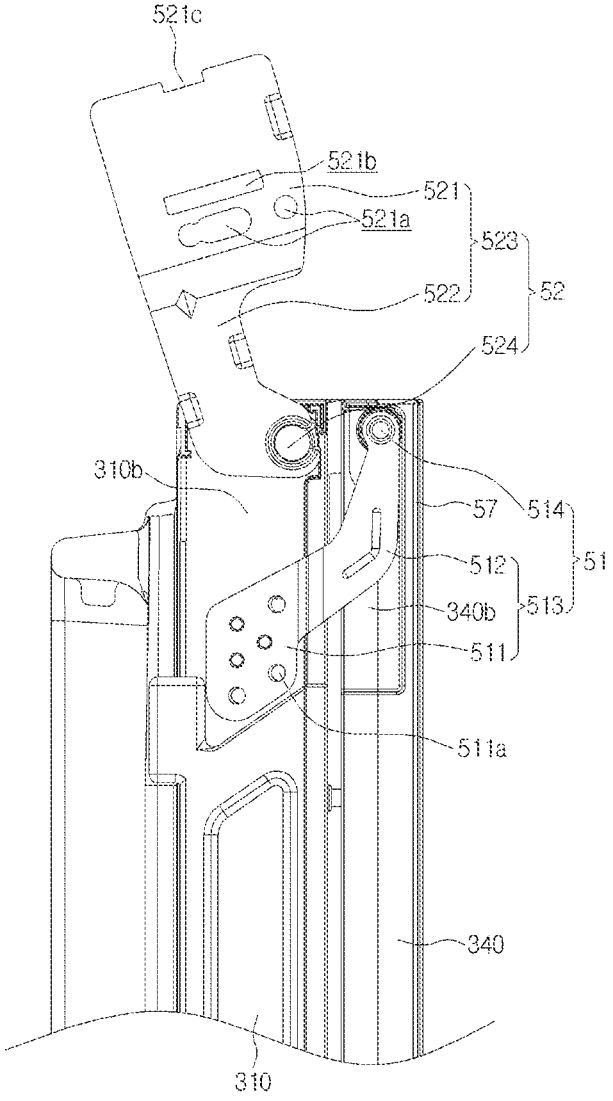
FIG. 15 is a plan view illustrating first and second hinges when a second door is opened.

FIG. 14 is a plan view illustrating first and second hinges when a first door is opened. FIG. 15 is a plan view illustrating first and second hinges when a second door is opened.

Referring to FIG. 13, the first door 310 and the second door 340 are closed. In detail, when the first door 310 and the second door 340 are closed as illustrated in FIG. 13, the first door 310 completely closes the first refrigerator compartment 104, and the second door 340 completely closes the second storage compartment 405.

To open the first door 310, the grip part 313 is held and pulled forward to rotate the first door 310. At this point, the first door 310 rotates about the first hinge shaft 524 of the first hinge 52 as a rotation center, which is illustrated in FIG. 15. In this state, the refrigerator compartment 104 is opened by the rotation of the first door 310.

To open the second door 340, a separate handle provided to the second door 340 may be held, or a confinement of a locking unit provided to the second door 340 is released, and then, the second door 340 is held to rotate it. At this point, the second door 340 rotates about the second hinge shaft 514 of the second hinge 51 as a rotation center, which is illustrated in FIG. 14. Thus, the second storage compartment 405 is opened by the rotation of the second door 340.

At this point, since the second hinge shaft 514 functioning as the rotation shaft of the second door 340 is disposed nearer to the side surface of the second door 340 than the first hinge shaft 524, an interference of the rotating second door 340 with the first door 310 is minimized. Thus, a back and forth distance between the first door 310 and the second door 340 can be reduced in design.

Figure 16:
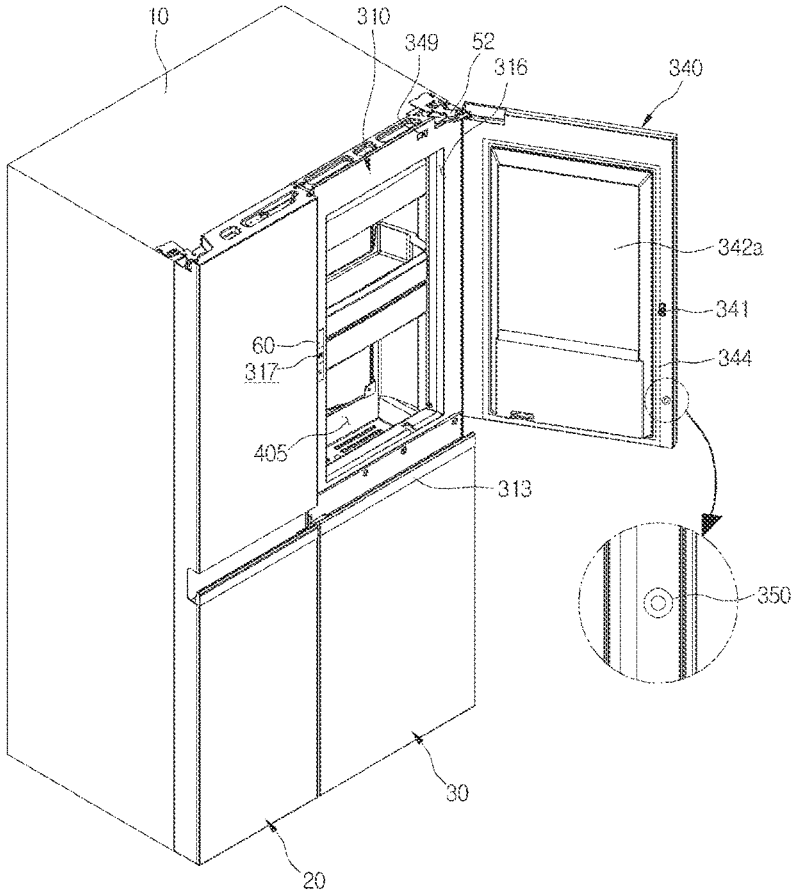
FIG. 16 is a perspective view illustrating a refrigerator when a second door is opened according to an embodiment.

FIG. 16 is a perspective view illustrating a refrigerator when a second door is opened according to an embodiment.

Referring to FIG. 16, the above-described refrigerator 1 will be descried in brief.

In detail, the front surface of the second door 340 and the front surfaces of the first door 310 and the door 20 are formed of the same material and have a continuous figure or pattern. When the second door 340 is closed, the front surface of the second door 340 and the front surface of the refrigerator compartment door 30 disposed at the lower side of the second door 340 are disposed in the same plane.

The rear surface of the second door 340 may be provided with a protrusion part 342a protruding inward. The protrusion part 342a is constituted by a portion of the rear surface of the second door 340, and has a shape corresponding to the opening 316. Thus, when the second door 340 is closed, the protrusion part 342a is disposed inside the opening 316, and engages with the opening 316 to primarily prevent a leakage of cool air.

A gasket 344 extends along the edge of the protrusion part 342a. The gasket 344 is formed of a material such as rubber or silicone that can be elastically deformed, and is closely adhered to the front surface of the first door 310 when the second door 340 is closed. In detail, the gasket 344 is closely adhered to the front surface of the second part 321 of the first door 310 corresponding to the inner periphery surface of the opening 316 or the outer edge of the opening 316. At this point, the gasket 344 is compressed to prevent the leakage of cool air from the storing device 40.

The upper end of the refrigerator compartment door 30 may be provided with a second door switch 349 that senses opening and closing of the second door 340. The second door switch 349 may be configured to output an alarm signal when the second door 340 is opened.

A locking unit is provided to a side end of the rear surface of the second door 340 disposed at the opposite side to the side connected to the rotation shaft of the second door 340, and the front surface of the first door 310 corresponding to the opposite side. The locking unit maintains the closing state of the second door 340, and switches a confinement state by a pressing operation to selectively confine the second door 340.

The locking unit has the same structure as that of a typical pressing switch, and may include a locking device 60 installed on the refrigerator compartment door 30, and a latch hook 341 provided to the second door 340. In addition, the front surface of the refrigerator compartment door 30 provided with the locking device 60 is provided with a latch slot 317. The locking unit may be a push-pull button in which the latch hook 341 is caught to the locking device 60 by a primary pressing operation and the catching state of the latch hook 341 is released by a secondary pressing operation.

Thus, when the second door 340 is closed, the latch hook 341 can be inserted in the latch slot 317, and be coupled to the locking device 60. In this case, when the opened second door 340 is closed and pressed, the latch hook 341 is inserted into the latch slot 317 and coupled to the locking device 60 to maintain the closing state of the second door 340. Then, when the second door 340 is pressed again, the latch hook 341 is released from the locking device 60 and taken out through the latch slot 317 to allow the opening of the second door 340.

A limiting member 350 is disposed at the vertical lower side of the latch hook 341. The limiting member 350 prevents the locking unit from being undesirably opened by a rotation of the first door 310 when the second door 340 is closed. The limiting member 350 is disposed outside the gasket 344 and closely adhered to the front surface of the first door 310 outside the opening 316.

Hereinafter, the limiting member 350 will now be described in more detail with reference to the accompanying drawings.

Figure 17:
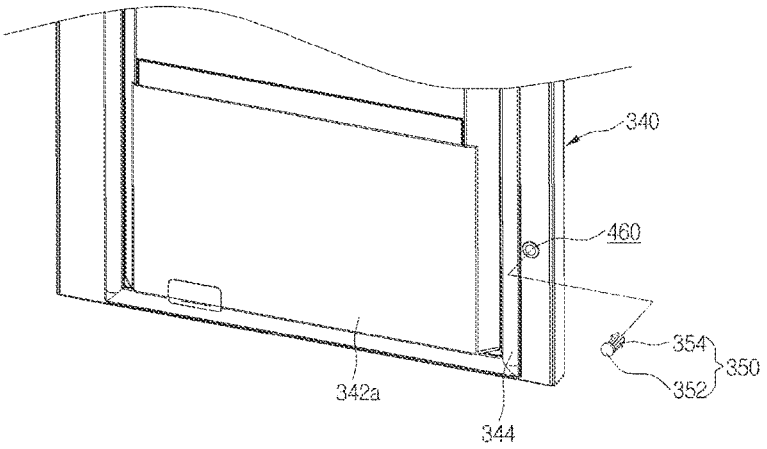
FIG. 17 is a partial perspective view illustrating a second door with a coupling structure of a limiting member according to an embodiment.

FIG. 17 is a partial perspective view illustrating a second door with a coupling structure of a limiting member according to an embodiment.

Referring to FIG. 17, the limiting member 350 is disposed in the lower portion of the rear surface of the second door 340. The limiting member 350 may be formed of rubber, silicone, or synthetic resin, which can be elastically deformed. The limiting member 350 may include a contact 352 contacting the first door 310, and an installation part 354 fixed to the second door 340.

The contact 352 may have a cylindrical or hemisphere shape having a predetermined height, and protrudes from the rear surface of the second door 340. A protrusion height of the contact 352 may be smaller than the height of the gasket 344 when external force is not applied thereto.

When the second door 340 is closed, the limiting member 350 may contact the first door 310 or be slightly spaced apart from the first door 310. In the state where the second door 340 is closed, even when a predetermined amount of external force is applied to the limiting member 350, the limiting member 350 maintains the distance between the first door 310 and the second door 340. That is, the external force is prevented from causing the latch hook 341 to press the locking device 60 and release the latch hook 341.

Thus, when the second door 340 is closed, the gasket 344 contacts the first door 310 first. When the gasket 344 is compressed over a predetermined degree, the end of the contact 352 contacts the rear surface of the first door 310.

The installation part 354 extends from a side of the contact 352, and may be formed in a hook structure that can be deformed by pressing. The installation part 354 may have a plurality of hook structures, and is pressed into an installation hole 342b provided to the rear surface of the second door 340.

Thus, after the second door 340 is assembled, when the installation part 354 is pressed into the installation hole 342b, the limiting member 350 is continually fixed to the rear surface of the second door 340.

Hereinafter, opening and closing of the refrigerator door configured as described above will now be described with reference to the accompanying drawings.

Figure 18:
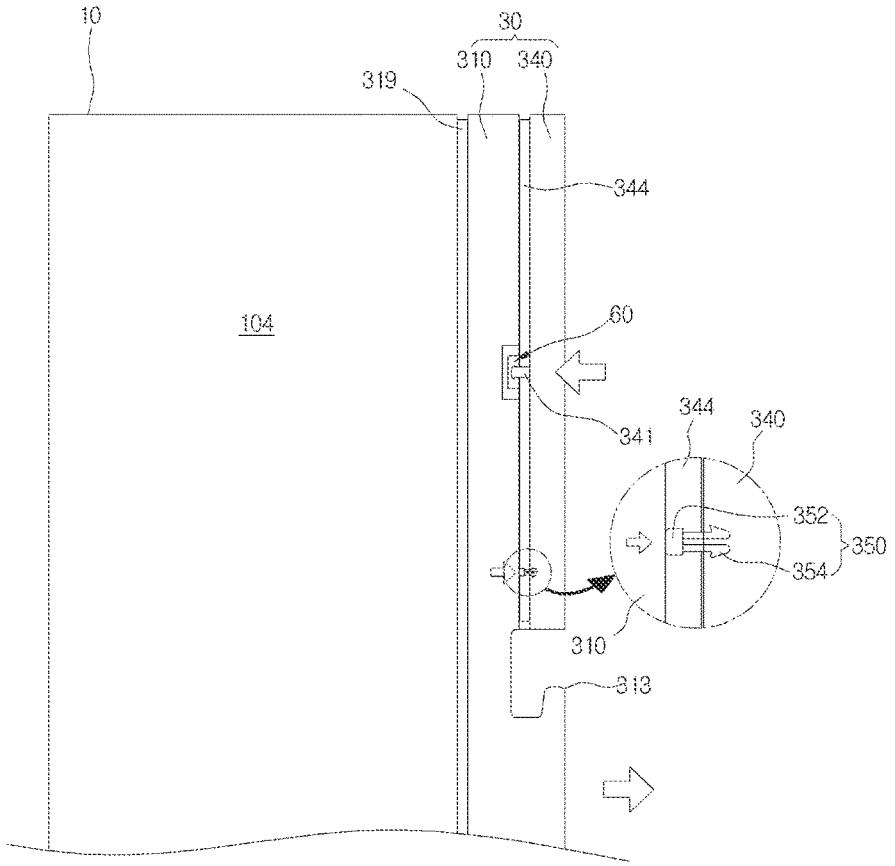
FIG. 18 is a partial side view illustrating a refrigerator with a limiting member when first and second doors are closed according to an embodiment.

FIG. 18 is a partial side view illustrating a refrigerator with a limiting member when first and second doors are closed according to an embodiment.

Referring to FIG. 18, to store food in the refrigerator compartment 104, the grip part 313 is held and pulled forward. Then, the first door 310 rotates and the refrigerator compartment 104 is opened. At this point, the second door 340 rotates, closely adhering to the first door 310.

To store food in the storing device 40, a portion of the front surface of the second door 340 corresponding to the locking unit is pressed and released. Then, the latch hook 341 is released and removed from the latch slot 317, and the second door 340 rotates from the first door 310. At this point, the refrigerator compartment door 30 may be still closed.

When the second door 340 is closed, the protrusion part 342a of the second door 340 is disposed inside the opening 316 of the refrigerator compartment door 30. The gasket 344 closely adheres to the front surface of the refrigerator compartment door 30 around the opening 316 to seal the inner space of the storing device 40.

After the second door 340 is closed, the latch hook 341 is continually disposed in the latch slot 317. That is, the latch hook 341 is continually confined by the locking device 60.

While the second door 340 is continually closed by the locking unit, the gasket 344 is maintained in a slight compression state as illustrated in FIG. 18. The limiting member 350 contacts the front surface of the first door 310, or is spaced a short distance from the front surface of the first door 310.

In this state, to open the second door 340, the portion of the second door 340 corresponding to the position where the locking unit is disposed is pressed first. When the second door 340 is pressed, the second door 340 presses the front surface of the first door 310, and the latch hook 341 is removed from the locking device 60. At this point, the gasket 344 is compressed, and the limiting member 350 is also slightly compressed, contacting the first door 310. That is, to remove the coupling state of the locking unit, the second door 340 should be pressed with a predetermined amount of force to compress the limiting member 350.

While the second door 340 is closed, when the refrigerator compartment door 30, particularly, the first door 310 is suddenly rotated to open or close, inertia may be applied to the second door 340. For example, when the grip part 313 is held and the refrigerator compartment door 30 is pulled, the second door 340 presses the front surface of the first door 310 by inertia applied to the second door 340. That is, since force is generated along the direction in which the second door 340 presses the first door 310, the gasket 344 is further compressed. This phenomenon may occur when the first door 310 closely adhered to the cabinet 10 by magnetic force is pulled to remove the first door 310 from the front surface of the cabinet 10.

When the second door 340 rotates along the direction in which the second door 340 presses the front surface of the first door 310, that is, in the opposite direction to the rotation direction of the first door 310, the limiting member 350 presses the front surface of the first door 310. Thus, the limiting member 350 prevents the rotation of the second door 340 from pressing the first door 310.

When inertia applied to the second door 340 is greater than force compressing the limiting member 350, the second door 340 may press the first door 310. Thus, the refrigerator 1 may be designed such that inertia applied to the second door 340 by a rotation of the refrigerator compartment door 30 is smaller than force compressing the limiting member 350. In other words, the refrigerator 1 may be designed such that the limiting member 350 is compressed to remove the coupling state of the locking unit only when the second door 340 is pressed with greater force than the inertia. Then, while the first door 310, that is, the refrigerator compartment door 30 rotates, the limiting member 350 prevents the second door 340 from compressing the front surface of the first door 310. The coupling state of the locking unit is maintained to prevent the second door 340 from being inadvertently opened while the first door 310 is opened and to maintain the closing state of the second door 340.

A refrigerator according to the present disclosure will be described according to various embodiments. Hereinafter, a refrigerator will now be described according to another embodiment.

The refrigerator according to the current embodiment includes an elastic limiting member between a first door and a second door to prevent the second door from being inadvertently opened, and the second door is automatically rotated by elastic force when the second door is opened.

Thus, in the current embodiment, the rest parts except for the limiting member is the same as the previous embodiments, a description thereof will be omitted, and like reference numeral denote like elements.

Figure 19:
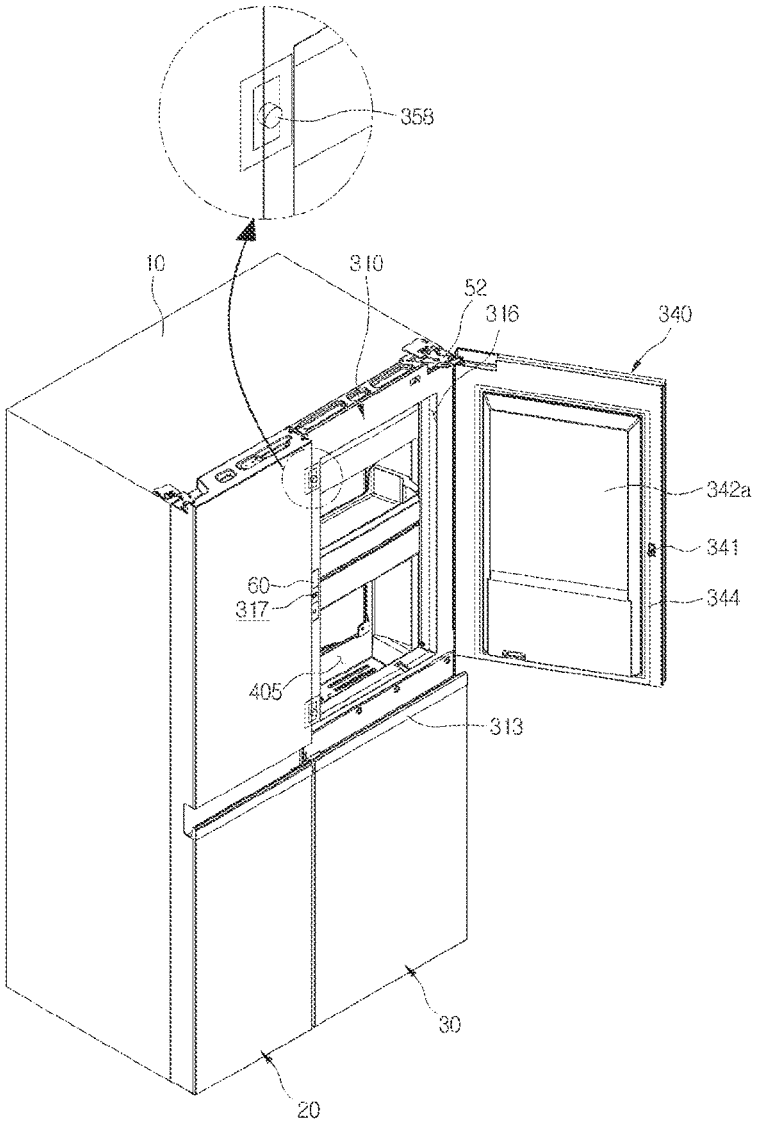
FIG. 19 is a perspective view illustrating a refrigerator when a second door is opened according to an embodiment.

FIG. 19 is a perspective view illustrating a refrigerator when a second door is opened according to another embodiment.

Referring to FIG. 19, limiting members 356 according to the current embodiment are configured to prevent the second door 340 from being inadvertently opened and automatically rotate and open the second door 340 when the second door 340 is opened.

In detail, the limiting members 356 may be disposed on the front surface of the first door 310 outside the opening 316. The limiting member 356 may be disposed outside the opening 316 at the opposite side to the side where the rotation shaft of the second door 340 is disposed. That is, the limiting members 356 may be disposed in a vertical line passing through the locking device 60.

The limiting members 356 may be formed of an elastic material such as a spring or in a structure that is elastically deformed. The limiting members 356 are compressed when the second door 340 is closed, and limiting member covers 358 are disposed outside the limiting member 356 to cover the limiting member 356 from the outside. The limiting member covers 358 may be movable in a back and forth direction from the front surface of the first door 310, so that the limiting member covers 358 can move together with the limiting members 356 when the limiting members 356 are compressed or extended. The limiting member covers 358 may be formed of an elastic material such as rubber or silicone.

The limiting member 356 may be provided in a pair respectively at upper and lower points spaced the same distance from the middle of the second door 340 to prevent the second door 340 from being inclined in the back and forth direction when the second door 340 is closed. Alternatively, the limiting members 356 may be disposed on the rear surface of the second door 340 in the same manner.

Figure 20:
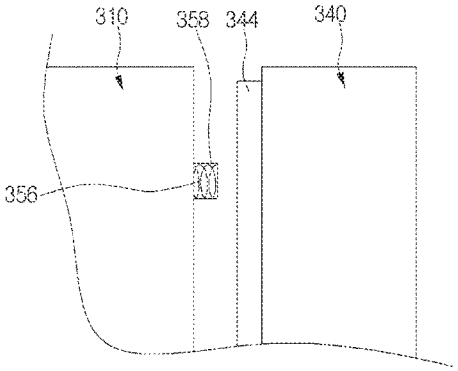
FIG. 20 is a schematic view illustrating a limiting member when first and second doors are opened according to an embodiment.
Figure 21:
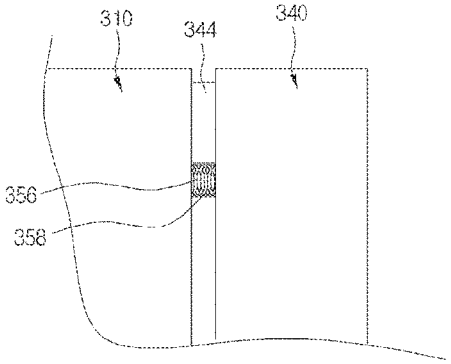
FIG. 21 is a schematic view illustrating a limiting member when a second door is closed according to an embodiment.

FIG. 20 is a schematic view illustrating a limiting member when first and second doors are opened according to a embodiment. FIG. 21 is a schematic view illustrating the limiting member of FIG. 20 when the second door is closed.

Referring to FIGS. 20 and 21, states of the limiting member 356 will now be described according to opening and closing of the first door 310 and the second door 340.

First, when the second door 340 is opened, external force is not applied to the limiting member 356 in a normal state as illustrated in FIG. 20. As the second door 340 rotates to be closed, the second door 340 comes closer to the end of the limiting member 356. Before the second door 340 is completely closed, the end of the limiting member 356 contacts the second door 340.

To maintain the closing state of the second door 340, the latch hook 341 is inserted in the latch slot 317 and coupled with the locking device 60. To this end, the second door 340 should further rotate to the front surface of the first door 310. At this point, the limiting member 356 is compressed by the movement of the second door 340, and simultaneously, the gasket 344 is in contact with the second door 340 and compressed to be closely adhered to the outer front surface of the opening 316 of the first door 310.

When the second door 340 is completely closed, the limiting member 356 is compressed and the adhering state of the gasket 344 to the opening 316 is maintained, as illustrated in FIG. 21. When the second door 340 is closed, the latch hook 341 is continually caught to the locking device 60 to prevent the second door 340 from being by resilient force of the limiting member 356 and the gasket 344.

In this state, when the refrigerator compartment door 30 is suddenly rotated to open the refrigerator compartment, inertia of the second door 340 presses the limiting member 356. Then, resilient force along a direction in which the second door 340 is pushed is applied to the limiting member 356, and the catching state of the latch hook 341 to the locking device 60 is maintained. That is, a push-pull function is limited. Thus, inadvertent opening of the second door 340 due to a push-pull operation is prevented although the first door 310 is suddenly rotated.

To open the second door 340 that is completely closed as illustrated in FIG. 21, the portion of the front surface of the second door 340 corresponding to the position of the latch hook 341 is pressed to activate the push-pull operation. Then, the latch hook 341 is released from the locking device 60. At this point, since the limiting member 356 is further compressed, when the force pressing the front surface of the second door 340 is removed, the resilient force of the limiting member 356 rotates the second door 340 in the open direction. Thus, a user can easily open the second door 340 with small force.

Figure 22:
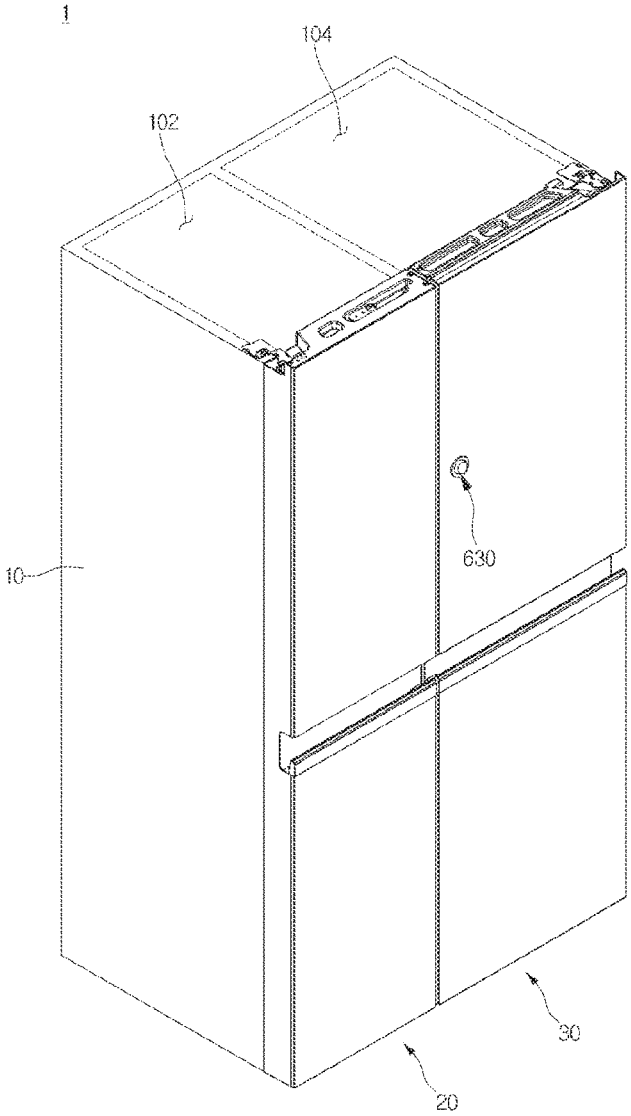
FIG. 22 is a perspective view illustrating a refrigerator according to an embodiment.
Figure 23:
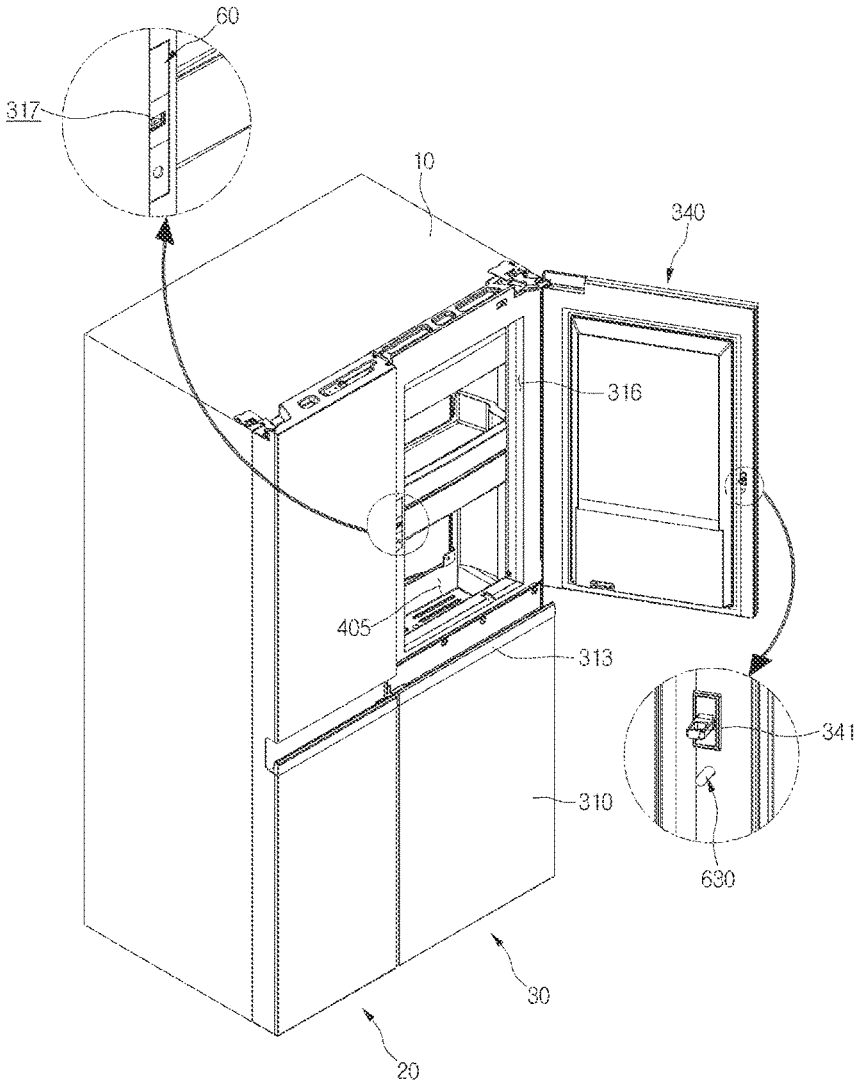
FIG. 23 is a perspective view illustrating a refrigerator when a second door is opened according to an embodiment.

FIG. 22 is a perspective view illustrating a refrigerator according to an embodiment. FIG. 23 is a perspective view illustrating a refrigerator when a second door is opened according to an embodiment.

Referring to FIGS. 22 and 23, an opening unit 630 as a release member for releasing the confinement state of the locking unit is disposed on a side of the second door 340 at a position corresponding to the locking device 60. The opening unit 630 is moved in the back and forth direction by a user's operation to remove the coupling of the locking device 60 and the latch hook 341, and is exposed to the front surface of the second door 340. Thus, when the opening unit 630 is operated through the front surface of the second door 340, the locking device 60 and the latch hook 341 is uncoupled from each other to allow the opening of the second door 340.

Hereinafter, the locking unit and the opening unit will now be described in more detail.

Figure 24:
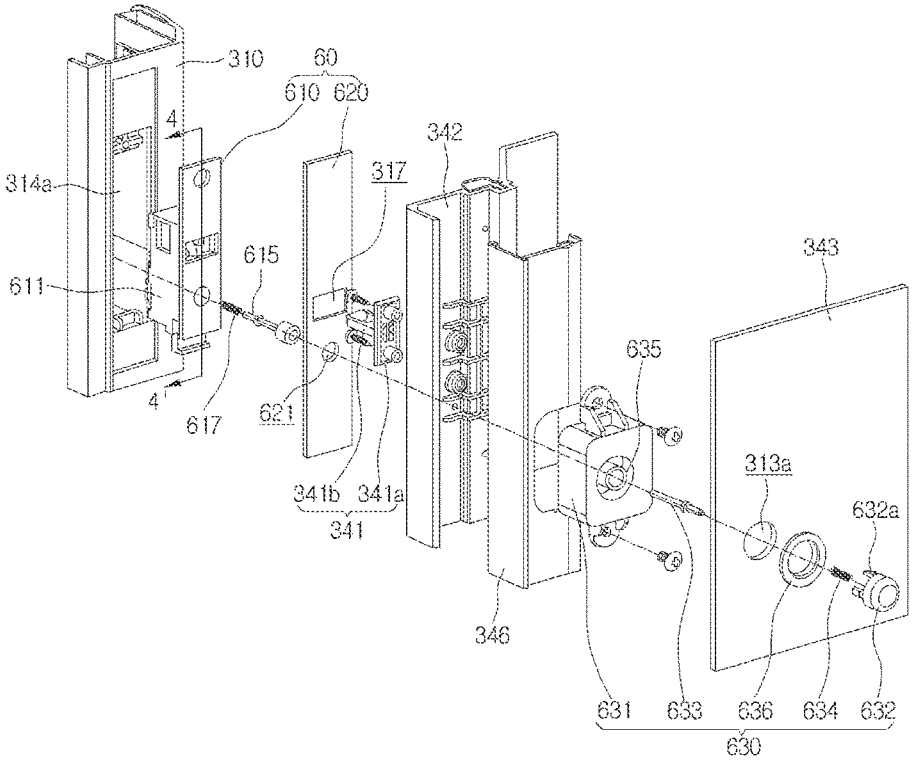
FIG. 24 is an exploded perspective view illustrating a locking device and an opening unit according to an embodiment.

FIG. 24 is an exploded perspective view illustrating a locking device and an opening unit according to an embodiment.

Referring to FIG. 24, the latch hook 341 constituting the locking unit may be fixed through screws to the rear surface the second door 340. The locking device 60 constituting the locking unit may be disposed at a portion of the front surface of the first door 310 corresponding to the latch hook 341.

The latch hook 341 is fixed to the rear surface of the second door 340, and includes a hook fixing part 341a coupled with the screws, and a hook part 341b extending from the rear surface of the hook fixing part 341a. The hook part 341b is inserted through the latch slot 317, and is selectively confined by the locking device 60.

The locking device 60 includes a locking assembly 610 installed on a locking device installation part 314a recessed in the first door 310, and a locking device cover 620 covering the locking assembly 610. The locking device cover 620 covers the locking assembly 610 to shield it.

A side of the locking assembly 610 is caught to the inside of the locking device installation part 314a, another side is fixed through a screw to the inside of the locking device installation part 314a. A latch rod 615 that is pressed by a push rod 633 of the opening unit 630 is installed on the locking assembly 610. The latch rod 615 is elastically supported in the locking assembly 610 by an elastic member 617 such as a spring.

The locking device cover 620 has a plate shape, and has the latch slot 317 that is open to receive the latch hook 341. A rod hole 621 is disposed at a side of the locking device 60 corresponding to the latch rod 615. The rod hole 621 may be disposed at a position corresponding to the push rod 633 to allow access of the push rod 633.

The opening unit 630 may be disposed inside the second door 340, and at least one portion thereof may be exposed through the front surface of the second door 340 to allow a user's operation.

The opening unit 630 may include an opening unit body 631 that is fixed to the inside of the second door 340, an operation button 632 that is movable in the back and forth direction on the opening unit body 631 and pressed by a user, and the push rod 633 that is moved in the back and forth direction by an operation of the operation button 632 to push the latch rod 615.

The opening unit body 631 may be fixed through screws to a door case 342 constituting the rear surface the second door 340. A side decor 346 of the second door 340 provided with the opening unit body 631 may be cut out not to interfere with the opening unit body 631. The rear surface of the opening unit body 631 is fixed to the door case 342, and the front surface thereof contacts the rear surface of a door plate 343.

The opening unit body 631 may include a rod guide part 635 to guide the back and forth movement of the push rod 633. The rod guide part 635 may have a boss shape passing through the opening unit body 631. The front portion of the rod guide part 635 protrudes in a boss shape to be inserted in the operation button 632. Thus, the operation button 632 is allowed to move in the back and forth direction along the outer circumferential surface of the boss, which constitutes the front portion of the rod guide part 635.

The push rod 633 extends a predetermined length, and is inserted in the rod guide part 635. The push rod 633 may have a length to protrude rearward through a hole of the door case 342 when the operation button 632 is operated. The front end of the push rod 633 may contact the rear surface of the operation button 632. The push rod 633 may contact the latch rod 615 while the second door 340 is closed. A support flange protrudes in the radial direction from the outer circumferential surface of the push rod 633, so that the push rod 633 can be supported by an elastic member 634 such as a spring. Thus, after the operation button 632 is operated, the push rod 633 and the operation button 632 returns their original positions by resilient force of the elastic member 634.

The operation button 632 is placed on the rod guide part 635, and can move back and forth along the rod guide part 635. The operation button 632 is exposed to the front surface of the second door 340 through the hole 343a of the door plate 343, and can be pressed by a user. The operation button 632 includes button fixing parts 632a having hook shapes, and the button fixing parts 632a are confined by a fixing ring 636 installed on the hole 313a of the door plate 343, so that the button fixing parts 632a are prevented from being removed forward.

Figure 25:
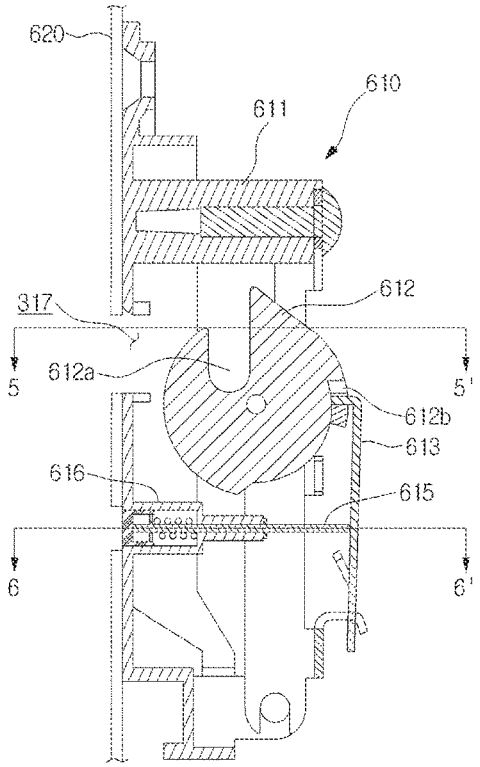
FIG. 25 is a cross-sectional view taken along line 4-4' of FIG. 24.
Figure 26:
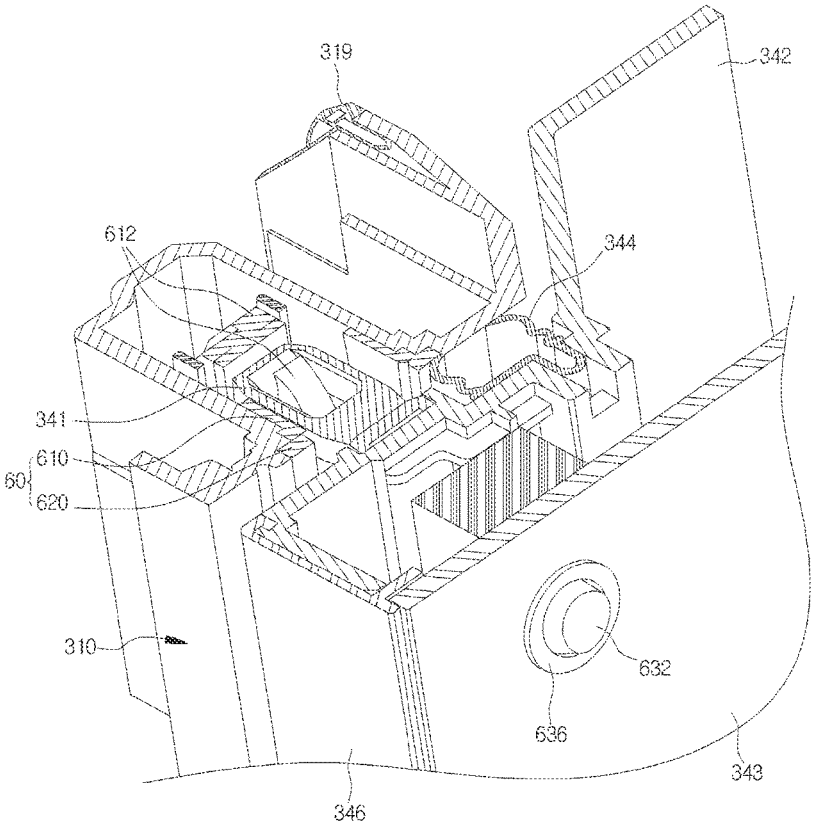
FIG. 26 is a cut-away perspective view taken along line 5-5' of FIG. 25 while a second door is closed.
Figure 27:
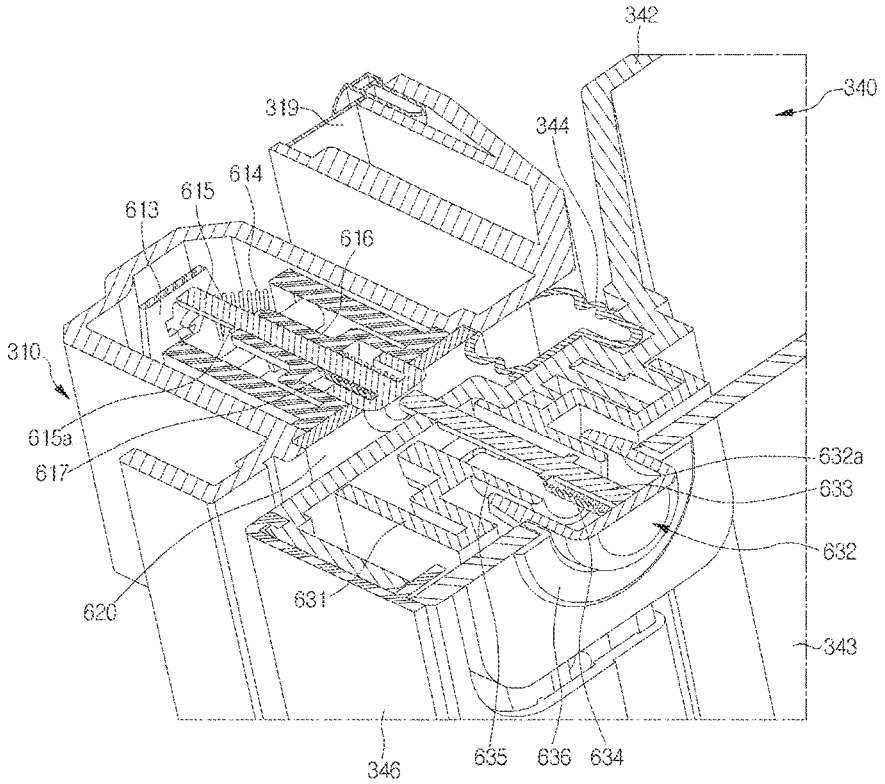
FIG. 27 is a cut-away perspective view taken along line 6-6' of FIG. 25 while the second door is closed.

FIG. 25 is a cross-sectional view taken along line 4-4' of FIG. 24. FIG. 26 is a cut-away perspective view taken along line 5-5' of FIG. 25 while a second door is closed. FIG. 27 is a cut-away perspective view taken along line 6-6' of FIG. 25 while the second door is closed.

Referring to FIGS. 25 through 27, the locking device 60 includes the locking assembly 610 and the locking device cover 620.

In detail, the locking assembly 610 includes a locking assembly case 611 that is fixed to the locking device installation part 314a, a latch cam 612 that is rotatably installed within the locking assembly case 611 to selectively confine the latch hook 341, a stopper 613 that selectively limits the rotation of the latch cam 612, and the latch rod 615 that pushes the stopper 613 rearward to allow the rotation of the latch cam 612.

The front surface of the locking assembly case 611 has an opening to receive the latch hook 341. The opening matches with the latch slot 317 of the locking device cover 620. A space for storing the latch cam 612, the stopper 613, and the latch rod 615 is defined in the locking assembly case 611.

Figure 28:
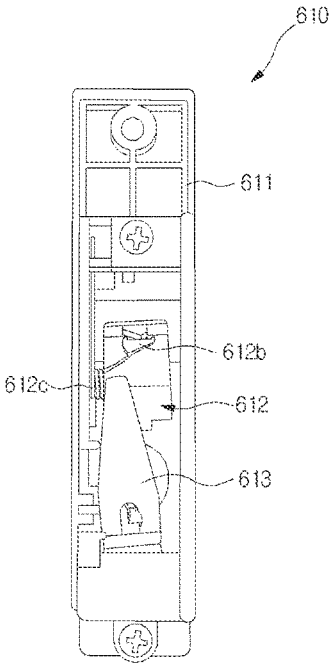
FIG. 28 is a rear view illustrating a locking assembly when a stopper is pushed by a latch rod, according to an embodiment.

The latch cam 612 is rotatably disposed within the locking assembly case 611, and the rotated latch cam 612 can return its original position by a torsion spring 612c (refer to FIG. 28). The latch cam 612 is provided with a hook insertion part 612a that receives and catches the latch hook 341. The hook insertion part 612a is recessed to be selectively coupled with the latch hook 341. Thus, when the second door 340 is closed, the latch hook 341 inserted through the latch slot 317 pushes and rotates the latch cam 612. When the latch cam 612 rotates and the latch hook 341 is caught to the hook insertion part 612a, the latch hook 341 is confined by the latch cam 612. A catching part 612b such as a protrusion or a stepped part may be disposed at an outer side surface of the latch cam 612. The catching part 612b is illustrated in detail in FIG. 28, but the present disclosure is not limited thereto.

The stopper 613 is disposed at the lower side of the latch cam 612 to selectively limit the rotation of the latch cam 612. The lower end of the stopper 613 may be coupled to the locking assembly case 611 using a method such as shaft-coupling to rotate left and right or back and forth. The upper end of the stopper 613 is bent forward to selectively contact the catching part 612b. The upper end of the stopper 613 moves along a surface of the catching part 612b when the latch cam 612 rotates. The stopper 613 may be connected to a side of the locking assembly case 611 through an elastic member 614 (refer to FIG. 27) such as a spring, and returns its original position by the elasticity of the elastic member 614, after moving back and forth or left and right.

A rod installation part 616 is disposed at the front side of the stopper 613, and the latch rod 615 can move back and forth within the rod installation part 616. The rod installation part 616 is open to the front side of the locking assembly case 611. In this case, the rod installation part 616 is disposed at a position corresponding to the position of the push rod 633.

The latch rod 615 may be movable back and forth within the rod installation part 616. The front end of the latch rod 615 is disposed in the rod hole 621 provided to the locking device cover 620, and the rear end contacts the stopper 613. A rod support 615a may protrude outward from the latch rod 615 and interfere with the rod installation part 616 to limit a forward movement. Since the latch rod 615 is supported by the elastic member 617 such as a spring, when external force is removed after the latch rod 615 moves rearward, the latch rod 615 returns to its original position by the elastic force of the elastic member 617.

Thus, when the rear end of the push rod 633 presses the front end of the latch rod 615, and the latch rod 615 moves rearward, the latch rod 615 pushes the stopper 613. At this point, the stopper 613 is pushed rearward and is removed from the catching part 612b of the latch cam 612. Simultaneously, the latch cam 612 is rotated forward by the resilient force of the torsion spring 612c, and the latch cam 612 and the latch hook 341 are allowed to be removed from each other.

Figure 29:
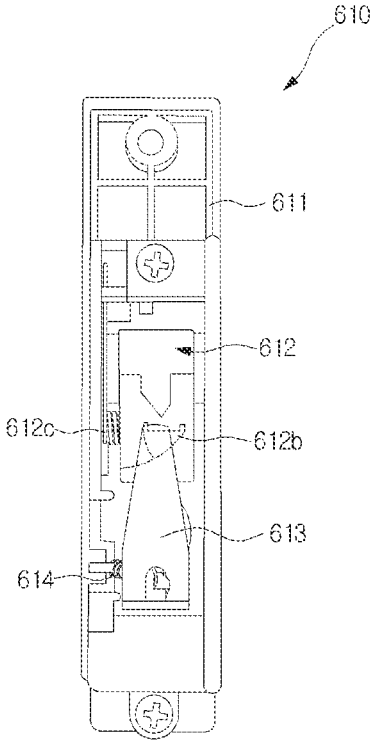
FIG. 29 is a rear view illustrating a locking assembly when a second door is closed and a stopper is caught to a latch cam, according to an embodiment.

FIG. 28 is a rear view illustrating a locking assembly when a stopper is pushed by a latch rod, according to an embodiment. FIG. 29 is a rear view illustrating a locking assembly when a second door is closed and a stopper is caught to a latch cam, according to an embodiment.

Referring to FIG. 28, when the latch rod 615 pushes the stopper 613, the bent upper end of the stopper 613 is removed from the catching part 612b of the latch cam 612. Then, the latch cam 612 is rotated forward by the resilient force of the torsion spring 612c installed on the rotation shaft of the latch cam 612. Thus, the hook part 341b is allowed to be removed from the latch cam 612.

The elastic member 614 is connected to the stopper 613, and an end of the elastic member 614 is disposed at a position laterally spaced apart from the other end as illustrated in FIG. 27. Thus, when the stopper 613 is pressed rearward by the latch rod 615, the stopper 613 is rotated by the elastic force of the elastic member 614. Thus, as illustrated in FIG. 28, when being pressed by the latch rod 615, the stopper 613 slightly rotates left. However, this is just one embodiment, and thus, the elastic member 614 may be bent back and forth without the left rotation.

Referring to FIG. 29, while the second door 340 is closed, the hook part 341b pushes the latch cam 612 rearward. Then, the latch cam 612 rotates rearward, and the outer circumferential surface of the latch cam 612 rotates, contacting the bent upper end of the stopper 613. Then, the upper end of the stopper 613 is caught to the catching part 612b disposed on the outer circumferential surface of the latch cam 612.

Hereinafter, opening and closing of a second door of a refrigerator door configured as described above will now be described in more detail with reference to the accompanying drawings according to an embodiment.

Figure 30:
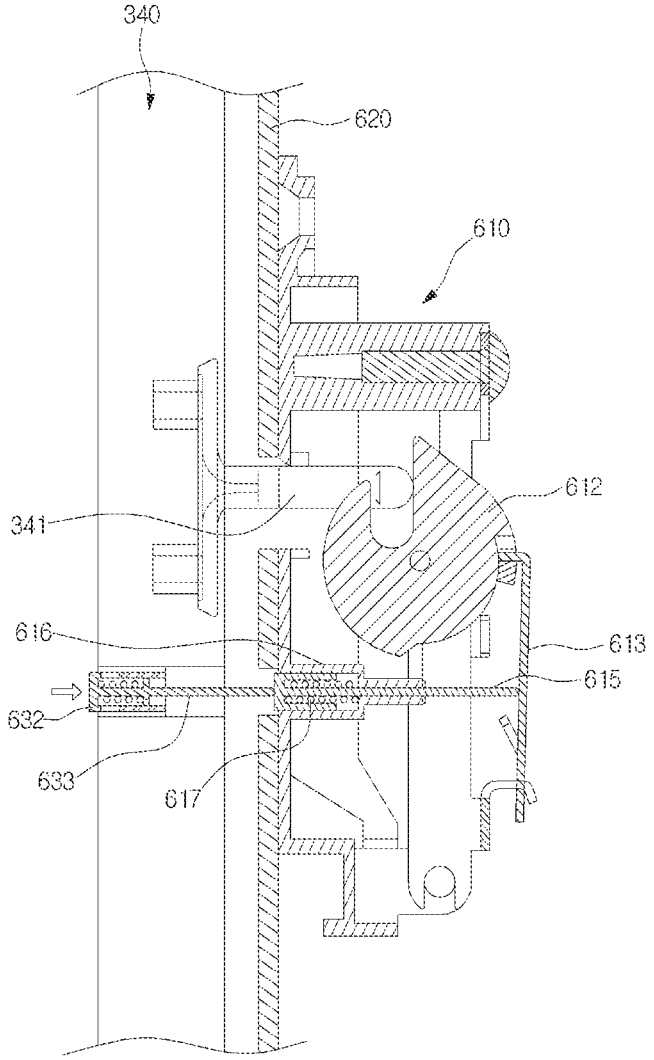
FIG. 30 is a schematic view illustrating the locking device and the opening unit when the second door is closed, according to an embodiment.
Figure 31:
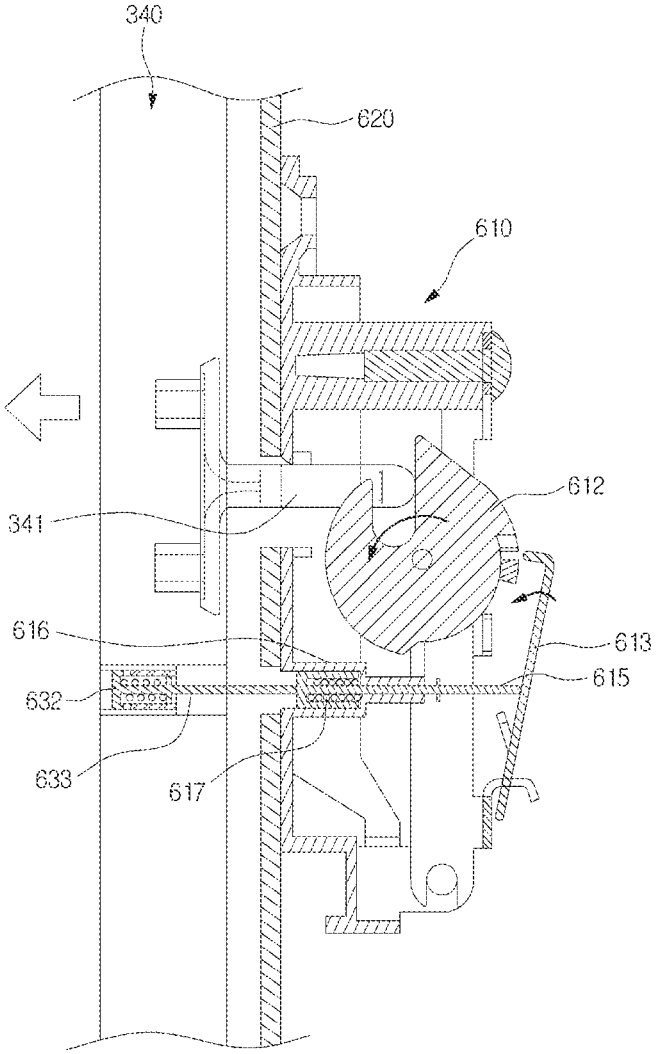
FIG. 31 is a schematic view illustrating the locking device and the opening unit when the opening unit is operated, according to an embodiment.
Figure 32:
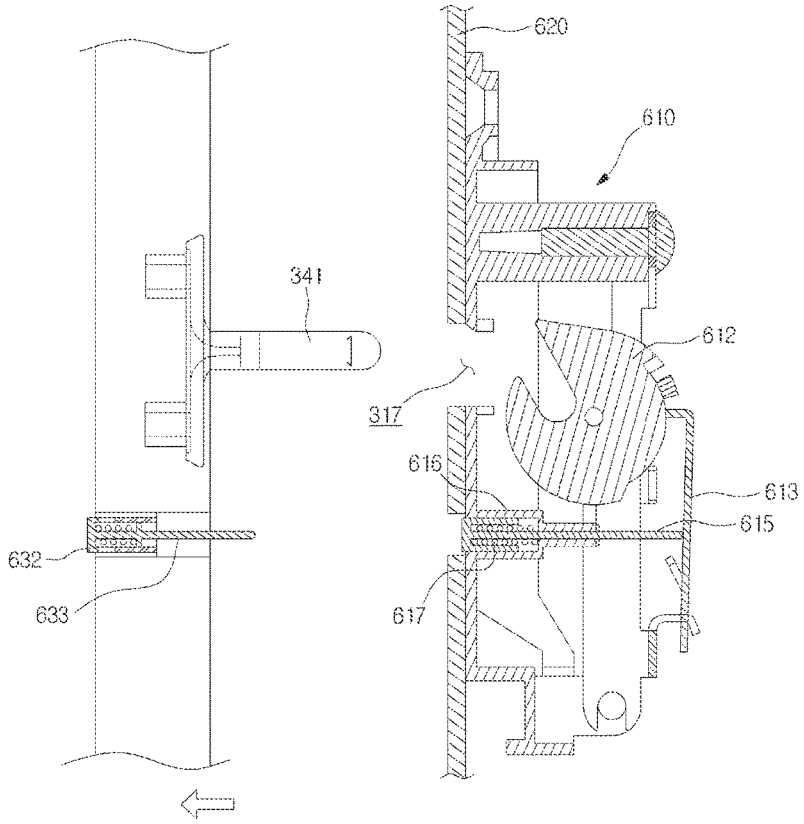
FIG. 32 is a schematic view illustrating the locking device and the opening unit when the second door is opened, according to an embodiment.

FIG. 30 is a schematic view illustrating a locking device and an opening unit when a second door is closed according to an embodiment. FIG. 31 is a schematic view illustrating the locking device and the opening unit when the opening unit is operated. FIG. 32 is a schematic view illustrating the locking device and the opening unit when the second door is opened.

Referring to FIGS. 30 to 32, while the second door 340 is closed, the hook part 341b of the latch hook 341 is inserted in the latch slot 317 as illustrated in FIG. 30. At this point, the hook part 341b is inserted in and caught to the hook insertion part 612a provided to the latch cam 612. In addition, the stopper 613 is caught to the catching part 612b of the latch cam 612 to stop the rotation of the latch cam 612.

In this state, a user operates the opening unit 630 to open the second door 340. In detail, the user presses the operation button 632 to open the second door 340. Then, as illustrated in FIG. 31, the push rod 633 is moved rearward (right side in FIG. 31). Then, the latch rod 615 contacting the push rod 633 is also moved rearward. Then, the latch rod 615 presses the stopper 613 rearward, and thus, the upper end of the stopper 613 is removed from the catching part 612b. Then, the latch cam 612 is rotated forward (counterclockwise in FIG. 31) by the resilient force of the torsion spring 612c. Simultaneously, the second door 340 is opened by the elastic resilient force of the gasket 344 and the torque of the latch cam 612. Thus, the hook part 341b of the latch hook 341 is removed from the hook insertion part 612a and taken out of the latch slot 317. As a result, the second door 340 is completely released as illustrated in FIG. 32.

While the push rod 633 and the latch rod 615 are moved rearward by pressing the operation button 632 to open the second door 340, the elastic members 617 and 634 supporting the push rod 633 and the latch rod 615 are compressed. Then, when the operation button 632 is released, the resilient force of the elastic members 617 and 634 returns the operation button 632, the push rod 633, and the latch rod 615 to their original positions.

As illustrated in FIG. 32, when the second door 340 is opened, the latch cam 612 rotates forward, and an entrance of the hook insertion part 612a faces the latch slot 317. At this point, the stopper 613 is disposed at the lower side of the latch cam 612 and contacts the outer circumferential surface of the latch cam 612.

In this state, when the second door 340 is closed again, the hook part 341b of the latch hook 341 is inserted into the latch slot 317, and then, is caught to the hook insertion part 612a. At this point, the hook part 341b pushes the rear surface of the hook insertion part 612a, and the latch cam 612 is rotated rearward (clockwise). Then, the torsion spring 612c is compressed, and the latch cam 612 rotates in the state where the outer circumferential surface of the latch cam 612 contacts the upper end of the stopper 613. Then, the upper end of the stopper 613 is caught to the catching part 612b of the latch cam 612 as illustrated in FIG. 30.

In summary, a release member for releasing the confined state of the locking unit, particularly, a release member for releasing the coupling (or confined state) between the latch hook 341 and the latch cam 612 includes a first member including the operation button 632, the push rod 633, and the elastic member 634, and a second member including the latch rod 615 and the elastic member 617.

A refrigerator according to the present disclosure will be described according to various embodiments. Hereinafter, a refrigerator will now be described according to another embodiment.

In the refrigerator according to the current embodiment, an input member that is provided to the second door and can input an electrical signal is manipulated to operate an actuator provided to the locking device, and the actuator operates to release the coupling between the locking device and the latch hook, so that the second door can be opened.

Thus, in the current embodiment, the rest parts except for the input member and the actuator is the same as the previous embodiments, a description thereof will be omitted, and like reference numeral denote like elements.

Figure 33:
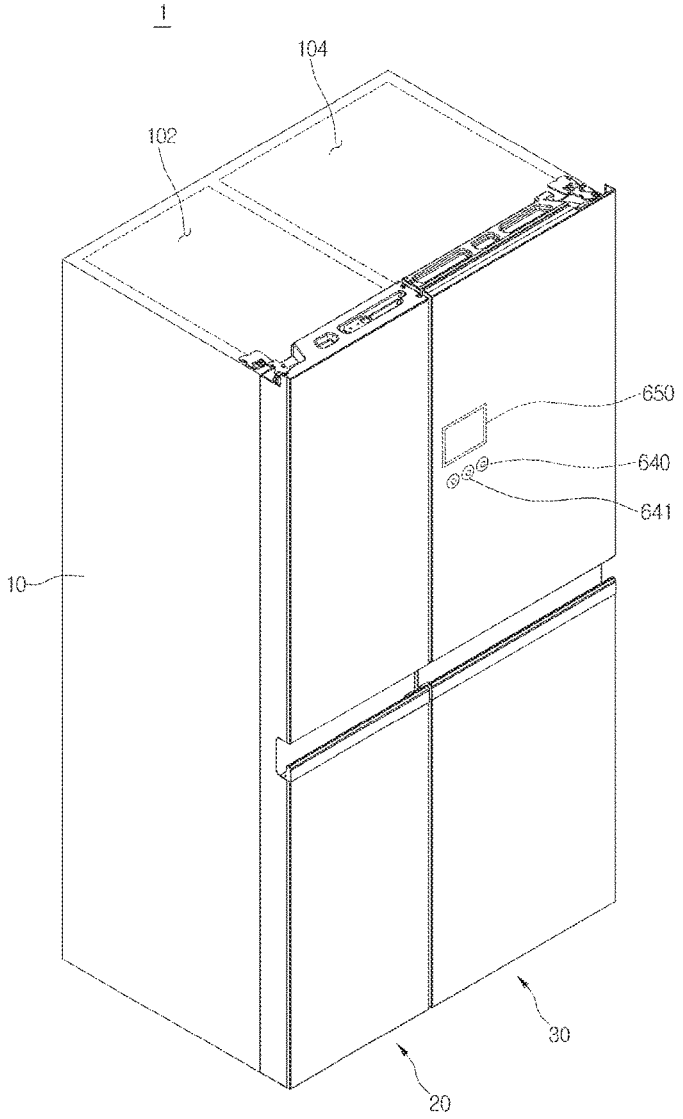
FIG. 33 is a perspective view illustrating a refrigerator according to an embodiment.
Figure 34:
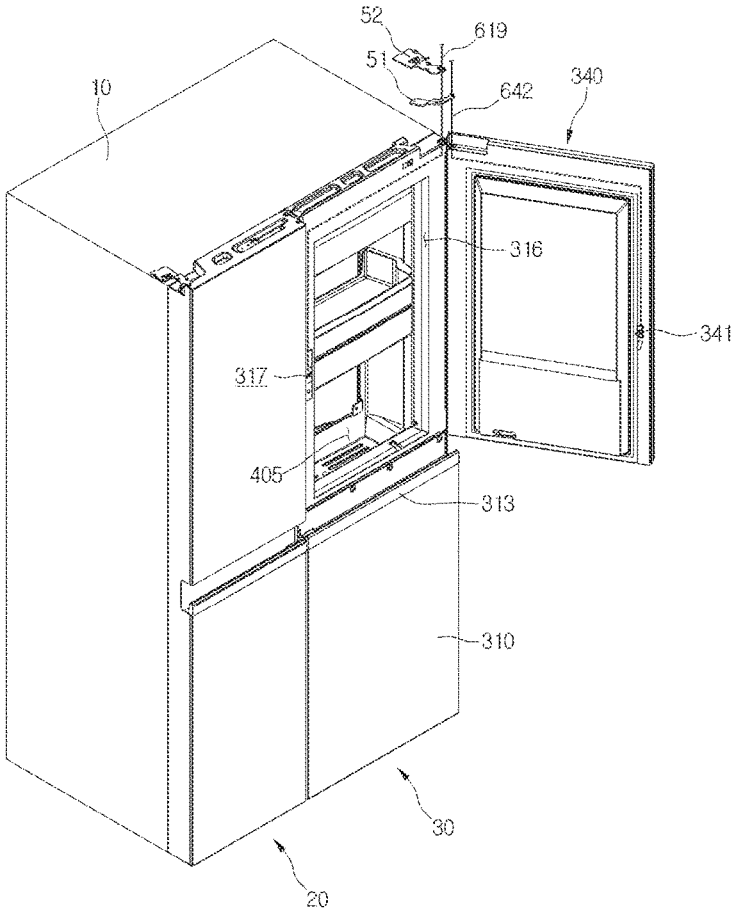
FIG. 34 is a perspective view illustrating a refrigerator when a second door is opened, according to an embodiment.
Figure 35:
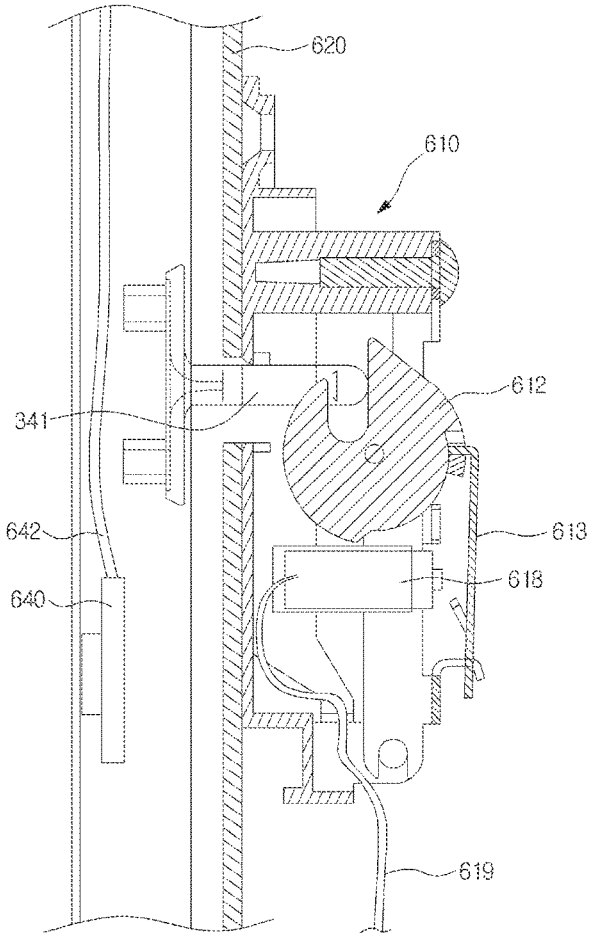
FIG. 35 is a schematic view illustrating a locking unit when the second door is closed.
Figure 36:
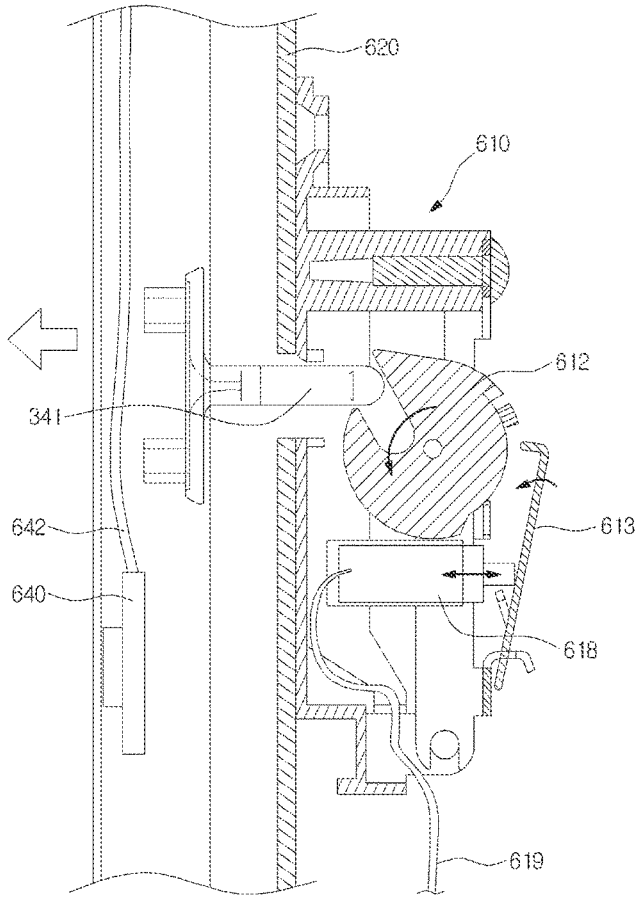
FIG. 36 is a schematic view illustrating the locking unit when a signal for opening the second door is input.

FIG. 33 is a perspective view illustrating a refrigerator according to an embodiment. FIG. 34 is a perspective view illustrating the refrigerator of FIG. 33 when a second door is opened. FIG. 35 is a schematic view illustrating a locking unit when the second door of FIG. 34 is closed. FIG. 36 is a schematic view illustrating the locking unit of FIG. 35 when a signal for opening the second door is input.

Referring to FIGS. 33 to 36, the second door 340 may be provided with an input member 640 for uncoupling the locking unit. The input member 640 may convert a user's operation to an electrical signal and transmit the electrical signal to an actuator 618 of the locking device 60.

The input member 640 may be disposed on the rear side or the rear surface of the door plate 343 (refer to FIG. 24) constituting the front appearance of the second door 340. Thus, the input member 640 is not exposed directly to the outside of the second door 340. However, to manipulate the input member 640, a print part 641 may be disposed on the door plate 343 at a portion corresponding to the input member 640 to display the position of the input member 640.

The input member 640 includes a touch switch that senses a variation in electrostatic capacity to operate, or a pressure switch. However, the present disclosure is not limited to the switches provided that a user's operation is sensed. Even in this case, the input member 640 may be provided to the rear surface of the door plate 343. The input member 640 may be provided in plurality if necessary, and, in this case, the input members 640 may be manipulated to control the refrigerator 1.

The second door 340 may include a display 650. The display 650 may be disposed at the rear side of the second door 340 to contact the rear surface of the door plate 343. Thus, while the display 650 is turned off, the display 650 is not visible on the door plate 343, and when the display 650 is turned on, information can be displayed through the door plate 343. The input member 640 may be integrally formed with the display 650.

An electric wire 642 connected to the input member 640 and the display 650 passes through the second door 340, and is guided to the outside through the hinge shaft of the second hinge 51. At this point, when a ground wire is disposed within the second door 340, the electric wire 642 together with the ground wire may be guided to the outside through the hinge shaft of the second hinge 51. An electric wire 619 and the electric wire 642 may be connected to a main controller (not shown) provided to the cabinet 10 through the first hinge 52.

The locking device 60 may include the locking assembly 610 that is installed at the inside of the first door 310, and the locking device cover 620 that shields the locking assembly 610. The locking assembly 610 includes the locking assembly case 611, the latch cam 612 that is installed within the locking assembly case 611 to confine the latch hook 341, the stopper 613 that selectively limits the rotation of the latch cam 612, and the actuator 618 that moves the stopper 613 to allow the rotation of the latch cam 612. The configuration of the locking device 60 except for the actuator 618 is the same as that of the previous embodiment.

The actuator 618 may include a solenoid. When an operation signal is input to the actuator 618, the actuator 618 pushes the stopper 613 to release the latch cam 612. The operation signal is transmitted to the actuator 618 by manipulating the input member 640, and the actuator 618 momentarily pushes the stopper 613, and then, returns its original position.

Alternatively, the actuator 618 may include another power member or mechanism, and may selectively push the stopper 613 to release the latch cam 612.

The electric wire 619 connected to the actuator 618 passes through the first door 310, and is guided to the outside of the first door 310 through the hinge shaft of the first hinge 52. The electric wire 619 guided to the outside of the first door 310, and the electric wire 642 guided to the outside through the second hinge 51 may be connected to the main controller of the cabinet 10. Also at this point, when a ground wire is disposed within the first door 310, the electric wire 619 together with the ground wire may be guided to the cabinet 10. Thus, when the input member 640 is manipulated, an operation signal is transmitted to the actuator 618 to release the locking unit.

In detail, when the second door 340 is completely closed, the latch hook 341 is fixed to the hook insertion part 612a of the latch cam 612 as illustrated in FIG. 35. Thus, the second door 340 is maintained in the closing state.

In this state, a user touches the print part 641 to open the second door 340 as illustrated in FIG. 36. Then, the input member 640 senses the touch and transmits an operation signal to the main controller, and the main controller commands the actuator 618 to operate.

At this point, the actuator 618 pushes the stopper 613, and the stopper 613 is removed from the latch cam 612, and the latch cam 612 rotates counterclockwise (in FIG. 36) by the resilient force of the stopper 613. When the latch cam 612 rotates, the latch hook 341 and the latch cam 612 are released from each other, and the latch hook 341 is removed to the outside through the latch slot 317. In this state, the second door 340 can freely rotate.

When the opened second door 340 is closed, the latch hook 341 is inserted into the latch slot 317 to rotate the latch cam 612, and is fixed to the hook insertion part 612a to maintain the closing state, as illustrated in FIG. 35.

In the current embodiment, a release member may includes a first member that includes the input member 640 provided to the first door 310, and the actuator 618 provided to the second door 340.

Figure 37:
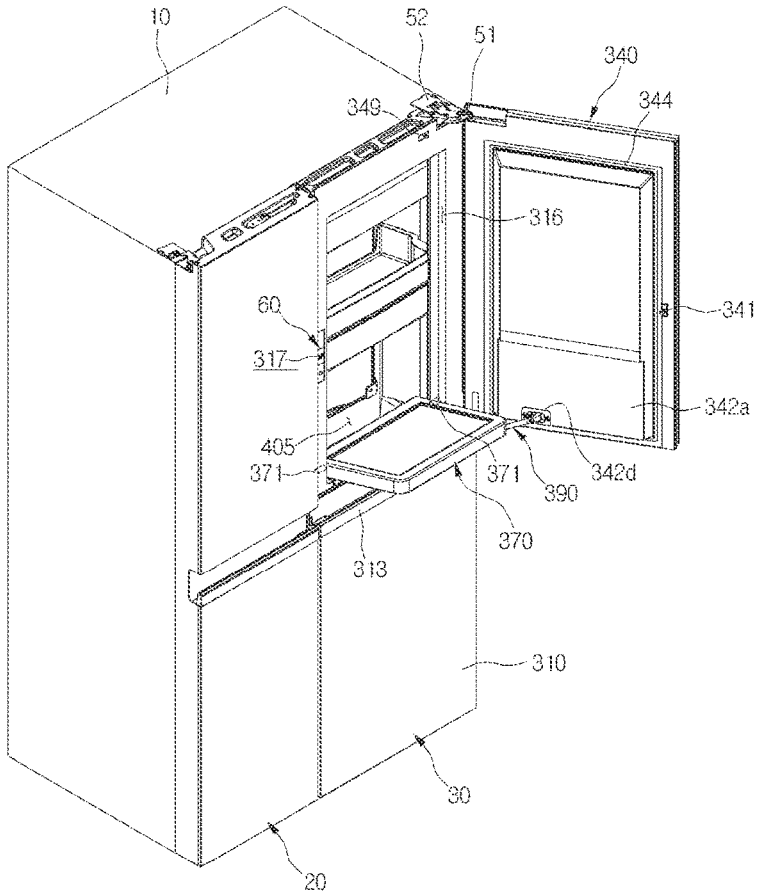
FIG. 37 is a perspective view illustrating a refrigerator when a second door is opened, according to an embodiment.

FIG. 37 is a perspective view illustrating a refrigerator when a second door is opened according to an embodiment.

Referring to FIG. 37, as described above, the rear surface of the second door 340 may be provided with the protrusion part 342a. The protrusion part 342a includes a stepped part at the lower portion, and a shelf 370 to be described later is vertically stored in the stepped part.

Thus, the depth of the stepped part may correspond to the thickness of the shelf 370.

In detail, the shelf 370 that is rotatable forward is disposed at a side of the first door 310, and a connection assembly 390 that connects the shelf 370 to the second door 340 is disposed at a side of the second door 340. Thus, the rotation of the shelf 370 is linked with the opening and closing of the second door 340.

The shelf 370 is coupled to the inner edge of the opening 316 such that the shelf 370 can rotate up and down. Shelf rotation shafts 317 are disposed at the left and right sides of the shelf 370, and are inserted in both side edges of the opening 316 at the lower end of the opening 316. Alternatively, the shelf rotation shafts 317 may protrude from the inner edge of the opening 316 and are inserted in the side edges of the shelf 370.

The shelf 370 may have a width corresponding to the lateral width of the opening 316, so that the shelf 370 can be stored in the opening 316. The width of the shelf 370 may correspond to the width of the protrusion part 342a, so that the shelf 370 can be stored in the protrusion part 342a when the second door 340 is closed, as illustrated in FIG. 37.

A connection assembly installation part 342d is disposed at the lower side of the rear surface of the second door 340. The connection assembly installation part 342d may be disposed on the protrusion part 342a of the second door 340, and is recessed to receive an end of the connection assembly 390.

Hereinafter, the shelf 370 will now be described in more detail with reference to the accompanying drawings.

Figure 38:
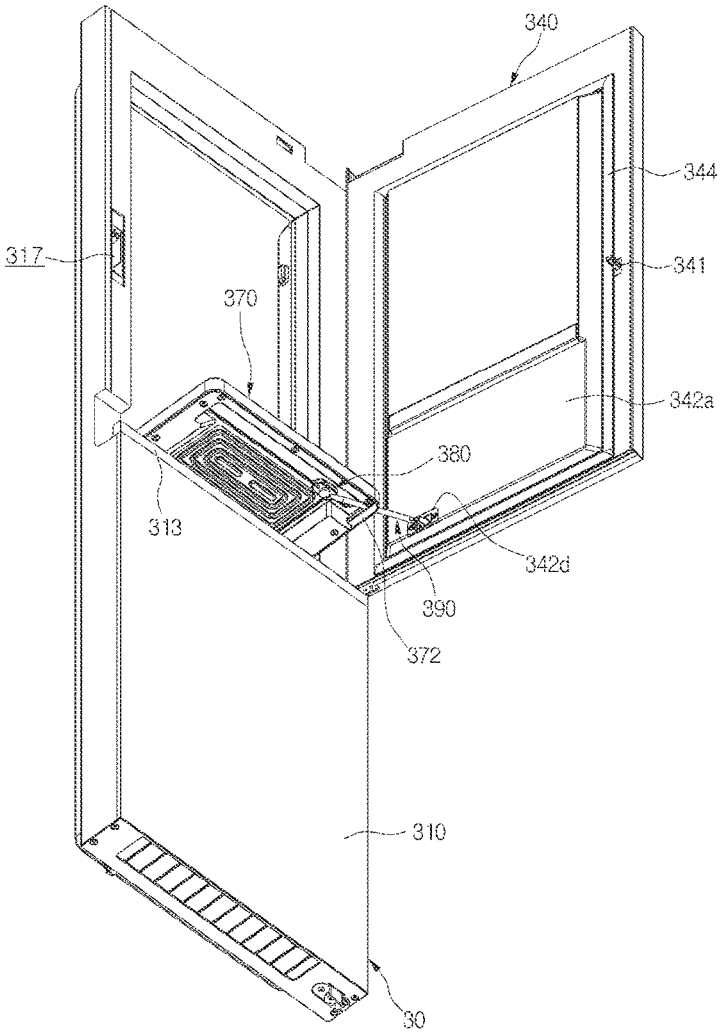
FIG. 38 is a schematic view illustrating a shelf rotated by the opening of the second door.
Figure 39:
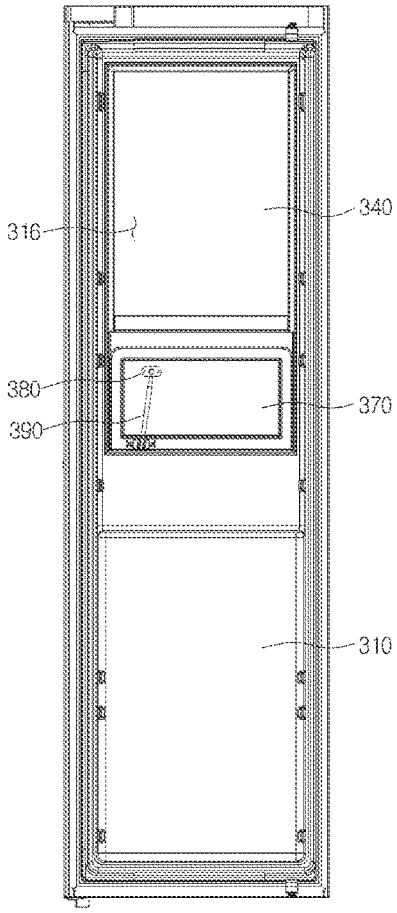
FIG. 39 is a schematic view illustrating the rear surface of a first door when the second door is closed.
Figure 40:
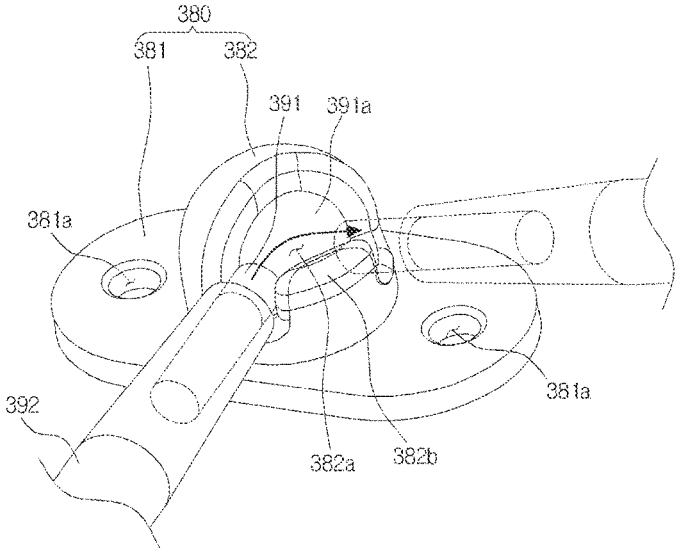
FIG. 40 is a schematic view illustrating a joint member coupled to a connection assembly according to an embodiment.

FIG. 38 is a schematic view illustrating the shelf of FIG. 37 rotated by the opening of the second door. FIG. 39 is a schematic view illustrating the rear surface of the first door of FIG. 37 when the second door of FIG. 38 is closed. FIG. 40 is a schematic view illustrating a joint member coupled to the connection assembly, according to an embodiment.

Referring to FIGS. 38 to 40, the bottom surface of the shelf 370 may be provided with a joint member 380 that is coupled with the connection assembly 390. The joint member 380 may include a joint coupling part 381 that is coupled with the shelf 370, and a joint receiving part 382 in which an end of the connection assembly 390 is rotatably disposed.

In detail, the joint coupling part 381 has a plate shape, and screw holes 381a are disposed respectively at both sides of the joint coupling part 381 such that the joint coupling part 381 is coupled with the shelf 370. Thus, the joint member 380 is installed on the shelf 370 by screws coupled to the screw holes 381a.

The joint receiving part 382 receives a ball-shaped bearing 391a constituting the connection assembly 390, so that the bearing 391a is surrounded by the joint receiving part 382. The joint coupling part 381 that constitutes the bottom surface of the joint receiving part 382 is open to receive the bearing 391a. A side of the joint receiving part 382 is provided with a cutout part 382a that is cut to define a rotation path of a joint rod 391.

The shape of the cutout part 382a defines a portion of a movement path of the joint rod 391, and the cutout part 382a prevents the bearing 391a from being removed from the joint receiving part 382. A guide part 382b protrudes from a side of the cutout part 382a.

When the shelf 370 is completely folded and completely unfolded, the bearing 391a is disposed in recesses at both ends of the cutout part 382a.

A side of the shelf 370 may be provided with a confining member 372 (refer to FIG. 38) that confines the connection assembly 390. The confining member 372 is disposed on the bottom surface of the shelf 370, and the connection assembly 390 passes through the confining member 372. Thus, the connection assembly 390 is prevented from moving along an unintended path when the shelf 370 rotates.

Figure 41:
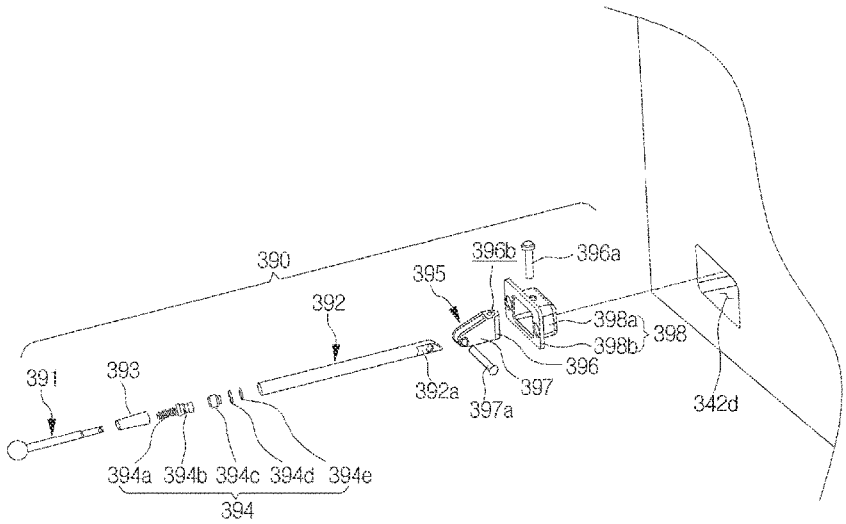
FIG. 41 is an exploded perspective view illustrating a connection assembly according to an embodiment.

FIG. 41 is an exploded perspective view illustrating a connection assembly according to an embodiment. (a), (b) and (c) in FIG. 42 are schematic views illustrating an operation of the connection assembly.

Figure 42A:
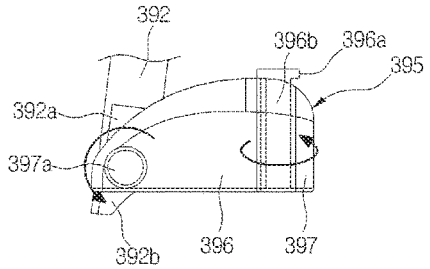
FIGS. 42A, 42B and 42C are schematic views illustrating an operation of the connection assembly.
Figure 42B:
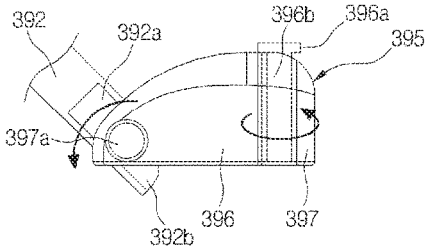
Figure 42C:
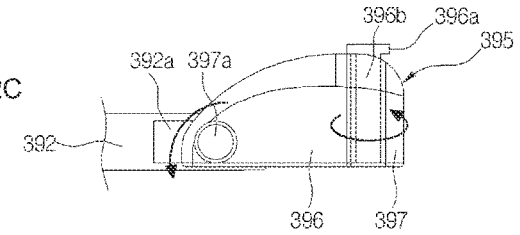

Referring to FIGS. 41, 42, the connection assembly 390 includes the joint rod 391 connected to the joint member 380, a damping unit 394 that adjusts the length of the joint rod 391 and absorbs shock during the movement of the joint rod 391, an installation member 398 installed on the connection assembly installation part 342d of the second door 340, a connection member 395 rotatably coupled to the installation member 398, and a connecting rod 392 that connects the joint rod 391 to the connection member 395.

In detail, an end of the joint rod 391 is provided with the sphere-shaped bearing 391a that is rotatably coupled to the joint member 380. The other end of the joint rod 391 is inserted in the connecting rod 392. The joint rod 391 goes in and out of the connecting rod 392 according to movement paths of the connection assembly 390 during the rotation of the shelf 370.

The connecting rod 392 receives an end of the joint rod 391, and may be shaft-coupled to the connection member 395. In detail, a hollow part having a predetermined length from an end of the connecting rod 392 is formed in the connecting rod 392 to receive the joint rod 391 and the damping unit 394. The end of the connecting rod 392 is provided with a rod cap 393 in which the joint rod 391 is inserted. The rod cap 393 may be coupled to the end of the connecting rod 392. Both ends of the rod cap 393 may be open to receive the joint rod 391 and at least one portion of the damping unit 394. The other end of the connecting rod 392 is provided with a rod connection part 392a. The rod connection part 392a may be disposed within the connection member 395, and the rod connection part 392a is rotatably connected to an end of the connection member 395 through a rod shaft 397a. Thus, the connecting rod 392 can rotate about the rod shaft 397a. The other end of the connection member 395 is rotatably connected to the installation member 398 through a rotation shaft 396a. The rotation center of the connecting rod 392 is perpendicular to the rotation center of the connection member 395. That is, the rotation shaft 396a is vertically inserted in the installation member 398, and the rod shaft 397a is horizontally connected to the connection member 395.

An end 392b of the rod connection part 392a has a curved surface with a predetermined curvature as illustrated in (b) of FIG. 42. Thus, while the connecting rod 392 rotates according to the rotation of the second door 340, even when a user's hand contacts the connecting rod 392, the hand is not caught to the connecting rod 392 and slips along the curved surface, thus preventing an accident.

The damping unit 394 is disposed in the connecting rod 392 and supports an end of the joint rod 391 to absorb the shock caused by the moving joint rod 391. The damping unit 394 includes a spring 394a that supports the end of the joint rod 391, a stopper 394b that slides within the connecting rod 392 and supports the spring 394a, an O-ring 394c installed on the stopper 394b and contacting the inner surface of the connecting rod 392 to provide frictional force, a washer 394d installed on the stopper 394b to prevent the removal of the O-ring 394c, and a snap ring 394e that fixes the washer 394d and prevents the movement of the stopper 394b.

When the shelf 370 rotates, since the joint rod 391 goes in or out of the connecting rod 392 through the damping unit 394, the shelf 370 can efficiently rotates. When the joint rod 391 goes in and out of the connecting rod 392, the spring 394a is extended or compressed. Accordingly, the stopper 394b moves to absorb shock transmitted from the joint rod 391 to decelerate the joint rod 391. Since the joint rod 391 is decelerated, a quick rotation of the shelf 370 can be prevented.

In the current embodiment, the damping unit 394 is provided only to an end of the connecting rod 392, but the damping unit 394 may be provided to both ends of the connecting rod 392, so that the connecting rod 392 can experience stroke variations at both the ends of the connecting rod 392.

The installation member 398 is inserted in the connection assembly installation part 342d, and may include a cup 398a that defines a receiving space for the connection member 395, and a flange 398b disposed around the cup 398a and coupled to the second door 340 through screws.

In detail, the connection member 395 more effectively rotates the connection assembly 390, and is rotatably connected to the installation member 398 through the rotation shaft 396a. The connection member 395 includes a shaft coupling part 396 through which the rotation shaft 396a passes, and a receiving rib 397 that receives the rod connection part 392a. The shaft coupling part 396 has a shaft insertion hole 396b that is vertically open. The rotation shaft 396a passes through the cup 398a, and is installed in the shaft insertion hole 396b. Thus, the rotation shaft 396a functions as the rotation center of the connection member 395. The connecting rod 392 is disposed within the receiving rib 397 that may be disposed at both sides of the connecting rod 392 to move the connecting rod 392 up and down. The rod shaft 397a passes through the receiving rib 397 and the rod connection part 392a to rotate the connecting rod 392.

Thus, the connecting rod 392 can rotate up and down and left and right through the connection member 395, and the connecting rod 392 freely rotates during the opening and closing of the second door 340, so that the shelf 370 can be smoothly folded or unfolded.

Hereinafter, a lower hinge assembly provided to the second door will now be described.

Figure 43:
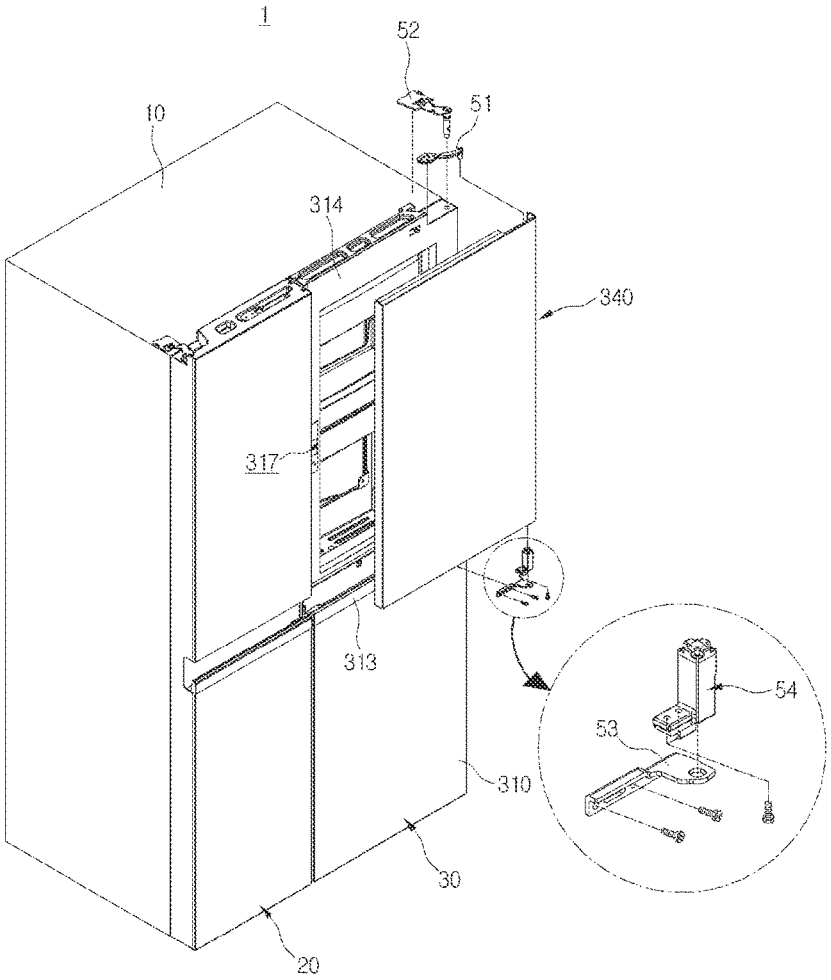
FIG. 43 is an exploded perspective view illustrating an installation structure of the second door.
Figure 44:
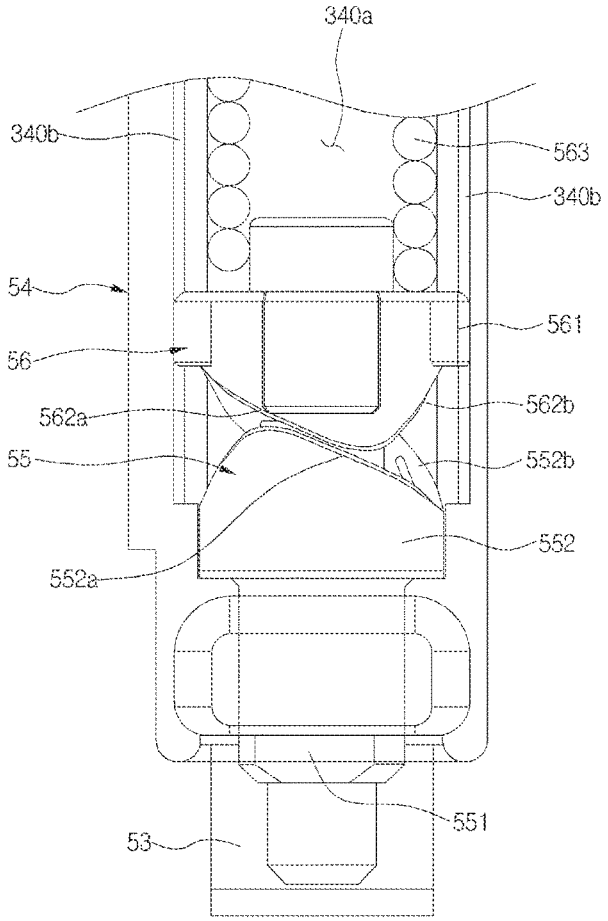
FIG. 44 is a schematic view illustrating a lower hinge assembly when the second door is closed.
Figure 45:
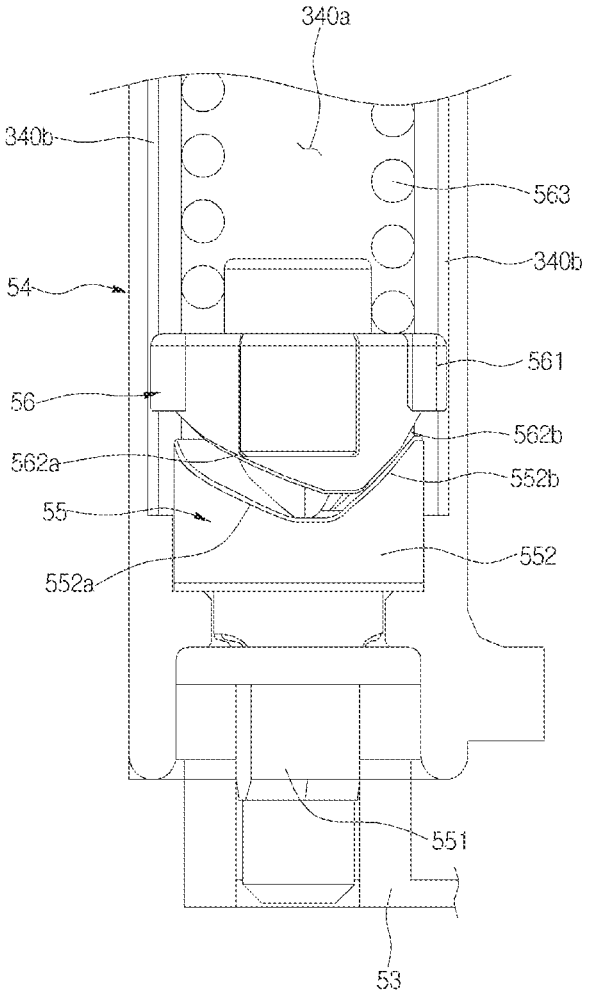
FIG. 45 is a schematic view illustrating the lower hinge assembly when the second door is opened.

FIG. 43 is an exploded perspective view illustrating an installation structure of the second door. FIG. 44 is a schematic view illustrating a lower hinge assembly when the second door is closed. FIG. 45 is a schematic view illustrating the lower hinge assembly when the second door is opened.

Referring to FIGS. 43 to 45, the lower end of the second door 340 is supported by a hinge bracket 53. The hinge bracket 53 is provided to the front surface of the first door 310 to support the second door 340 from the lower side, and is coupled to a lower hinge assembly 54 provided to the second door 340. The lower hinge assembly 54 and the hinge bracket 53 may be formed of a conductive metal.

When the second door 340 is opened, the lower hinge assembly 54 automatically opens the second door 340 through a predetermined angle, and then, prevents the second door 340 from further rotating.

In detail, the lower hinge assembly 54 includes a hinge fixation part 55 fixed to the hinge bracket 53, and a hinge rotation part 56 fixed within the second door 340 and contacting the hinge fixing part 55. The hinge rotation part 56 rotates together with the second door 340, and moves up and down along an upper surface of the hinge fixation part 55.

The hinge fixation part 55 may include an insertion protrusion 551 that is inserted and fixed to the hinge bracket 53, and a lower cam 552 disposed above the insertion protrusion 551. In detail, since the hinge fixation part 55 is fixed to the hinge bracket 53, the hinge fixation part 55 is not affected by the rotation of the second door 340.

In detail, the upper surface of the lower cam 552 includes a first cam surface 552a that is inclined downward, and a second cam surface 552b that is inclined upward from the lower end of the first cam surface 552a. The first cam surface 552a may be continuously connected to the second cam surface 552b to constitute a structure that may be provided continuously in duplicate along the edge of the upper surface of the lower cam 552.

A fixation protrusion 561 may be disposed around the side surface of the hinge rotation part 56. A hinge receiving part 340a is disposed within the second door 340, and the hinge rotation part 56 is installed in the hinge receiving part 340a. A protrusion receiving recess 340b is recessed around the inner surface of the hinge receiving part 340a, and the fixation protrusion 561 is disposed in the protrusion receiving recess 340b. Thus, the hinge rotation part 56 rotates integrally with the second door 340. An upper cam 562 is provided to the lower surface of the hinge rotation part 56. The upper cam 562 is provided with a third cam surface 562a that is inclined downward, and a fourth cam surface 562b that is inclined upward from the lower end of the third cam surface 562a. The third cam surface 562a may be continuously connected to the fourth cam surface 562b to constitute a structure that may be provided continuously in duplicate along the edge of the upper surface of the lower cam 562. The third and fourth cam surfaces 562a and 562b contact the first and second surfaces 552a and 552b in corresponding shapes, respectively.

The upper surface of the hinge rotation part 56 may be supported by an elastic member 563 such as a spring disposed within the hinge receiving part 340a. Thus, the lower surface of the hinge rotation part 56 continually contacts the upper surface of the hinge fixation part 55, and the first and second cam surfaces 552a and 552b of the hinge fixation part 55 and the third cam surface 562a and 562b of the hinge rotation part 56 relatively move contacting each other, according to the rotation of the second door 340.

For example, when the second door 340 is closed, the first cam surface 552a contacts the third cam surface 562a as illustrated in FIG. 44. Since the first cam surface 552a and the third cam surface 562a are inclined downward, when the second door 340 is released, the third cam surface 562a slips downward along the first cam surface 552a by the weight of the second door 340. Thus, the second door 340 is automatically rotated without applying torque to the second door 340.

When the second door 340 is rotated over a predetermined angle to open the second door 340, the first cam surface 552a does not contact the third cam surface 562a any more, and the second cam surface 552b contacts the fourth cam surface 562b. As illustrated in FIG. 45, since the second cam surface 552b and the fourth cam surface 562b are inclined upward in the opening direction, a rotation speed of the second door 340 is gradually decreased.

When the second door 340 rotates through a predetermined angle, for example, about 110°, the second cam surface 552b completely contacts the fourth cam surface 562b as illustrated in FIG. 45. In addition, since the elastic member 563 is sufficiently compressed, the hinge rotation part 56 cannot move upward any more. In this state, the rotation of the second door 340 is stopped or limited.

An angle that limits the opening of the second door 340 may be determined by the curvature of the second cam surface 552b and the fourth cam surface 562b and the elasticity of the elastic member 563, and the second door 340 may be designed to be opened until about 110°, considering the unfolding of the shelf 370 linked with the rotation of the second door 340.

Hereinafter, an operation of a second door of a refrigerator will now be described according to an embodiment.

When the second door 340 is closed, the shelf 370 is folded to stand vertically and is closely adhered to the protrusion part 342a. After the shelf 370 is folded, the connection assembly 390 is also closely adhered to the shelf 370.

In this state, when the latch hook 341 is released to open the second door 340, the lower hinge assembly 54 operates simultaneously with the releasing of the latch hook 341, so that the second door 340 automatically rotates.

At this time, the shelf 370 connected through the connection assembly 390 rotates downward and unfolded until the shelf 370 is positioned horizontally. The connection assembly 390 rotates according to the rotation of the shelf 370. The shelf 370 is slowly moved downward by the damping unit 394.

The second door 340 is automatically opened by the lower hinge assembly 54 until a predetermined angle, and is stopped when the shelf 370 is positioned horizontally. At this point, the second door 340 is disposed at about 110°, and the second door 340 is gradually decelerated by the lower hinge assembly 54 and stopped just before the shelf 370 is completely unfolded to be positioned horizontally.

When the shelf 370 is completely unfolded, the connection assembly 390 is also positioned horizontally to support the shelf 370. At this point, the lower surface of the shelf 370 is supported by the lower end of the opening 316, so that the shelf 370 is maintained in a stable state. After the shelf 370 is completely unfolded, the joint rod 391 of the connection assembly 390 is continually disposed in the end of the cutout part 382a of the joint member 380. The lower hinge assembly 54 prevents the second door 340 from being further opened, and thus, the shelf 370 is maintained in a further stable state.

Figure 46:
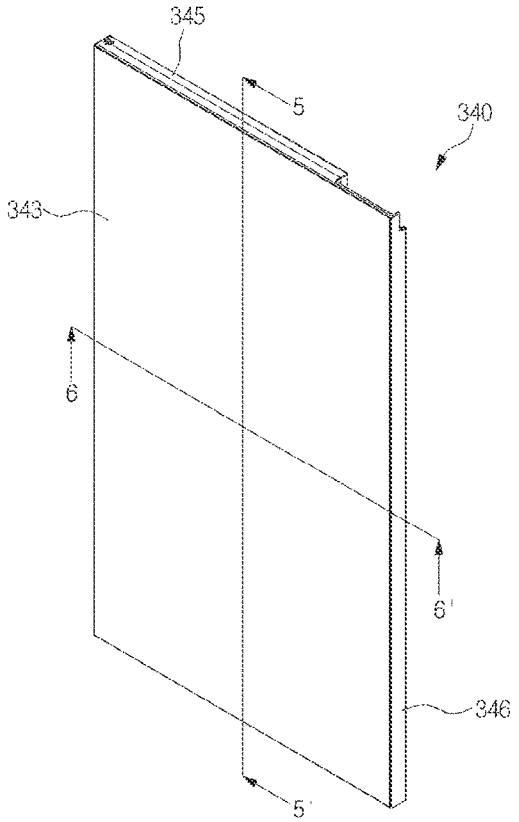
FIG. 46 is a perspective view illustrating the second door.
Figure 47:
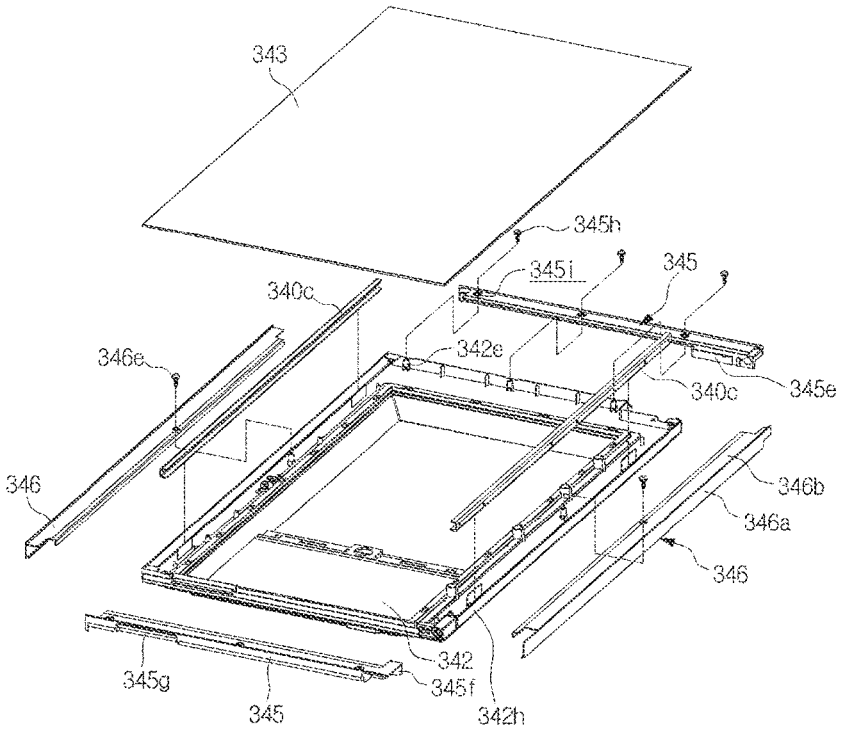
FIG. 47 is an exploded perspective view illustrating the front side of the second door.
Figure 48:
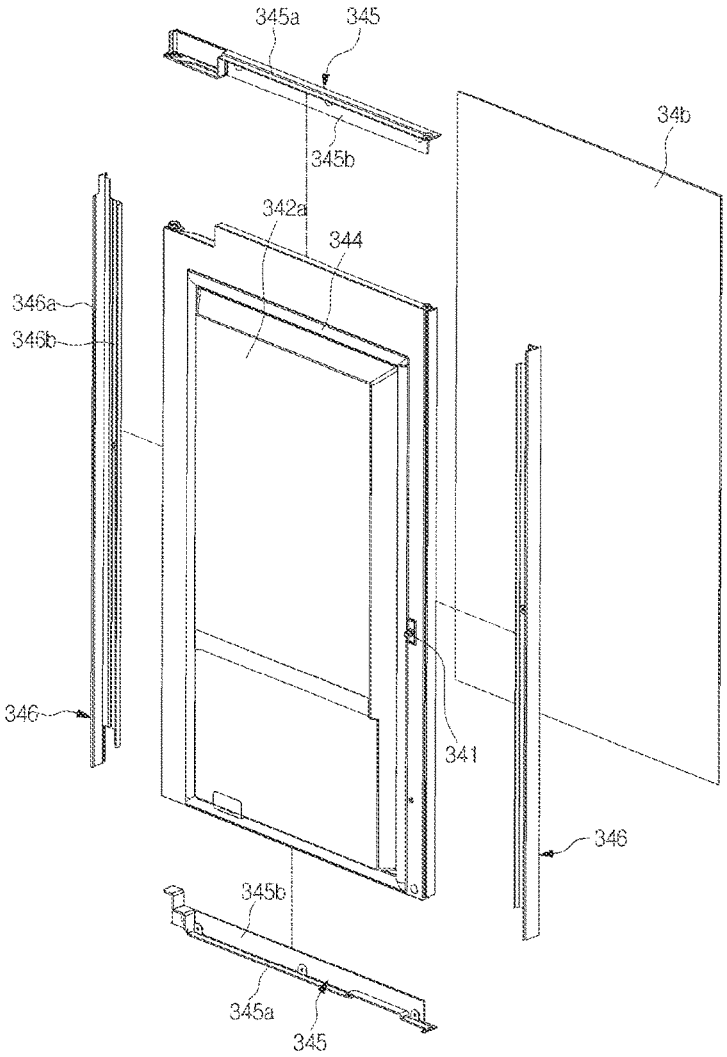
FIG. 48 is an exploded perspective view illustrating the rear side of the second door.
Figure 49:
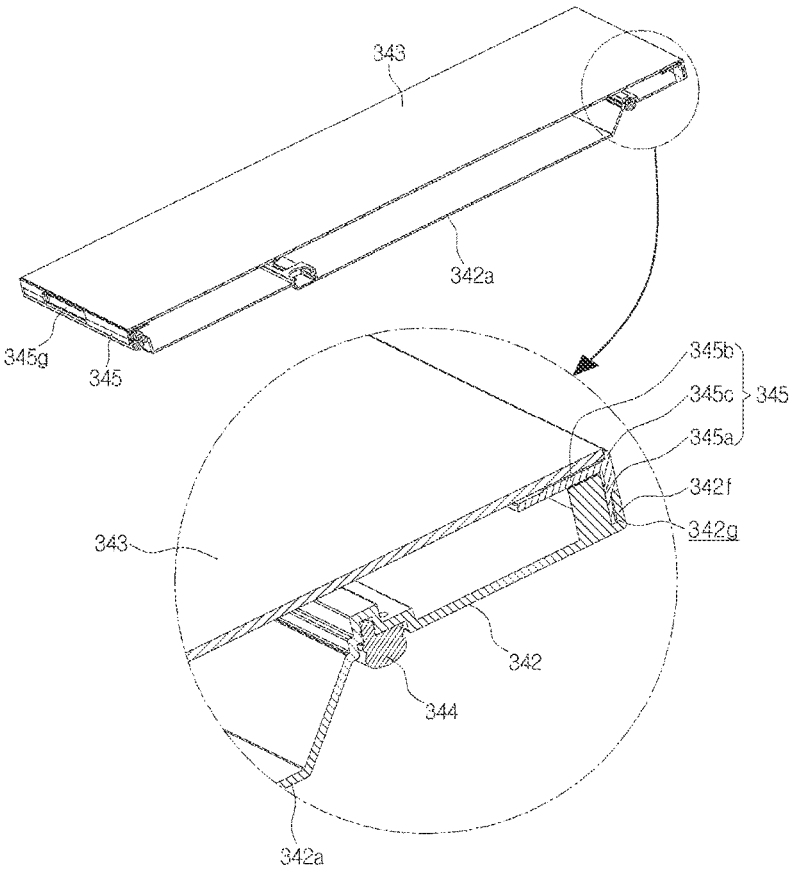
FIG. 49 is a cross-sectional view taken along line 7-7' of FIG. 46.
Figure 50:
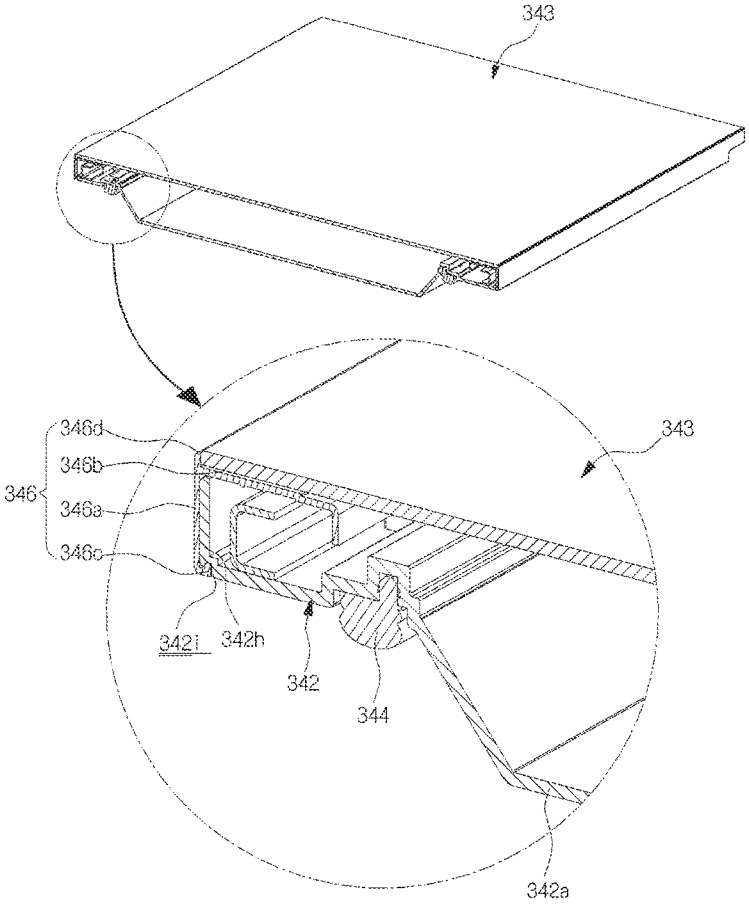
FIG. 50 is a cross-sectional view taken along line 8-8' of FIG. 46.
Figure 51:
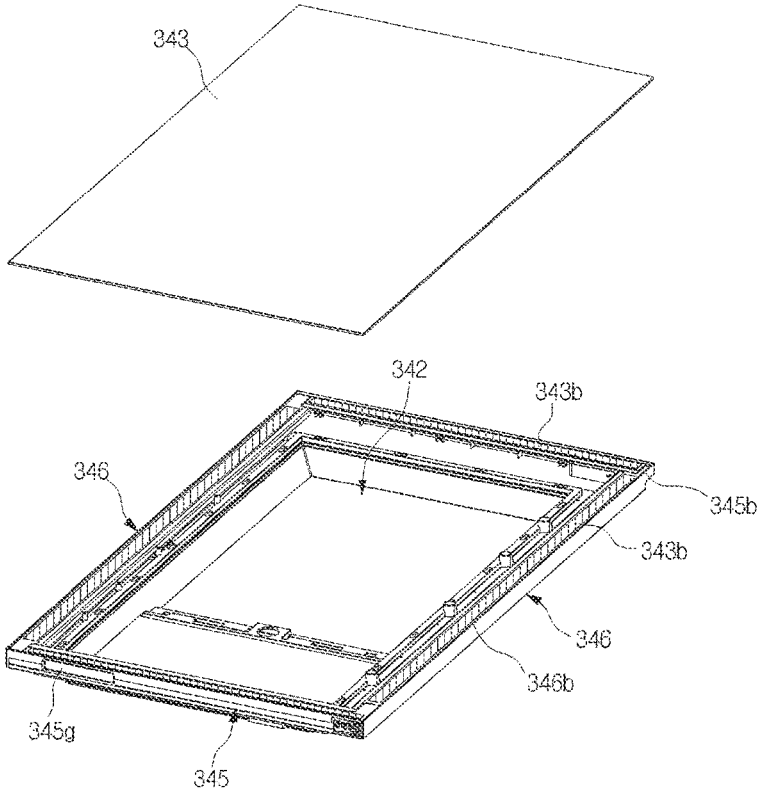
FIG. 51 is a perspective view illustrating a second door when only a door plate is removed from the second door.

FIG. 46 is a perspective view illustrating the second door. FIG. 47 is an exploded perspective view illustrating the front side of the second door. FIG. 48 is an exploded perspective view illustrating the rear side of the second door. FIG. 49 is a cross-sectional view taken along line 7-7' of FIG. 46. FIG. 50 is a cross-sectional view taken along line 8-8' of FIG. 46. FIG. 51 is a perspective view illustrating a second door when only a door plate is removed from the second door.

Referring to FIGS. 46 through 51, the second door 340 includes the door plate 343 that defines the front exterior of the second door 340, the door case 342 that defines the rear exterior of the second door 340, cap decors 345 that define the upper and lower surfaces of the second door 340, and the side decors 346 that define the left and right surfaces of the second door 340.

In detail, the size of the front surface of the second door 340 is determined according to the door plate 343. As described above, the door plate 343, the front surface of the first door 310 and the front surface of the freezer compartment door 20 may have the same material or the same color or the same figure. The door plate 343 may be formed of tempered glass, and the rear surface of the door plate 343 may be provided with a specific pattern or figure. Since the door plate 343 is formed of the tempered glass that is transparent, the pattern or figure can be perceived from the front side of the door plate 343. The door plate 343 may be adhered to the front surfaces of the cap decors 345 and the front surfaces of the side decors 346 through adhesive members 343b (refer to FIG. 51).

A pattern or figure may be formed on the rear surface of the door plate 343 using a following method. In detail, a pattern or figure is printed in a specific shape on the front surface of opaque film that has the same color as that of the front surface of the first door 310. The film with the printed pattern or figure is attached to the rear surface of the door plate 343. Since the film is opaque, a heat insulator that fills the rear surface of the door plate 343 is not exposed to the outside. In the related art, a refrigerator door is formed by attaching a separate tempered glass to the front surface of a door cover that is a plastic product through injection molding or a metal plate. However, according to the embodiment, a separate door cover is unnecessary, and the door plate 343 formed of glass performs the two functions. That is, the door plate 343 functions as both the door cover and the tempered glass attached to the front surface of the door cover.

The door case 342, which defines the rear surface of the second door 340, may be plastic through injection molding. The door case 342 may be recessed to receive an heat insulator. In detail, the protrusion part 342a may have a shape corresponding to the opening 316, and is disposed within the opening 316 when the second door 340 is closed.

The door case 342 may have a gasket recess for receiving the gasket 344, and the gasket recess is disposed outside the protrusion part 342a. The gasket 344 extends along the edge of the door case 342 and contacts the outside of the opening 316.

The latch hook 341 may be installed on the door case 342, and the upper and lower ends of the door case 342 may be provided respectively with spaces on which the first hinge 52 and the lower hinge assembly 54 are installed. The inside and edge surface of the door case 342 may be provided with a plurality of protrusions or ribs for reinforcing the door case 342.

Reinforcement members 340c for reinforcing the second door 340 may be installed on the left and right edges of the door case 342. The reinforcement members 340c may be formed of steel, and be elongated up and down. The reinforcement members 340c installed on the door case 342 prevent torsion or deformation of the second door 340. The reinforcement members 340c will be described later in more detail.

The cap decors 345 define the upper and lower appearances of the second door 340, and may be formed of plastic through injection molding. The cap decors 345 include an upper cap decor that defines the upper surface of the second door 340, and a lower cap decor that defines the lower surface of the second door 340.

A side of the upper cap decor of the cap decors 345 may be provided with the second installation part 340b on which the second hinge 51 is installed, and a side of the lower cap decor of the cap decors 345 may be provided with a third installation part 345f on which the lower hinge assembly 54 is installed. The lower cap decor of the cap decors 345 may be provided with a handle part 345g that is recessed to be held by a user's hand to open the second door 340.

The cap decors 345 may be coupled to the door case 342 through screws 345h. To this end, the cap decors 345 may have screw holes 345i through which the screws 345h pass, and screw coupling parts 342e to which the screws 345h are coupled may be disposed at the door case 342 to correspond to the screw holes 345i.

The cap decors 345 may include door case coupling parts 345a installed on the upper and lower ends of the door case 342, and door plate placement parts 345b that support the lower and upper surfaces of the door plate 343. The door case coupling parts 345a may be coupled to the upper and lower ends of the door case 342. The door plate placement parts 345b extend perpendicularly to the door case coupling parts 345a to the inside of the door case 342. Thus, the door plate 343 may be coupled to the door case coupling parts 345a in a manner where the door plate 343 is placed on the door case coupling parts 345a.

Hereinafter, the cap decors will now be disposed in more detail. In installation structures of the cap decors, the upper cap decor is the same as the lower cap decor, and thus, a description will now be made with respect to the upper cap decor.

The door case coupling part 345a extends to the door case 342 and may be inserted in an upper border 342f that is provided to the upper end of the door case 342. The upper border 342f may have an insertion recess 342g in which the door case coupling part 345a is inserted. The door case coupling part 345a has a stepped shape, and its rear portion is inserted in the recess 342g and its front portion is coplanar with the upper border 342f to define the upper surface of the second door 340.

The door plate placement part 345b may extend to the inside of the door case 342 and be closely adhered to the rear surface of the door plate 343. Movement prevention protrusions 345c protrude forward from the outer ends of the door plate placement parts 345b. The movement prevention protrusions 345c extend in the longitudinal direction of the door case coupling parts 345a to support and confine the upper and lower ends of the door plate 343.

The side decors 346 form the left and right surfaces of the second door 340, and may be formed of a metal such as aluminum. The side decors 346 are installed on both side ends of the door case 342, and may be coupled to the door case 342 through screws 346e. The side decors 346 may be formed of plastic through injection molding, and may be coated or colored to have the texture of metal.

The side decors 346 may include door case coupling parts 346a coupled to both side surfaces of the door case 342, and door plate placement parts 346b that perpendicularly extend to the door case coupling parts 346a to support the door plate 343. The door plate placement parts 346b extend toward the inside of the door case 342, and the rear surface of the door plate 343 is placed on the door plate placement parts 346b.

Hereinafter, the side decors will now be described in more detail.

The door case coupling parts 346a extend rearward, and hooks 346c may be bent at the rear ends of the door case coupling parts 346a. The hooks 346c of the door case coupling parts 346a engage with side decor coupling recesses 342i disposed at the left and right ends of the door case 342. Borders 342h disposed at the left and right side ends of the door case 342 contact the door case coupling parts 346a to laterally support the side decors 346.

The door plate placement parts 346b extend toward the inside of the door case 342, and extended ends are bent rearward to prevent the deformation of the side decors 346.

Movement prevention protrusions 346d protrude forward from the outer ends of the door plate placement parts 346b. The movement prevention protrusions 346d extend in the longitudinal direction of the door case coupling parts 346a to prevent the left and right movements of the door plate 343.

Thus, in the second door 340 as illustrated in FIG. 51, the cap decors 345 are respectively coupled to the upper and lower ends of the door case 342, and the side decors 346 are respectively coupled to the left and right ends of the door case 342, and the door plate 343 is placed on the door plate placement parts 345b and 346b.

The adhesive members 343b may be provided respectively to the door plate placement parts 345b and 346b contacting the door plate 343. The adhesive members 343b may include double-sided adhesive tape or adhesive. Alternatively, the adhesive members 343b may be applied to the rear surface of the door plate 343.

When the door plate 343 is adhered to the door plate placement parts 345b and 346b, a foaming agent may be filled between the door plate 343 and the door case 342 to form an insulation layer.

Hereinafter, the reinforcement members installed inside the door case will now be described in more detail.

Figure 52:
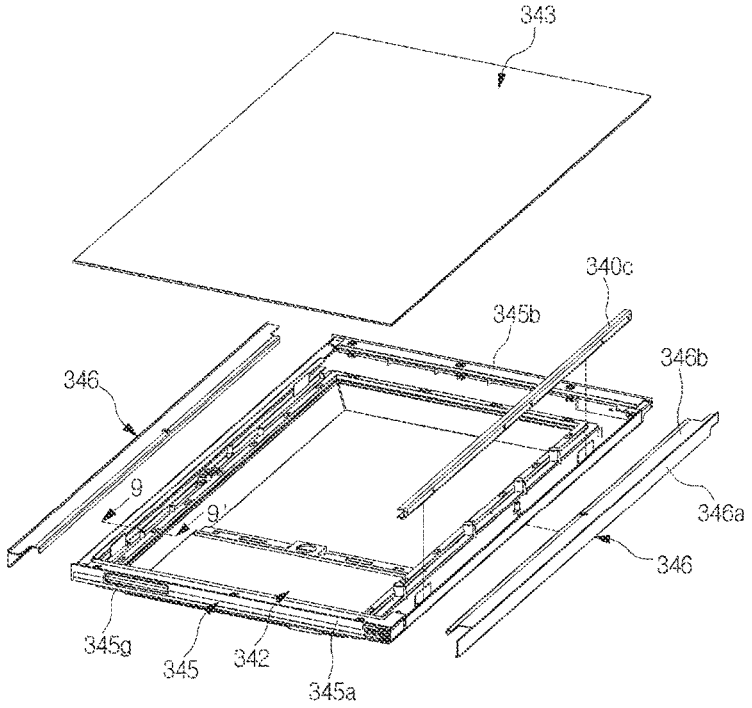
FIG. 52 is an exploded perspective view illustrating a second door coupled with reinforcement members according to an embodiment.
Figure 53:
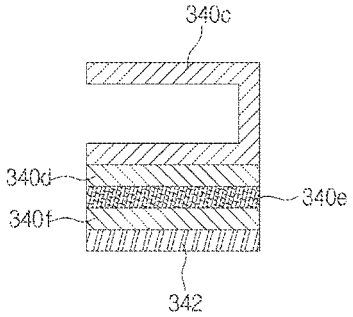
FIG. 53 is a cross-sectional view taken along line 9-9' of FIG. 52.

FIG. 52 is an exploded perspective view illustrating a second door coupled with reinforcement members according to an embodiment. FIG. 53 is a cross-sectional view taken along line 9-9' of FIG. 52.

Referring to FIGS. 52 and 53, the reinforcement members 340c may be installed on the left and right sides of the door case 342. The reinforcement members 340c may be placed on the front surface of the door case 342 at the edge of the door case 342, and may be disposed behind the door plate placement parts 346b of the side decors 346.

The front and rear ends of the reinforcement member 340c extend toward the inside of the door case 342, and are spaced a predetermined distance from each other. Thus, open parts of the reinforcement members 340c may face the inside of the door case 342, and an insulator can be uniformly injected to the inside of the reinforcement members 340c.

In addition, the door plate placement parts 346b are spaced apart from the reinforcement members 340c, so that a foaming agent can be uniformly injected to the spaces between the reinforcement members 340c and the door case 342. The reinforcement members 340c are disposed further outside than the portions provided with the screws 346e for coupling the side decors 346, so that the reinforcement members 340c do not interfere with the screws 346e during the coupling of the screws 346e.

The reinforcement members 340c are spaced inward from side ends of the door case 342, and are spaced apart from the side decor coupling recesses 342i. The reinforcement member 340c may be provided in quadruplicate around the door case 342 as well as the left and right sides of the door case 342, or may be disposed diagonally.

The reinforcement members 340c may be adhered to the front surface of the door case 342 through adhesive. For example, a primer 340d is applied on the bottom surface of the reinforcement member 340c, and then, a double-sided adhesive tape 340e is attached to the bottom surface. A primer 340f is applied on the upper surface of the door case 342. That is, the primers 340d and 340f are attached to the upper and lower surfaces (or front and rear surfaces) of the double-sided adhesive tape 340e.

Hereinafter, assembling of a second door of a refrigerator configured as described above will now be described according to an embodiment.

To assemble the second door 340, a color or figure is formed on the rear surface of the door plate 343. The door case 342 and the cap decors 345 are formed of plastic through injection molding, and the side decors 346 are formed of a metal such as aluminum. The reinforcement members 340c are formed to have a predetermined length.

In detail, the reinforcement members 340c are installed on the inner left and right sides of the door case 342. To this end, the primers 340d and 340f are applied to the reinforcement member 340c and the door case 342, and the reinforcement members 340c are attached to the inner surface of the door case 342 through the double-sided adhesive tape 340e.

The cap decors 345 are coupled to the upper and lower ends of the door case 342. After that, the side decors 346 are coupled to the left and right ends of the door case 342.

In detail, the door case coupling parts 345a are respectively inserted into the upper border 342f and a lower border of the door case 342, and the screws 345h are coupled to fix the cap decors 345 to the door case 342.

The hooks 346c of the door case coupling parts 346a are coupled to the side decor coupling recesses 342i, and then, the screws 346e are coupled to fix the side decors 346 to the door case 342.

After the cap decors 345 and the side decors 346 are coupled to the door case 342, the adhesive members 343b are applied to the door plate placement parts 345b and 346b. Then, the door plate 343 is placed on the door plate placement parts 345b and 346b. Then, the door plate 343 is fixed to the door plate placement parts 345b and 346b through the adhesive members 343b.

The movement prevention protrusions 345c provided to the cap decors 345 and the movement prevention protrusions 346d provided to the side decors 346 support and confine the edge of the door plate 343 to prevent the movement of the door plate 343.

After the door plate 343 is installed, a foaming agent is injected between the door plate 343 and the door case 342 to form an insulation layer within the second door 340. When the injecting of the foaming agent is completed, the assembling of the second door 340 is completed.

Various structures including the gasket 344 to be installed on the door case 342, the latch hook 341, and the lower hinge assembly 54 may be attached just after the door plate 343 is formed, or after or before the foaming agent is injected.

Figure 54:
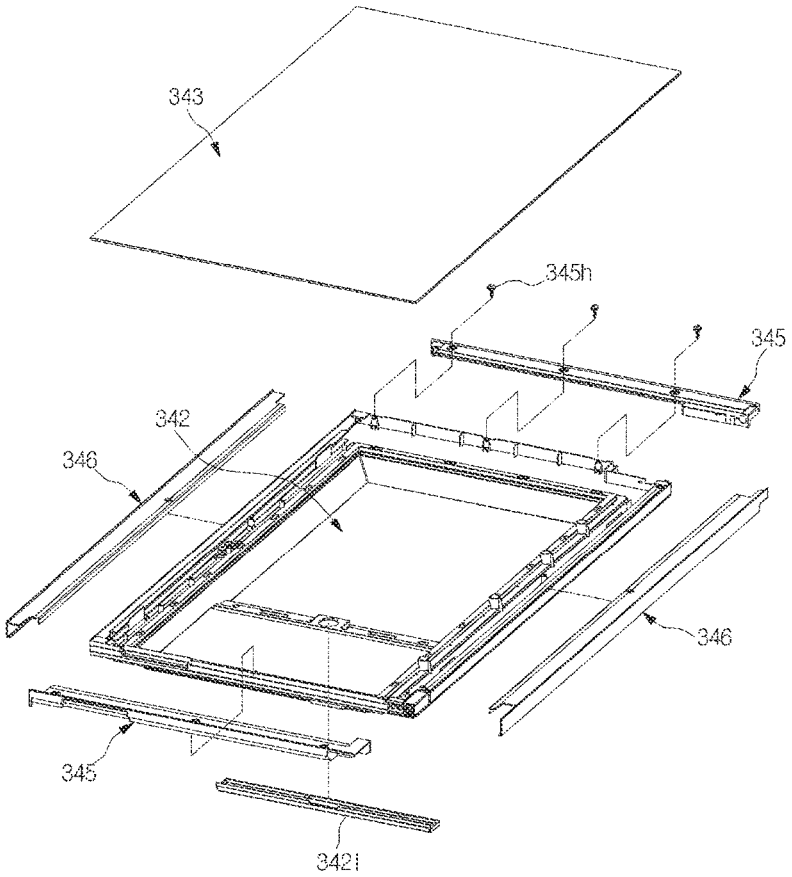
FIG. 54 is an exploded perspective view illustrating the front side of the second door.
Figure 55:
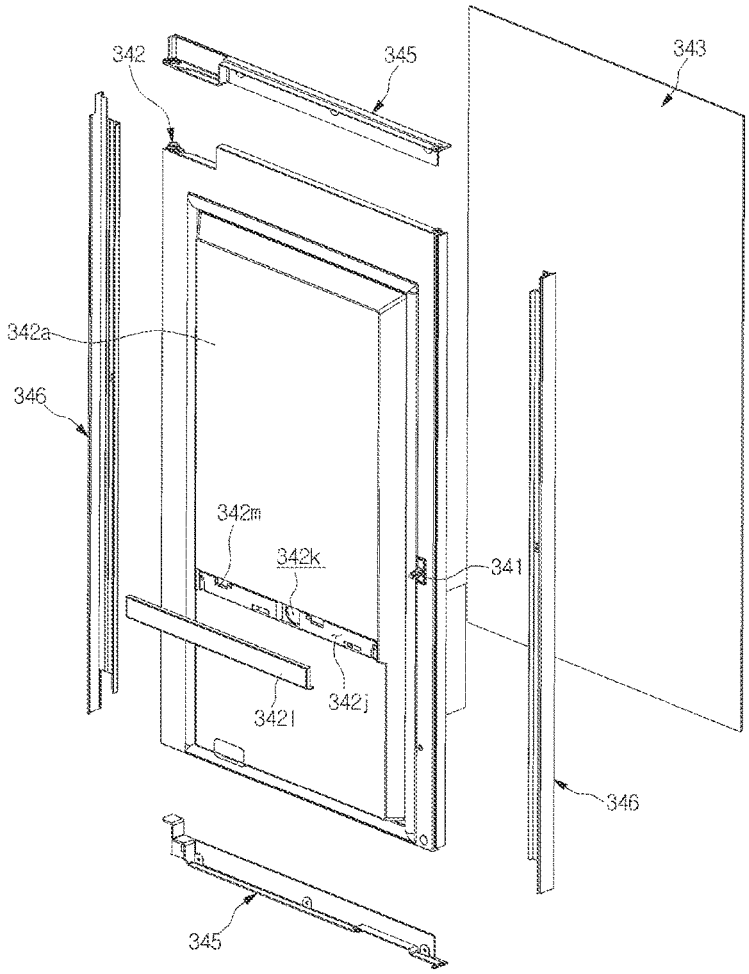
FIG. 55 is an exploded perspective view illustrating the rear side of the second door.
Figure 56:
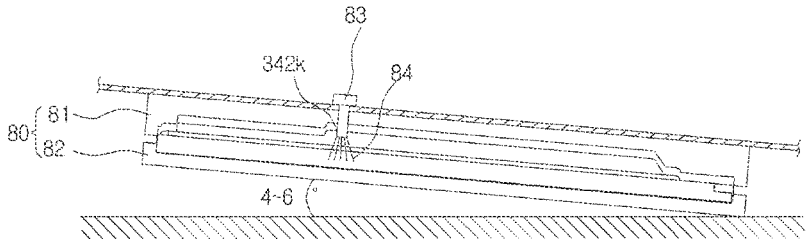
FIG. 56 is a perspective view illustrating the second door installed on a jig.

FIG. 54 is an exploded perspective view illustrating the front side of the second door. FIG. 55 is an exploded perspective view illustrating the rear side of the second door. FIG. 56 is a perspective view illustrating the second door installed on a jig.

Referring to FIGS. 54 through 56, as described above, the second door 340 may include the door plate 343 that forms the frontal exterior of the second door 340, the door case 342 that forms the rear exterior of the second door 340, the cap decors 345 that form the upper and lower surfaces of the second door 340, and the side decor 346 that forms the left and right surfaces of the second door 340.

In detail, a foaming agent injection part 342j is disposed at a portion of the protrusion part 342a provided to the door case 342. An ingate 342k may be disposed in the approximately center of the foaming agent injection part 342j. The ingate 342k is a hole through which a foaming agent 84 is injected to form the insulation layer within the second door 340.

The foaming agent injection part 342j may be disposed at a position spaced upward from the lower end of the protrusion part 342a. In detail, the foaming agent injection part 342j may be disposed at a position corresponding to about one fourth to about one third the length of the second door 340 from the lower end of the second door 340. Thus, the ingate 342k is disposed at a position spaced downward from a horizontal cross-section that bisects the second door 340.

When the foaming agent 84 is injected into the second door 340, the lower end of the second door 340 is moved upward to be inclined at an angle ranging from about 4° to about 6°. Thus, during a foaming process, the ingate 342k is disposed higher than the horizontal cross-section that bisects the second door 340. Accordingly, the foaming agent 84 can be uniformly introduced into the second door 340.

In detail, the second door 340 is thinner than a typical refrigerator door, and the length and the lateral width of the second door 340 are great relative to the thickness of the second door 340. Thus, when a typical method is used to inject a foaming agent into the second door 340, since the inner space of the second door 340 is thin and wide, the foaming agent 84 may unevenly spread.

However, when the second door 340 is inclined and the foaming agent 84 is injected through the ingate 342k, the foaming agent 84 can be introduced down to the upper end of the second door 340 along an inclined surface in the second door 340, and simultaneously, the foaming agent 84 can be uniformly introduced to other regions in the second door 340.

To this end, the second door 340 may be installed on a jig 80 that is inclined at an angle ranging from about 4° to about 6° from the ground. Alternatively, the jig 80 on which the second door 340 is installed is disposed horizontally, and the inner space of the jig 80 may be inclined.

When an inclination angle of the second door 340 is less than about 4°, it may be difficult to inject the foaming agent 84 down to the upper end of the second door 340. When the inclination angle of the second door 340 is great than about 6°, it may be difficult to inject the foaming agent 84 up to the end of the second door 340 spaced upward from the horizontal cross-section, that is, up to the lower end of the second door 340. Moreover, it may be difficult to move and assemble the jig 80.

When the jig 80 is inclined in the rage from about 4° to about 6°, if the ingate 342k is disposed higher, a foaming agent is hardened before arriving at the upper end of the second door 340, so that an insulation layer may not be formed in a predetermined region. If the ingate 342k is disposed lower, the foaming agent 84 does not arrive at the lower end of the second door 340, that is, the upper most end within the jig 80, so that an insulation layer may not be formed in a predetermined region.

The foaming agent injection part 342j having the ingate 342k may be provided with an injection part cover 3421 that covers the foaming agent injection part 342j. The foaming agent injection part 342j is provided with cover coupling parts 342m to install the injection part cover 3421 to the foaming agent injection part 342j. The injection part cover 3421 installed on the foaming agent injection part 342j may be coplanar with the outer surface of the protrusion part 342a.

Hereinafter, assembling of a second door of a refrigerator configured as described above will now be described according to an embodiment.

To assemble the second door 340, the door plate 343 is formed, and then, a film having a pattern or figure and a background color that is the same as that of the front part of the first door 310 is attached to the rear surface of the door plate 343. The door case 342 and the cap decors 345 are formed of plastic through injection molding, and the side decors 346 are formed of a metal such as aluminum.

After the door case 342, the cap decors 345, and the side decors 346 are formed, the upper and lower ends of the door case 342 formed through injection molding are coupled with the cap decors 345 formed through injection molding. After that, the side decors 346 are coupled to the left and right ends of the door case 342.

After the cap decors 345 and the side decors 346 are coupled to the door case 342, the door plate 343 is installed on the cap decors 345 and the side decors 346. Adhesive may be applied on the cap decors 345 and the side decors 346 or the door plate 343. The door plate 343 is fixed to the cap decors 345 and the side decors 346 through the adhesive to form the frontal exterior of the second door 340. The cap decors 345 and the side decors 346 are provided with discrete fixing structures such as a catching protrusion to prevent the movement of the door plate 343.

After the door plate 343 is installed, the second door 340 is installed on the jig 80. The jig 80 is a fixture for fixing the second door 340 when the foaming agent 84 is injected, and includes an upper jig 81 and a lower jig 82. The door plate 343 and the door case 342 are placed on the upper jig 81 and the lower jig 82, respectively.

The jig 80 may have a corresponding shape to the exterior of the second door 340, and be inclined at a predetermined angle from the ground. Thus, the second door 340 is inclined when being installed on the jig 80.

After the second door 340 is installed to be inclined within the jig 80, the jig 80 is closed. The foaming agent 84 is injected to the ingate 342k through an injection nozzle 83 provided to a side of the jig 80.

Figure 58:
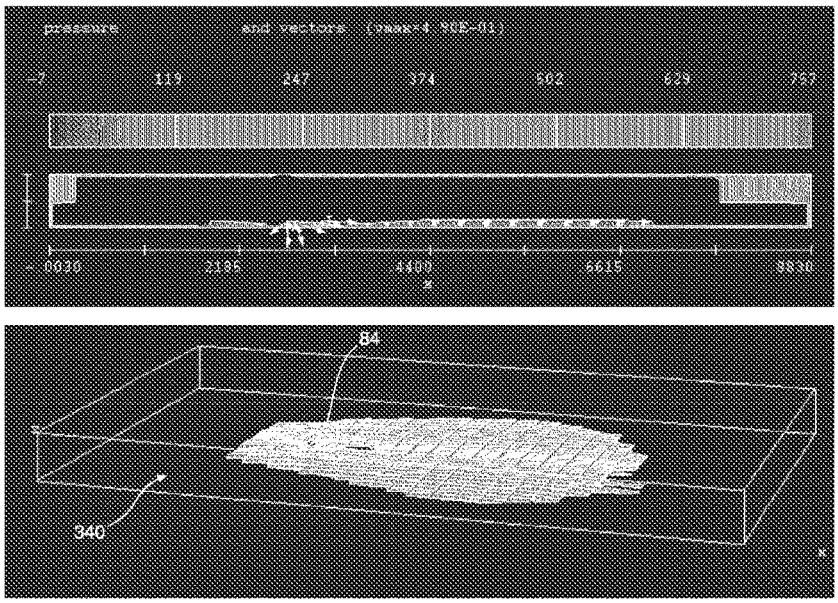

At this point, as illustrated in FIG. 58, the foaming agent 84 flows down along the inclined surface of the door plate 343. Then, the second door 340 is filled with the foaming agent 84 from the lowest region. At this point, the foaming agent 84 is provided up to a higher region than the ingate 342k by the pressure of the foaming agent 84 injected through the ingate 342k. As a set time is elapsed, the interior of the second door 340 is entirely and uniformly filled with the foaming agent 84 to form an insulation layer.

Various structures including the gasket 344 to be installed on the door case 342, the latch hook 341, and the lower hinge assembly 54 may be attached just after the door plate 343 is formed, or after or before the foaming agent 84 is injected.

An injection state of the foaming agent 84 may be varied according to inclination angles of the second door 340, which will now be described with reference to the accompanying drawings.

FIGS. 57 to 61 are graphs illustrating filling states of a foaming agent according angles of the jig. Referring to FIGS. 57 to 61, a simulation is performed when the ingate has an injection diameter of 18 mm, a total amount of the foaming agent to be injected is 1100 g, an injection speed of the foaming agent is 0.7856 msec, a discharge amount of the foaming agent per second is 280 g/sec, and a discharge time of the foaming agent is 3.93 sec. Under these conditions, the angle of the second door 340 is varied.

Figure 57:
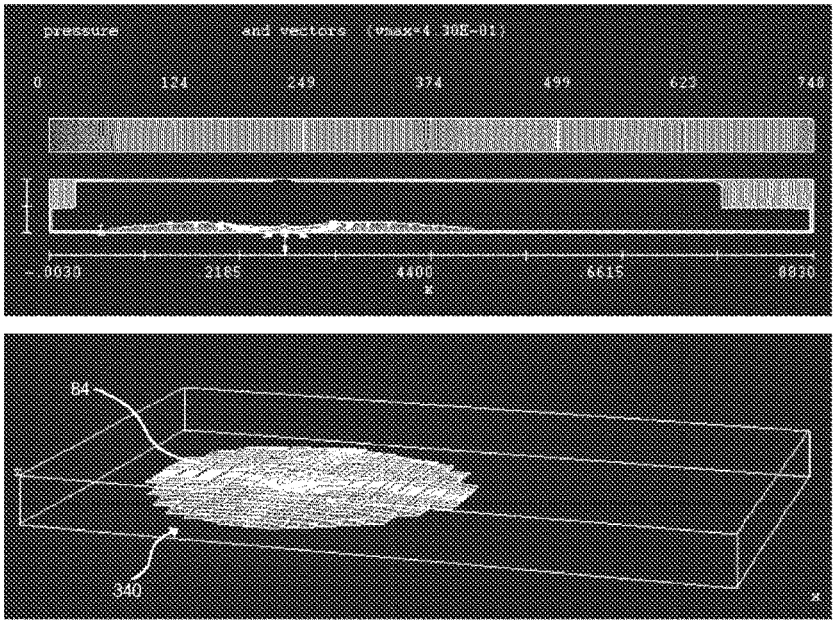
FIGS. 57 to 61 are graphs illustrating filling states of a foaming agent according angles of the jig.

Referring to FIGS. 57 to 61, when the second door 340 is not inclined and disposed horizontally, the foaming agent 84 spreads with substantially the same radius about the ingate 342k as illustrated in FIG. 57. However, in this case, since the ingate 342k is disposed in the lower portion of the second door 340, the foaming agent 84 is insufficiently supplied to the upper end of the second door 340, and is unevenly distributed through a wide region. In other words, the foaming agent 84 may be collected only to the region adjacent to the ingate 342k, and the foaming agent 84 may be insufficiently injected to the upper and lower ends of the second door 340.

When the second door 340 is inclined at about 10° from the ground, the foaming agent 84 is mainly supplied to the upper end of the second door 340 as illustrated in FIG. 58, and is partially supplied to the lower end of the second door 340. At this point, the foaming agent 84 is uniformly distributed on the wide surface of the second door 340, has a uniform thickness as a whole. When the foaming agent 84 is further injected, the interior of the second door 340 is uniformly filled with the foaming agent 84.

Figure 59:
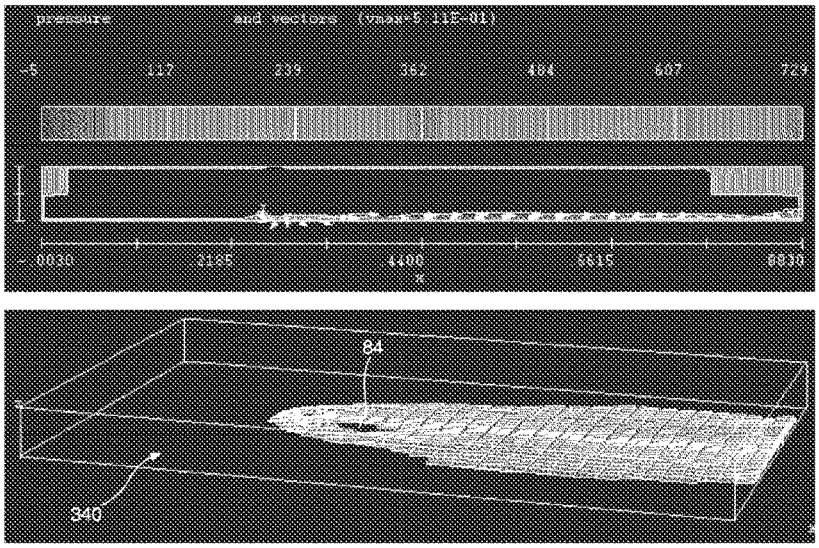

When the second door 340 is inclined at about 20° from the ground, the most part of the foaming agent 84 is supplied to the upper end of the second door 340 as illustrated in FIG. 59. At this point, since the foaming agent 84 is almost not injected to the lower end of the second door 340, the foaming agent 84 is unevenly injected to the interior of the second door 340.

Figure 60:
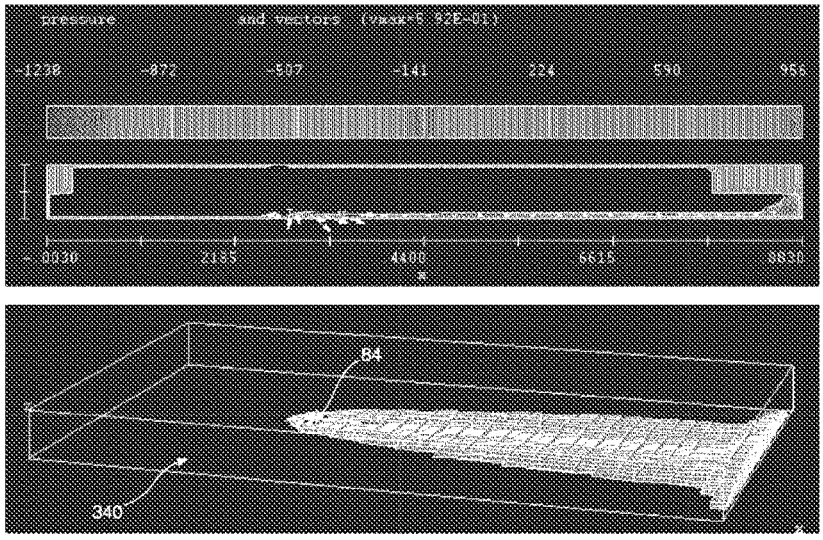

When the second door 340 is inclined at about 30° from the ground, the foaming agent 84 flows down to the upper end of the second door 340 as illustrated in FIG. 60, and is not injected to the lower end of the second door 340. Thus, in this state, a portion of the lower end of the second door 340 may not be filled with the foaming agent 84.

Figure 61:
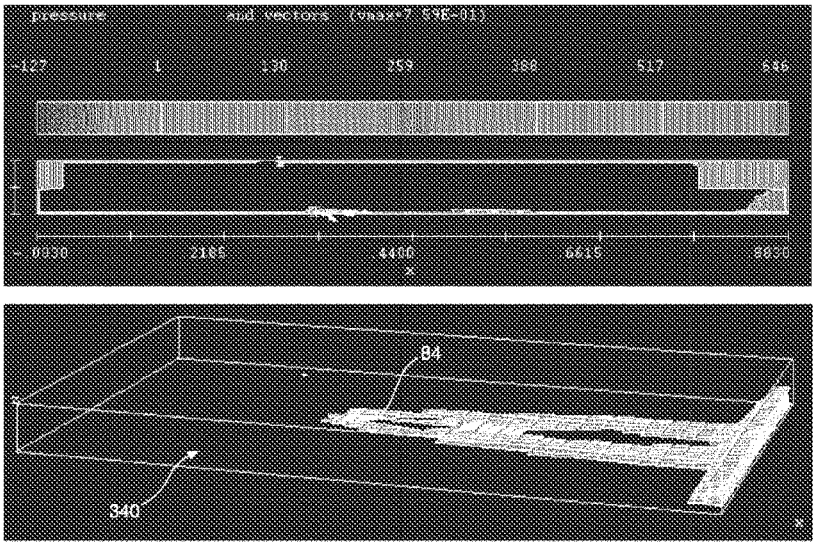

When the second door 340 is inclined at about 45° from the ground, the foaming agent 84 flows down to the upper end of the second door 340 as illustrated in FIG. 61. Furthermore, the foaming agent 84 flowing at high speed may be branched into several parts. Accordingly, an insulation layer may have an uneven thickness even in the upper end of the second door 340. Moreover, the foaming agent 84 may be hardened in advance in a region to suppress the movement of the foaming agent 84, so that the foaming agent 84 may be unevenly supplied.

As a result under the above described conditions, it was found that a preferable inclination angle of the second door 340 is about 10° or less when the foaming agent 84 is injected. In more detail, a preferable inclination angle of the second door 340 may range from about 4° to about 6°.

Figure 62:
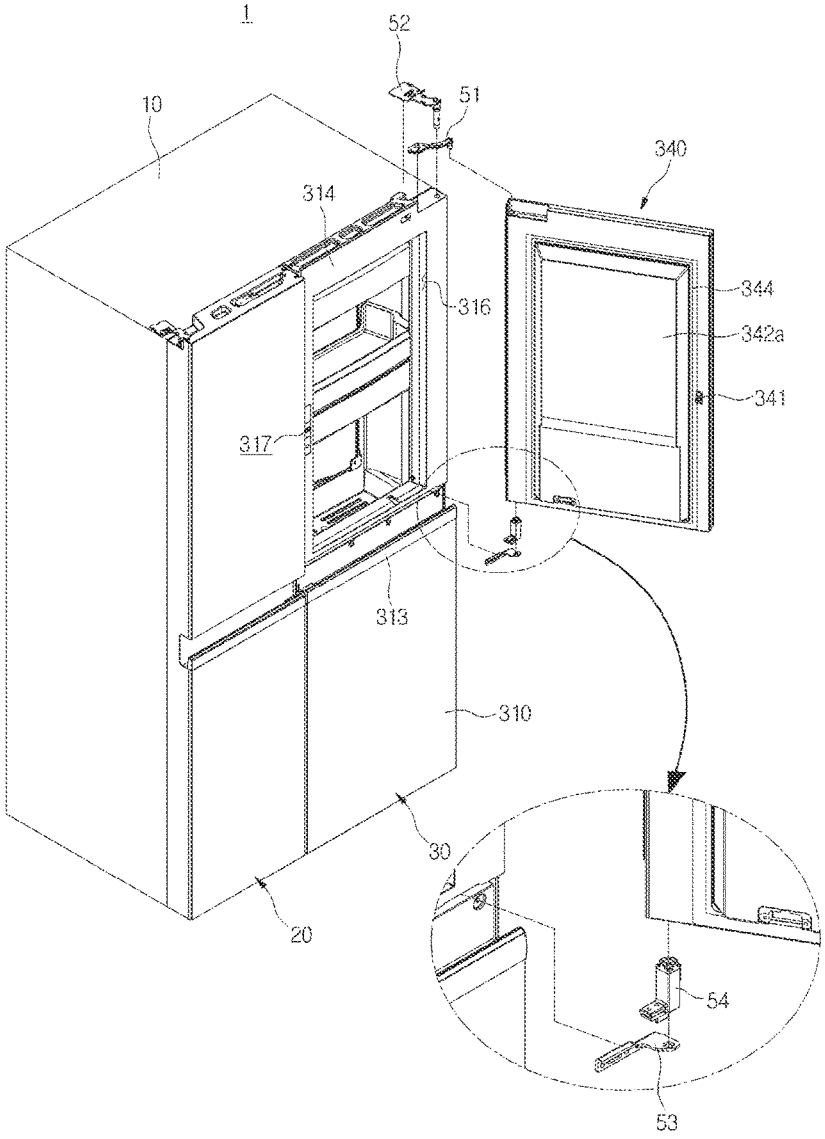
FIG. 62 is an exploded perspective view illustrating a refrigerator with a removed second door according to an embodiment.
Figure 63:
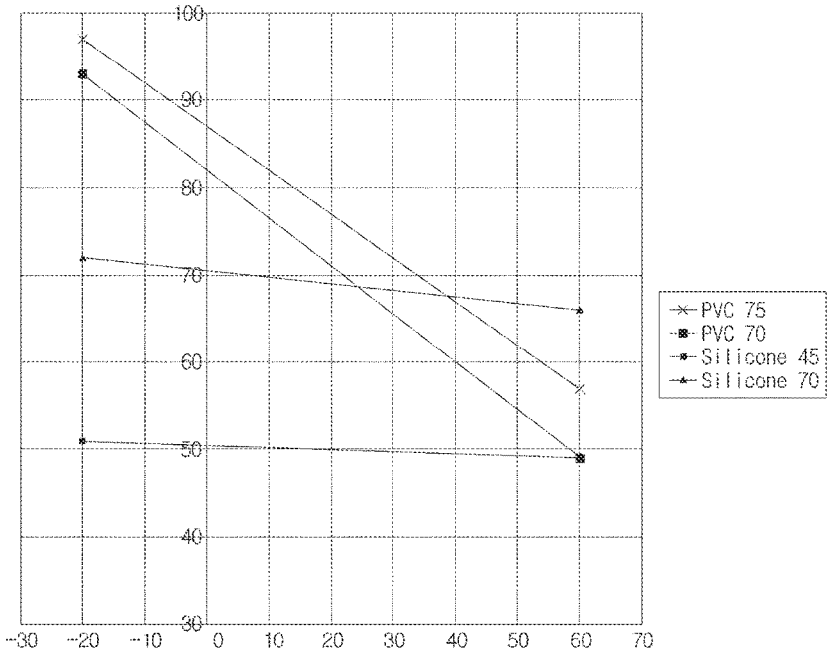
FIG. 63 is a graph illustrating hardness variations of gaskets formed of different materials according to a temperature variation according to an embodiment.

FIG. 62 is an exploded perspective view illustrating a refrigerator with a removed second door according to an embodiment. FIG. 63 is a graph illustrating hardness variations of gaskets formed of different materials according to a temperature variation according to an embodiment.

Since the refrigerator illustrated in FIG. 62 is described in the previous embodiments, a description thereof will be omitted.

In FIG. 63, a horizontal axis denotes temperature, and a vertical axis denotes the Shore hardness.

Referring to FIG. 63, a hardness variation of a gasket formed of silicone according to a temperature variation is even smaller than that of a gasket formed of polyvinyl chloride (PVC).

Specifically, the hardness variation of a gasket formed of silicone 45 is disposed substantially within 1 to 2 in a range from −20° C. to 60° C. Thus, when the gasket 344 is formed of the silicone 45, the hardness variation of the gasket 344 is very small even while temperature varies, so that the resilient force of the gasket 344 almost not varies while the temperature varies. Thus, the space between the first door 310 and the second door 340 can be effectively sealed. Especially, even at a low temperature, the gasket 344 is closely adhered with a predetermined amount of elastic force to the first door 310 to prevent the leakage of cool air.

Hereinafter, the structure of the second door 340 will now be described in more detail with reference to the accompanying drawings.

Figure 64:
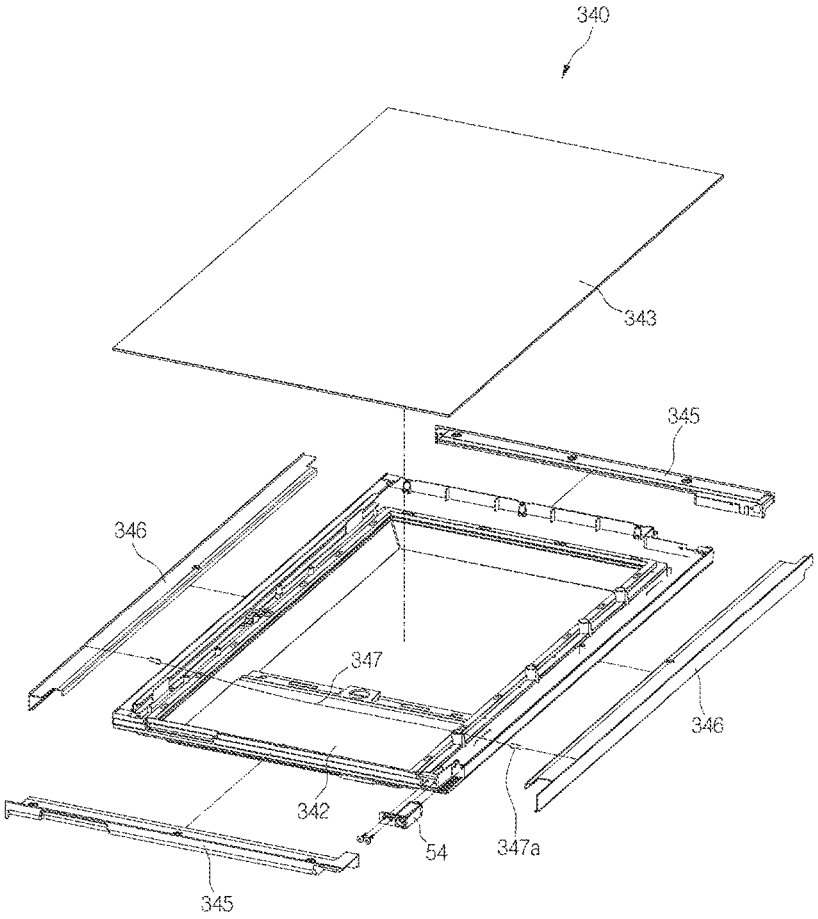
FIG. 64 is an exploded perspective view illustrating the front side of the second door.
Figure 65:
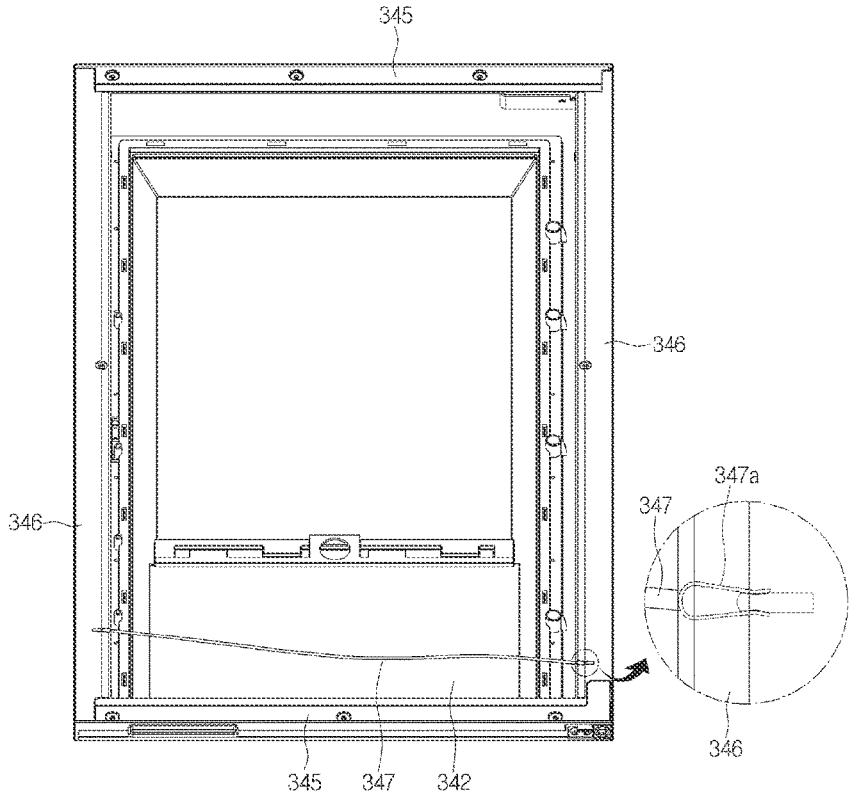
FIG. 65 is a rear view illustrating a second door in which a ground wire is disposed.

FIG. 64 is an exploded perspective view illustrating the front side of the second door. FIG. 65 is a rear view illustrating a second door in which a ground wire is disposed.

Since the second door illustrated in FIG. 64 is described with reference to FIGS. 47 and 54, a description thereof will be omitted here except for a ground wire 347 that is disposed in the second door.

Referring to FIGS. 64 and 65, the door case 342 may be formed of plastic, and the door plate 343 may be formed of tempered glass or transparent plastic.

In detail, an insulator may be disposed between the door case 342 and the door plate 343. The insulator may be formed by filling the door case 342 and the door plate 343 with a foaming agent. Alternatively, the insulator (e.g., a vacuum insulator) disposed between the door case 342 and the door plate 343 may be removable when the second door 340 is assembled.

The lower hinge assembly 54 is formed of metal to be installed on the door case 342 as described above. When the lower hinge assembly 54 contacts the door case 342, the lower hinge assembly 54 may contact the side decor 346 that is formed of metal. That is, after the second door 340 is assembled, the lower hinge assembly 54 contacts the side decor 346 to allow the movement of electric charges.

The cap decors 345 may be formed of plastic or metal such as aluminum. The cap decor 345 that forms the upper surface of the second door 340 is provided with a hinge hole that is shaft-coupled to the second hinge 51, and the cap decor 345 that forms the lower surface of the second door 340 is provided with a hinge hole for shaft-coupling the hinge bracket 53 to the lower hinge assembly 54.

The side decors 346 may be formed of a metal such as aluminum, and constitute the exterior of the second door 340. The ground wire 347 may be disposed between the side decors 346. The ground wire 347 is used to discharge an electric current, which may occur while the second door 340 is used, to the outside of the second door 340, and connects the side decors 346 to each other.

The side decors 346 and both ends of the ground wire 347 may be adhered to each other through tape, or coupled through a coupling member such as screws, or connected through an engagement structure such as a clip, but the present disclosure is not limited thereto.

For example, referring to FIG. 64, the ends of the ground wire 347 may be provided with connection parts 347a having clip shapes to be fitted on the protruding ends of the side decors 346. Thus, the ground wire 347 can be connected to the side decors 346 just by fitting the connection parts 347a respectively on the side decors 346 without an additional coupling member.

Thus, static electricity remaining at one of the side decors 346 can move the other side decor 346 through the ground wire 347, and be discharged to the outside through the second door 340.

Hereinafter, static electricity occurring at the second door 340 and a current flow due to the static electricity will now be described in detail.

Figure 66A:
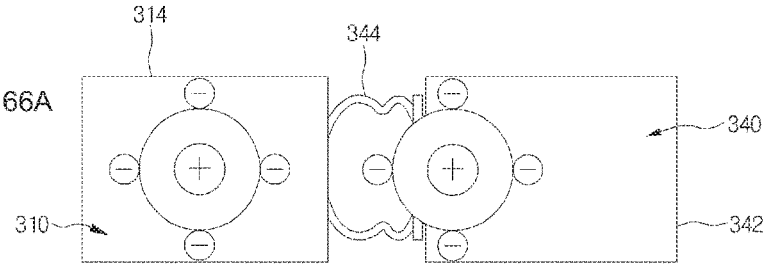
FIGS. 66A and 66B are schematic views illustrating static electricity occurring at the second door.
Figure 66B:
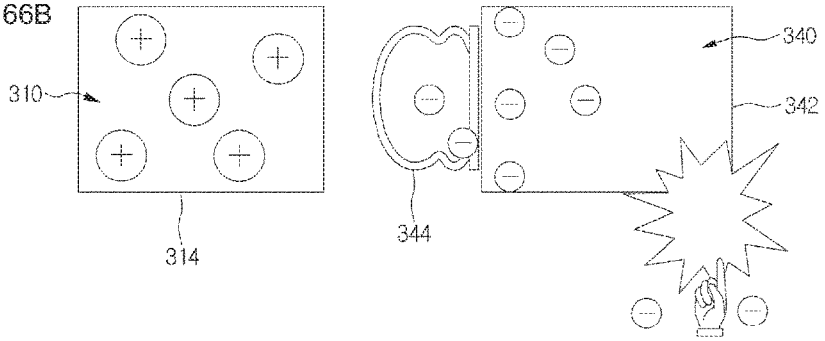

FIGS. 66A and 66B are schematic views illustrating static electricity occurring at the second door.

Referring to FIGS. 66A and 66B, electrons do not actively migrate until the second door 340 is opened several times. As illustrated in FIG. 66A, a front case 314 (corresponding to the second part 312 in FIG. 4) of the first door 310 and the gasket 344 are electrically neutral to be stable.

In this state, although a user holds the second door 340 to open or close the second door 340, static electricity does not occur since a residual charge does not exist. Thus, the user can comfortably use the second door 340.

When the second door 340 is frequently opened and closed, the surface of the gasket 344 repeatedly contacts and separates from the surface of the front case 314 of the first door 310. Especially, as the frequency of the contact and separation is increased, the amount of static electricity increases. Thus, since a portion of the gasket 344, which is distant from the rotation shaft of the second door 340, has a large radius of gyration, the contact and separation occur clearly in the portion of the gasket 344, but the contact and separation occur unclearly in a portion of the gasket 344 near the rotation shaft. Thus, the amount of static electricity is relatively large at the front case 314 and the distant portion of the gasket 344 from the rotation shaft.

In detail, when the second door 340 is repeatedly opened and closed, the contact and separation repeatedly occur between the gasket 344 and the surface of the front case 314, so that electrons actively migrate. That is, when electrons of the first door 310 migrate to the gasket 344, the electrons are accumulated in the gasket 344, and thus, the first door 310 is charged positively, and the second door 340 is charged negatively.

As such, since the electrons accumulated in the gasket 344 also migrate to the second door 340 provided with the gasket 344, when a user holds the second door 340, static electricity occurs as illustrated in FIG. 66B.

Especially, the distant side decor 346 from the rotation shaft of the second door 340 is easily touched by a user's hand while the second door 340 rotates. Moreover, since the side decor 346 is adjacent to the gasket 344, electrons easily migrate. In addition, since the side decor 346 is formed of a metal such as aluminum, when the negatively charged side decor 346 is touched by a user's hand, static electricity may cause a spark.

Thus, when the side decors 346 are connected through the ground wire 347 as illustrated in FIG. 65, electrons (charges) remaining in the distant side decor 346 from the rotation shaft of the second door 340 can migrate to the adjacent side decor 346 to the second door 340.

The second door 340 is shaft-coupled to the hinge bracket 53 that is formed of metal, and the adjacent side decor 346 to the rotation shaft of the second door 340 contacts the lower hinge assembly 54. In addition, the lower hinge assembly 54 is coupled to the hinge bracket 53, and thus, electrons remaining in the second door 340 are induced to migrate to the first door 310 through the adjacent side decor 346, the lower hinge assembly 54, and the hinge bracket 53.

That is, static electricity occurring at one of the side decors 346 can migrate to the other side decor 346 through the ground wire 347. Since the adjacent side decor 346 to the rotation shaft of the second door 340 contacts the lower hinge assembly 54, and the lower hinge assembly 54 is connected to the hinge bracket 53, remaining charges can be induced to the first door 310 sequentially. Thus, even when a user touches the distant side decor 346 from the rotation shaft to rotate the second door 340, static electricity does not occur.

Charges induced through the second door 340 are disappeared at the first door 310, or are guided to a ground wire 315 disposed within the first door 310, and then, are discharged through the cabinet 10 or an outer ground.

Hereinafter, various structures for transmitting a current induced to the first door 310 to the outside will now be described according to embodiments. In the following embodiments, a description of the same parts of the second door 340 as those of the previous embodiments will be omitted, and like reference numerals denote like elements.

Figure 67:
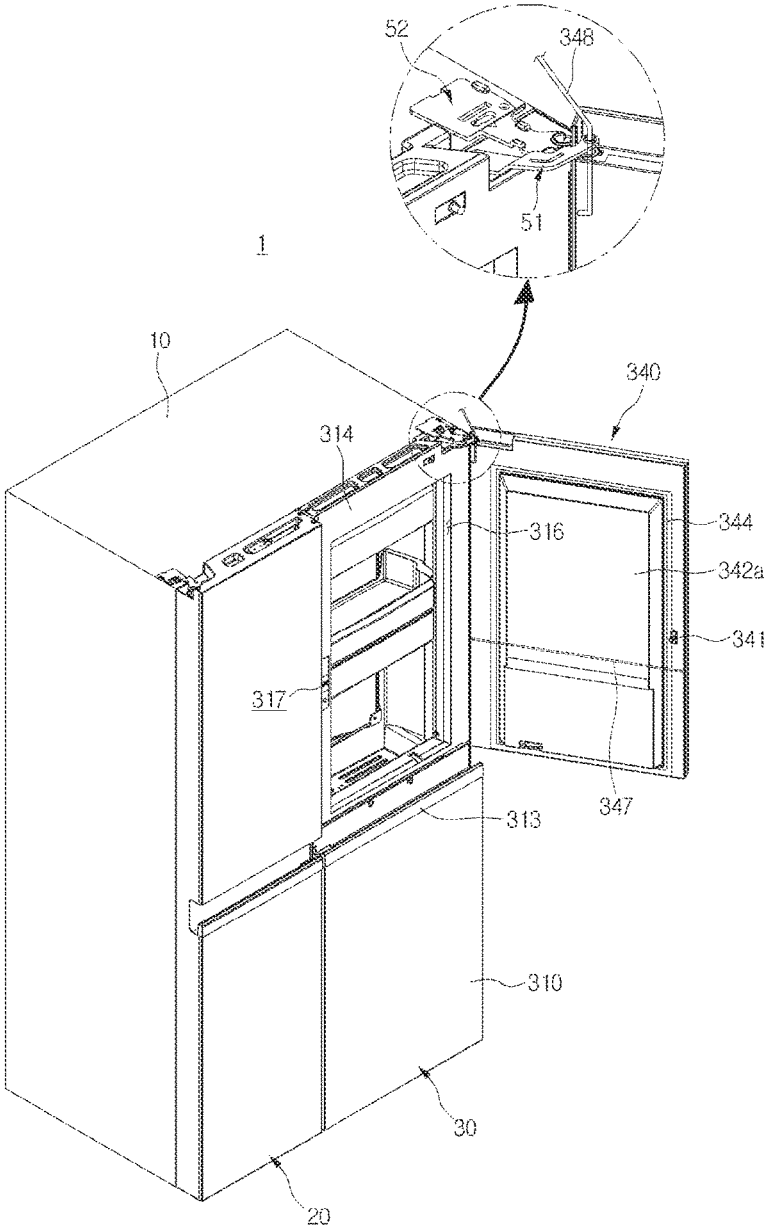
FIG. 67 is a perspective view illustrating a refrigerator including a second door is opened according to an embodiment.

FIG. 67 is a perspective view illustrating a refrigerator including a second door is opened according to an embodiment.

Referring to FIG. 67, the second door 340 is rotatably connected to the first door 310 through the second hinge 51.

The side decors 346 may form the left and right surfaces of the second door 340, and the cap decors 345 may form the upper and lower surfaces of the second door 340. The cap decors 345 may be formed of a metal such as aluminum.

The ground wire 347 may be disposed within the second door 340 to connect the side decors 346 to each other. The second hinge 51 may contact the side decor 346.

Thus, charges induced to the side decor 346 through the ground wire 347 can be induced to the first door 310 sequentially through the cap decor 345 coupled to the upper end of the second door 340 and through the second hinge 51. Then, the charges are discharged to the cabinet 10 through the first hinge 52 connecting the first door 310 to the cabinet 10.

If necessary, a sub ground wire 348 may be provided, an end of which is connected to the adjacent side decor 346 to the rotation shaft of the second door 340. The sub ground wire 348 may be connected to a side of the cap decor 345, or be guided to the outside through the second hinge 51 and be connected to the cabinet 10.

Figure 68:
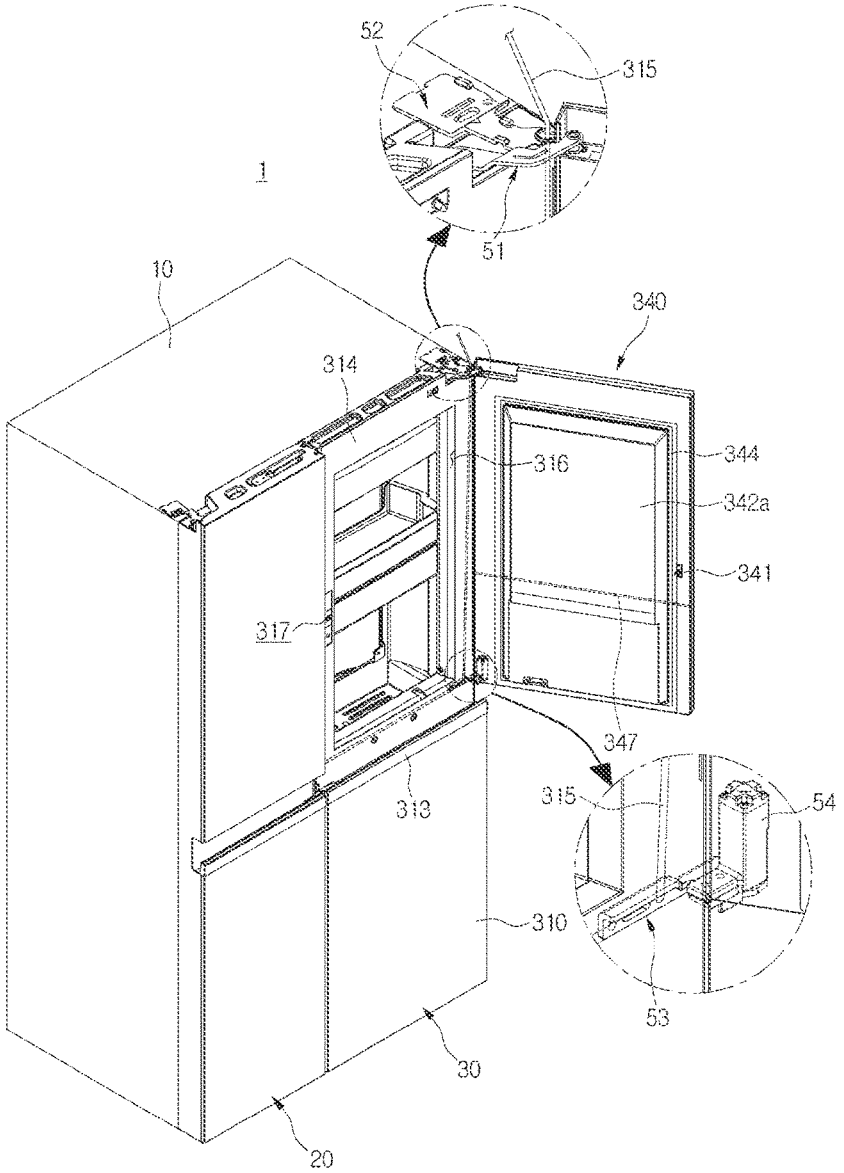
FIG. 68 is a perspective view illustrating a refrigerator including a second door according to another embodiment.

FIG. 68 is a perspective view illustrating a refrigerator including a second door according to another embodiment.

Referring to FIG. 68, the upper and lower ends of the second door 340 are rotatably coupled to the first door 310 through the second hinge 51, the lower hinge assembly 54, and the hinge bracket 53.

The side decors 346 may form the left and right surfaces of the second door 340, and the cap decors 345 may form the upper and lower surfaces of the second door 340. The ground wire 347 may be disposed within the second door 340 to connect the side decors 346 to each other.

The ground wire 315 may be disposed within the first door 310, and an end of the ground wire 315 may be connected to a side of the hinge bracket 53 within the first door 310. The ground wire 315 may be indirectly connected to the hinge bracket 53 through a coupling member that couples the hinge bracket 53 to the first door 310. The other end of the ground wire 315 disposed within the first door 310 is guided to the outside through the first hinge 52, and thus, is connected to a side of the cabinet 10.

Thus, charges remaining in the second door 340 are induced to migrate through the ground wire 347 to the adjacent side decor 346 to the rotation shaft of the second door 340. The charges induced to the side decor 346 are induced sequentially to the lower hinge assembly 54 and the hinge bracket 53.

The charges induced to the hinge bracket 53 may be discharged to the cabinet 10 or the outside of the refrigerator 1 through the ground wire 315 that is connected to the hinge bracket 53 and disposed within the first door 310.

Instead of guiding the ground wire 315 disposed within the first door 310 to the outside through the first hinge 52, the ground wire 315 may be extended downward to contact the cabinet 10 through a hinge bracket (not shown) that supports the first door 310 from the lower side.

Figure 69:
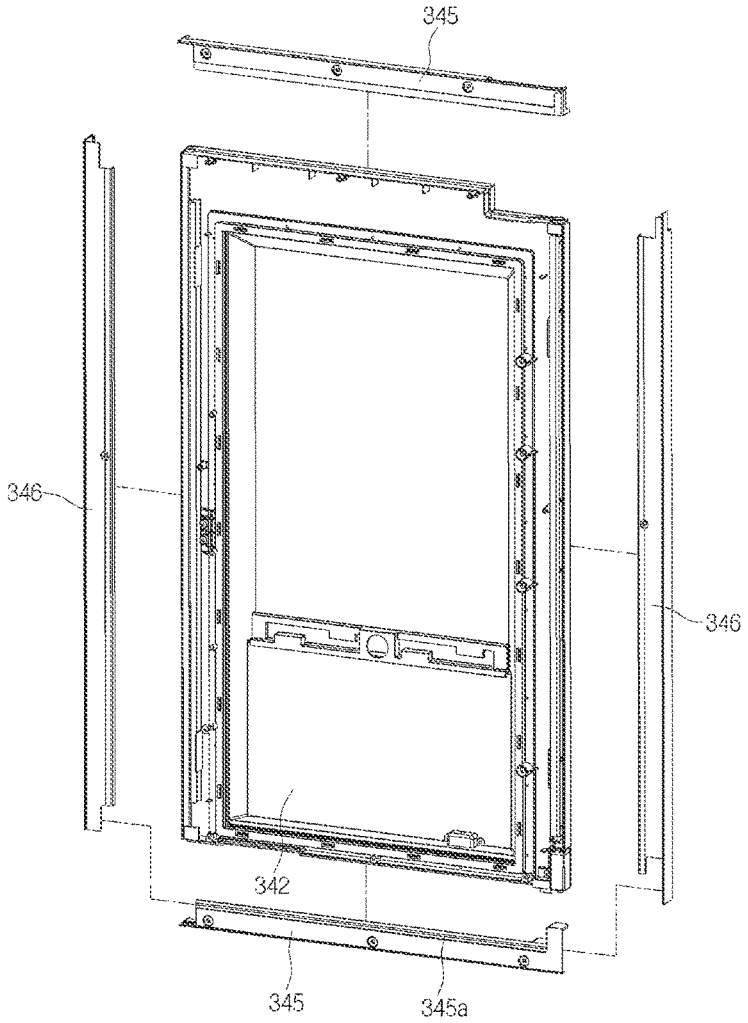
FIG. 69 is a perspective view illustrating a refrigerator including a second door according to another embodiment.

FIG. 69 is a perspective view illustrating a refrigerator including a second door according to another embodiment.

Referring to FIG. 69, the second door 340 is rotatably connected to the first door 310 through the second hinge 51 and the hinge bracket 53.

The side decors 346 may form the left and right surfaces of the second door 340, and the cap decors 345 may form the upper and lower surfaces of the second door 340. At least one of the cap decors 345 provided to the upper and lower portions of the second door 340 may electrically connect the side decors 346 to each other.

In detail, at least one portion of the cap decor 345 forming the lower surface of the second door 340 may be formed of a metal. Thus, when the cap decor 345 is installed, the ends of the cap decor 345 may contact the lower ends of the side decors 346, respectively. Thus, the side decors 346 are electrically connected to each other through the cap decor 345. To this end, the whole cap decor 345 may be formed of a metal, or a portion thereof may be formed of a metal. For example, when the cap decor 345 is longitudinally bisected into upper and lower portions, one of the upper and lower portions may be formed of a metal, and the other may be formed of a non-metal. Thus, although the whole cap decor 345 is not formed of a metal, the side decors 346 can be electrically connected.

Alternatively, when the whole cap decor 345 is formed of plastic, the upper or lower edge of the cap decor 345 may be covered with a conductive contact 345a for connecting the side decors 346. In detail, the contact 345a may include a metal plate or be formed of the same material as that of the ground wire 347, and extend horizontally along the cap decor 345. When being installed, the cap decor 345 may contact the side decors 346.

Thus, charges remaining in the second door 340 or in the side decor 346 may be induced to migrate through the contact 345a of the cap decor 345 to the adjacent side decor 346 to the rotation shaft of the second door 340, and then, be induced into the first door 310 through the second hinge 51 or the lower hinge assembly 54 and the hinge bracket 53. Then, the charges may be discharged to the cabinet 10 or to the outside of the refrigerator 1 through a ground structure in the first door 310.

Figure 70:
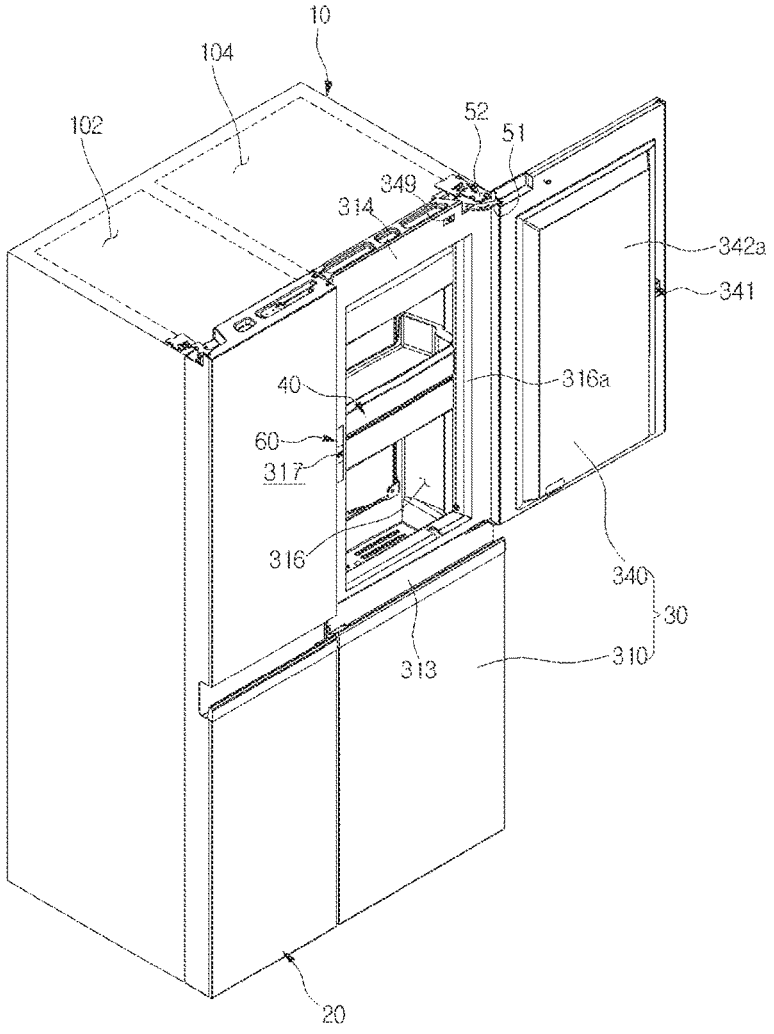
FIG. 70 is a perspective view illustrating a refrigerator when a second door is opened, according to an embodiment.
Figure 71:
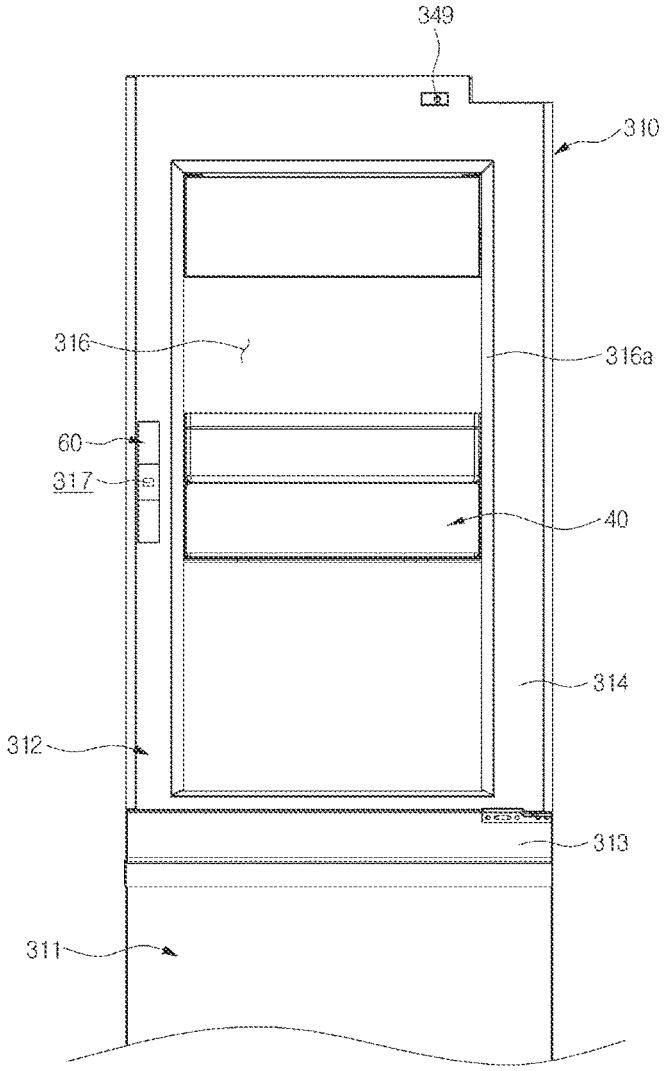
FIG. 71 is a partial front view illustrating a first door according to an embodiment.
Figure 72:
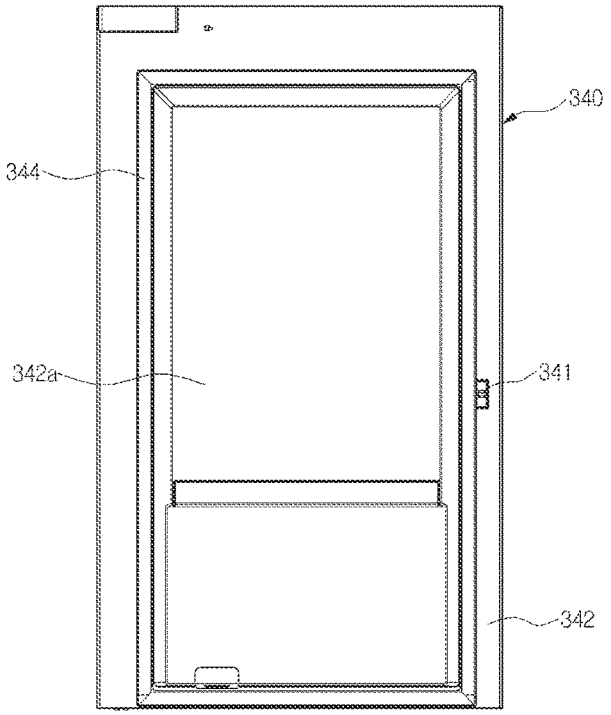
FIG. 72 is a rear view illustrating a second door according to an embodiment.

FIG. 70 is a perspective view illustrating a refrigerator when a second door is opened, according to an embodiment. FIG. 71 is a partial front view illustrating a first door according to an embodiment. FIG. 72 is a rear view illustrating a second door according to an embodiment.

Referring to FIGS. 70 to 72, the refrigerator 1 has the same configuration as that of the previous embodiments except that an inclined surface 316a is formed on the inner border of the opening 316 of the first door 310 and the gasket 344 is closely adhered to the inclined surface 316a, which will now be described in more detail.

The first door 310 may include the first part 311 at the lower side of the grip part 313, and the second part 312 at the upper side of the grip part 313. The first part 311 and the second part 312 may be stepped from each other, and the second part 312 may be lower than the first part 311. The second door 340 may be installed on the second part 312. When the second door 340 is closed, the front surface of the first part 311 may be coplanar with the front surface of the second door 340.

The second part 312 may be constituted by the front case 314 formed of plastic, and the front case 314 may be provided with the opening 316. The inclined surface 316a may be disposed around the opening 316. The inclination of the inclined surface 316a is different from an inclination around the protrusion part 342a to primarily prevent the leakage of cool air. This will be described in more detail with reference to FIG. 73.

When the second door 340 is closed, the gasket 344 surrounding the rear surface of the second door 340 contacts the front end of the inclined surface 316a. The gasket 344 extends along the bottom edge of the protrusion part 342a. That is, the gasket 344 may extend along the boundary between the protrusion part 342a and the rear surface of the second door 340. Thus, when the second door 340 is closed, the gasket 344 is closely adhered to the inclined surface 316a to secondarily prevent the leakage of cool air.

Hereinafter, opening and closing of a second door of a refrigerator door configured as described above will now be described in detail with reference to the accompanying drawings according to an embodiment.

Figure 73:
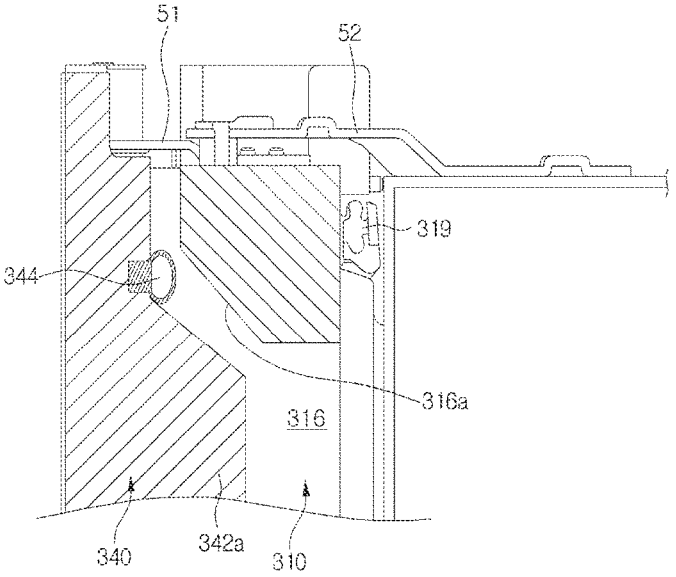
FIG. 73 is a cross-sectional view illustrating a refrigerator compartment door when the second door is opened, according to an embodiment.
Figure 74:
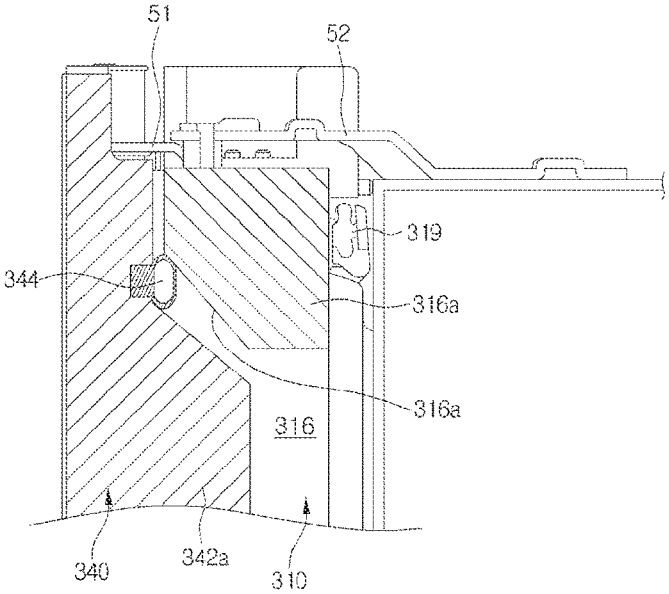
FIG. 74 is a cross-sectional view illustrating the refrigerator compartment door when the second door is closed.

FIG. 73 is a cross-sectional view illustrating a refrigerator compartment door when the second door is opened, according to an embodiment. FIG. 74 is a cross-sectional view illustrating the refrigerator compartment door when the second door is closed.

Referring to FIGS. 73 and 74, when the second door 340 is opened, the gasket 344 is spaced apart from the inner border of the opening 316. In this state, a user further rotates the second door 340 to take out food from the storing device 40 through the opening 316 or put food into the storing device 40.

When the second door 340 is rotated and closed, the protrusion part 342a of the second door 340 is inserted to the inside of the opening 316. Then, the gasket 344 contacts the inclined surface 316a of the opening 316.

The inclination angle of the inclined surface 316a is different from that of the edge of the protrusion part 342a. In detail, from the inner edge of the opening 316 to the center thereof (from the upper end to the lower end in FIG. 73), the inclined surface 316a is inclined to come closer to the edge of the protrusion part 342a.

Even when the second door 340 is completely closed, the edge of the protrusion part 342a is spaced apart from the inclined surface 316a to receive the gasket 344. Then, the rear surface of the second door 340 is disposed nearer to the first part 311 of the first door 310 to more effectively prevent the leakage of cool air. If the gasket 344 is disposed between the rear surface of the second door 340 and the first part 311 of the first door 310, the first door 310 is spaced apart from the second door 340 by the thickness of the gasket 344.

As such, since the gasket 344 is disposed around the bottom edge of the protrusion part 342a such that the gasket 344 is closely adhered to the inclined surface 316a, the rear surface of the second door 340 can be disposed nearer to the front surface of the first door 310. As a result, the possibility that cool air can be heat-exchanged with outside air is further decreased.

Figure 75:
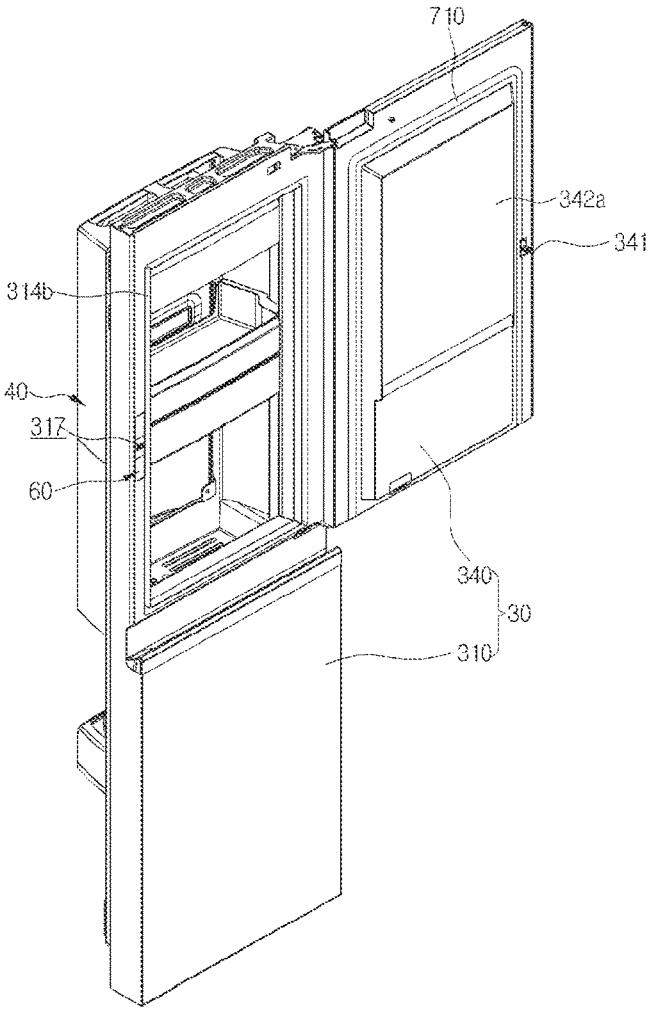
FIG. 75 is a perspective view illustrating a refrigerator compartment door when a second door is opened, according to an embodiment.

FIG. 75 is a perspective view illustrating a refrigerator compartment door when a second door is opened, according to an embodiment.

Referring to FIG. 75, the front surface of the first door 310, particularly, the front surface of the front case 314 corresponding to the outer edge of the opening 316 is provided with a gasket receiving part 314b. The gasket receiving part 314b extends in a closed curve around the opening 316. The gasket receiving part 314b may have a size corresponding to a gasket 710 of the second door 340 to receive the gasket 710 that will be described later.

The gasket 710 may be disposed around the protrusion part 342a. When the second door 340 is closed, the gasket 710 is closely adhered to the gasket receiving part 314b to prevent the leakage of cool air. The gasket 710 may be formed of rubber, silicone, or synthetic resin.

Hereinafter, the gasket and the first door contacting the gasket will now be described in more detail with reference to the accompanying drawings.

Figure 76:
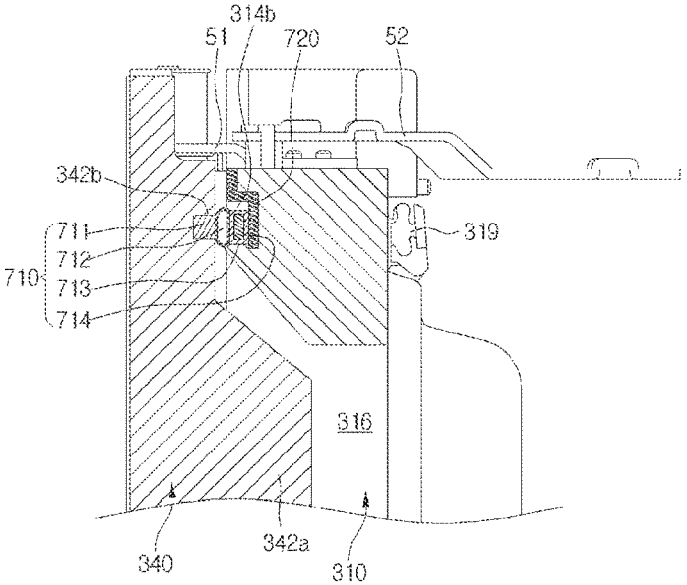
FIG. 76 is a cross-sectional view illustrating a refrigerator compartment door according to an embodiment.

FIG. 76 is a cross-sectional view illustrating a refrigerator compartment door according to an embodiment.

Referring to FIG. 76, a gasket installation part 342b is disposed in the rear surface of the second door 340. A fixing part 711 of the gasket 710 is inserted and fixed to the gasket installation part 342b, and the gasket installation part 342b is disposed around the protrusion part 342a.

The gasket 710 may include the fixing part 711 inserted in the gasket installation part 342b, a chamber part 712 that is hollow, and a magnetic part 713 that includes a permanent magnet 714 therein. In detail, the fixing part 711 may be inserted in the gasket installation part 342b. The chamber part 712 extends from the fixing part 711 and has an inner space, so that the gasket 710 can be deformed by pressure. Thus, the gasket 710 can absorb shock and improve sealing performance when the second door 340 is opened and closed. The magnetic part 713 is configured to receive the permanent magnet 714. The magnetic part 713 may be disposed at an end of the gasket 710, and directly contact the front surface of the first door 310 when the second door 340 is closed. Since the magnetic part 713 may have a shape corresponding to the gasket receiving part 314b of the first door 310, when the second door 340 is closed, the magnetic part 713 can be inserted in the gasket receiving part 314b.

An attachment member 720 is disposed in the first door 310 to closely adhere the gasket 710. The attachment member 720 may be formed of a metal to attach the permanent magnet 714 using magnetic force, and have a plate shape with a predetermined width. The attachment member 720 may be formed of high strength steel around the opening 316. Thus, the attachment member 720 reinforces the upper portion of the first door 310, that is, the portion of the first door 310 provided with the opening 316 to prevent the deformation of the first door 310.

The attachment member 720 may be embedded in the first door 310 corresponding to the rear surface of the gasket receiving part 314b, and thus, may be invisible from the outside. The attachment member 720 may be a metal member that continuously extends along the gasket receiving part 314b. Alternatively, the attachment member 720 may include a plurality of plates that are spaced apart from each other along the gasket receiving part 314b. The attachment member 720 may be bent to surround the rear surface of the gasket receiving part 314b.

Hereinafter, opening and closing of a second door of a refrigerator door configured as described above will now be described in detail.

First, when a user closes the second door 340, the latch hook 341 is inserted into the latch slot 317 and confined to the locking device 60. Thus, the second door 340 can be confined to the first door 310 and be maintained in the closing state.

When the second door 340 is closed, the gasket 710 is closely adhered to the first door 310 to prevent cool air from leaking out of the second storage compartment 405. At this point, the magnetic part 713 of the gasket 710 installed on the second door 340 is inserted into the gasket receiving part 314b. Then, magnetic force closely adheres the magnetic part 713 of the gasket 710 to the attachment member 720 with the front case 314 of the first door 310 therebetween. The gasket receiving part 314b may completely receive the magnetic part 713. When the second door 340 is completely closed, the chamber part 712 is compressed.

In this state, since the most part of the gasket 710 is inserted in the gasket receiving part 314b, the second door 340 can be securely and closely adhered to the first door 310. Thus, since the distance between the first door 310 and the second door 340 is minimized, when the second door 340 is closed, the first door 310 and the second door 340 provide a more improved sense of unity.

A refrigerator according to the present disclosure may be described according to various other embodiments than the previous ones. Hereinafter, a refrigerator will now be described with reference to the accompanying drawings according to another embodiment.

In the current embodiment, a gasket is provided to the first door, and an attachment member is provided to the second door. Thus, in the current embodiment, the rest parts except for the gasket and the attachment member are the same as those of the previous embodiments, a description thereof will be omitted, and like reference numeral denote like elements.

Figure 77:
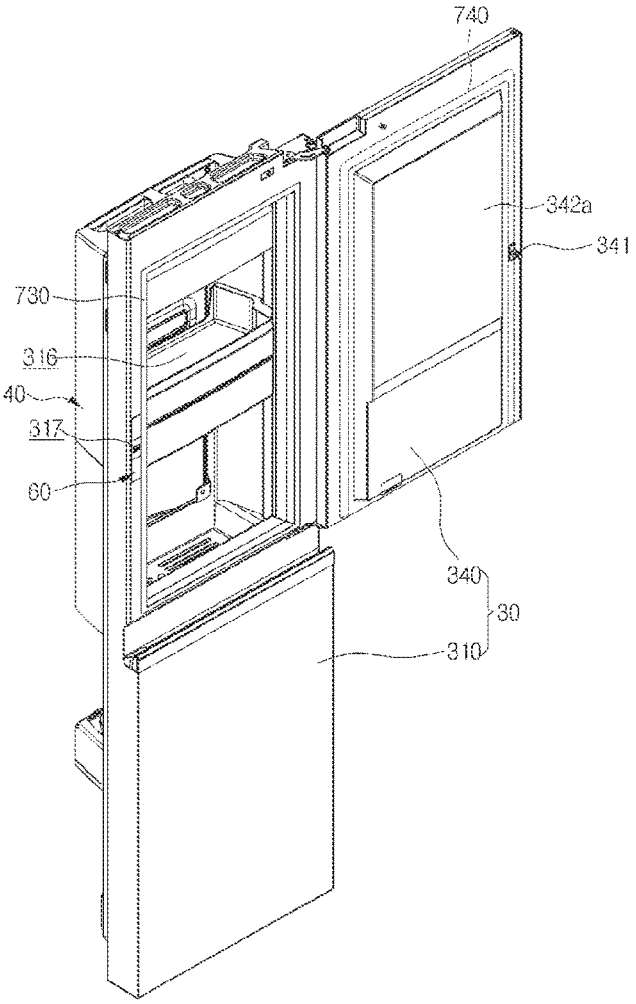
FIG. 77 is a perspective view illustrating a refrigerator when a second door is opened according to an embodiment.
Figure 78:
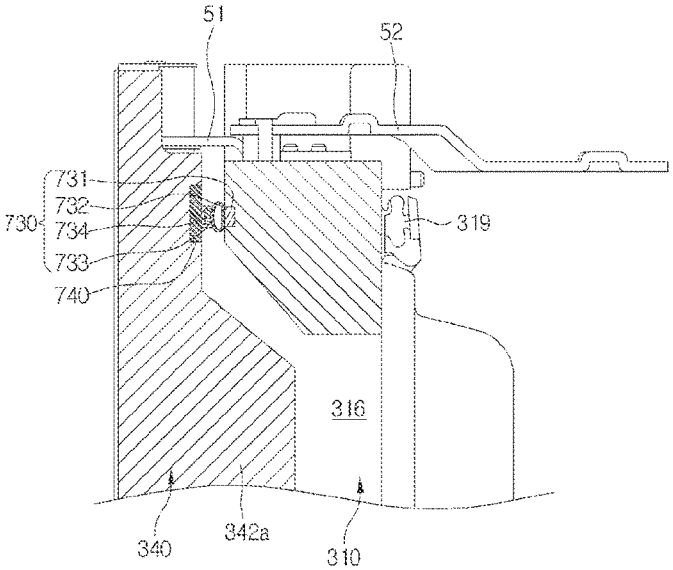
FIG. 78 is a cross-sectional view illustrating a refrigerator compartment door according to an embodiment.

FIG. 77 is a perspective view illustrating a refrigerator when a second door is opened according to an embodiment. FIG. 78 is a cross-sectional view illustrating a refrigerator compartment door according to an embodiment.

Referring to FIGS. 77 and 78, a gasket 730 is disposed around the opening 316 of the first door 310.

The gasket 730 is the same as the gasket illustrated in FIGS. 75 and 76, and includes a fixing part 731, a chamber part 732 that is integrally formed with the fixing part 731 and is hollow, and a magnetic part 733 that includes a permanent magnet 734 therein. Since the gasket 730 is the same as the gasket illustrated in FIGS. 75 and 76, a description thereof will be omitted. However, when the second door 340 is closed, the magnetic part 733 directly contacts the rear surface of the second door 340. The magnetic part 733 may be directly or indirectly adhered to an attachment member 740 provided to the second door 340.

The attachment member 740 may be disposed on the rear surface or the inside of the second door 340 corresponding to the edge of the protrusion part 342a. In detail, the attachment member 740 may contact the rear surface of the second door 340 within the second door 340. Thus, when the second door 340 is closed, the magnetic part 733 of the gasket 730 is closely adhered to the attachment member 740 on the rear surface of the second door 340.

The attachment member 740 may have a plate shape with a predetermined width, or have a tetragonal frame shape. Alternatively, the attachment member 740 has a bent frame shape to prevent the deformation of the second door 340 and reinforce the second door 340. To this end, the attachment member 740 may be disposed at the edge of the rear surface of the second door 340 and be spaced apart from the protrusion part 342a, and the gasket 710 may be disposed on the first door 310 to correspond to the attachment member 740.

A refrigerator according to the present disclosure may be described according to various other embodiments than the previous ones. Hereinafter, a refrigerator will now be described with reference to the accompanying drawings according to another embodiment.

In the current embodiment, a magnetic member is provided to the first door, and an attachment member is provided to the second door. Thus, in the current embodiment, the rest parts except for the magnetic member and the attachment member are the same as those of the previous embodiments, a description thereof will be omitted, and like reference numeral denote like elements.

Figure 79:
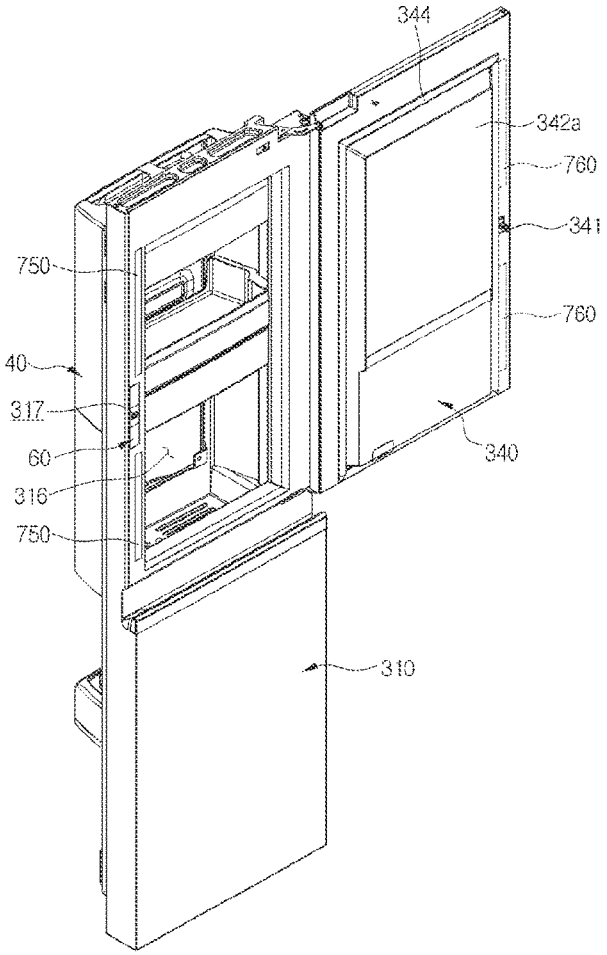
FIG. 79 is a perspective view illustrating a refrigerator compartment door when a second door is opened, according to an embodiment.

FIG. 79 is a perspective view illustrating a refrigerator compartment door when a second door is opened according to an embodiment.

Referring to FIG. 79, magnetic members 750 may be disposed inside the first door 310. The magnetic members 750 may include a permanent magnet, and are disposed outside the opening 316. The magnetic members 750 may be closely adhered to the front surface of the first door 310, and thus, can be closely adhered to attachment members 760 by magnetic force when the second door 340 is closed.

The magnetic members 750 may be disposed along the edge of the opening 316, or be disposed at a side of the opening 316. Alternatively, the magnetic members 750 may be disposed at the upper and lower sides of the locking device 60, respectively. For example, as illustrated in FIG. 79, the magnetic members 750 may be disposed in the first door 310 at the left side of the opening 316. The attachment members 760 may be disposed on the rear surface of the second door 340 to correspond to the magnetic members 750. Accordingly, magnetic force between the magnetic members 750 and the attachment members 760 more stably couples the latch hook 341 with the locking device 60. Alternatively, the position of the magnetic members 750 and the position of the attachment members 760 may be changed with each other. That is, the magnetic members 750 may be provided to the second door 340, and the attachment members 760 may be provided to the first door 310.

The attachment members 760 may be disposed outside the protrusion part 342a, and may be disposed at a corresponding position to the position of the magnetic members 750. That is, the gasket 344 may be disposed between the bottom of the protrusion part 342a and the attachment members 760. Thus, when the second door 340 is closed, magnetic force closely adheres the magnetic members 750 to the attachment members 760, so that the gasket 344 can be closely adhered to the first door 310.

The attachment members 760 may have a predetermined cross-section or a bent frame shape, and is disposed inside the second door 340 to prevent the deformation of the second door 340 and reinforce the second door 340.

Figure 80:
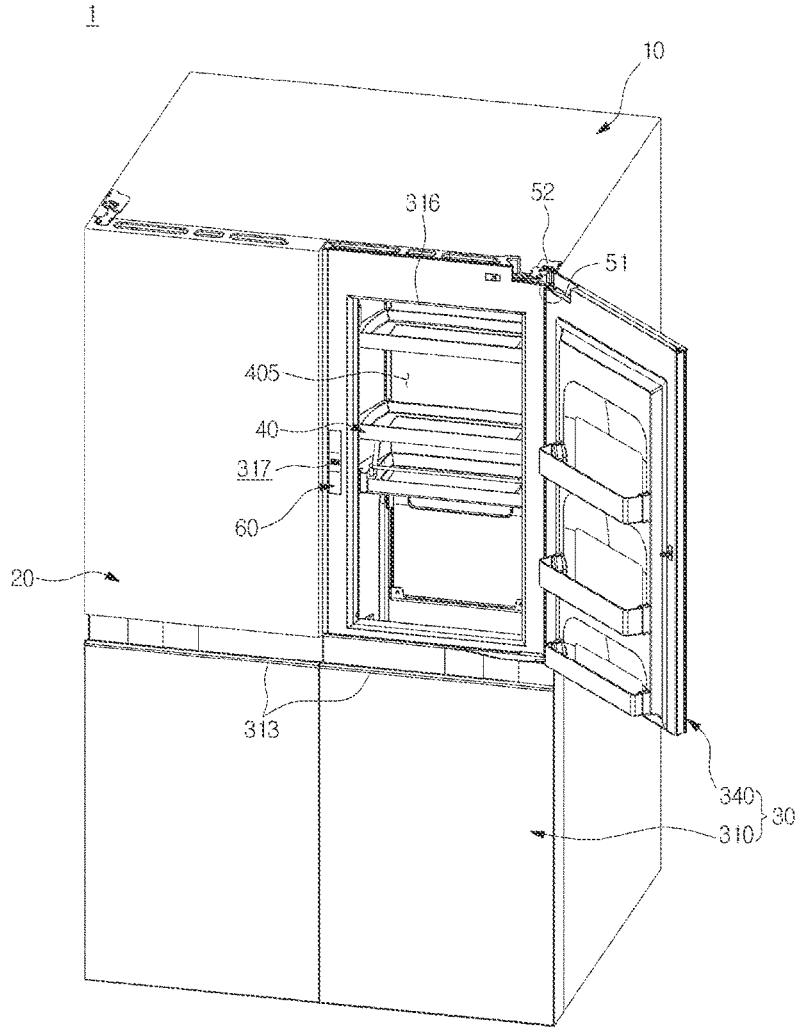
FIG. 80 is a perspective view illustrating a refrigerator when a second door is opened, according to an embodiment.
Figure 81:
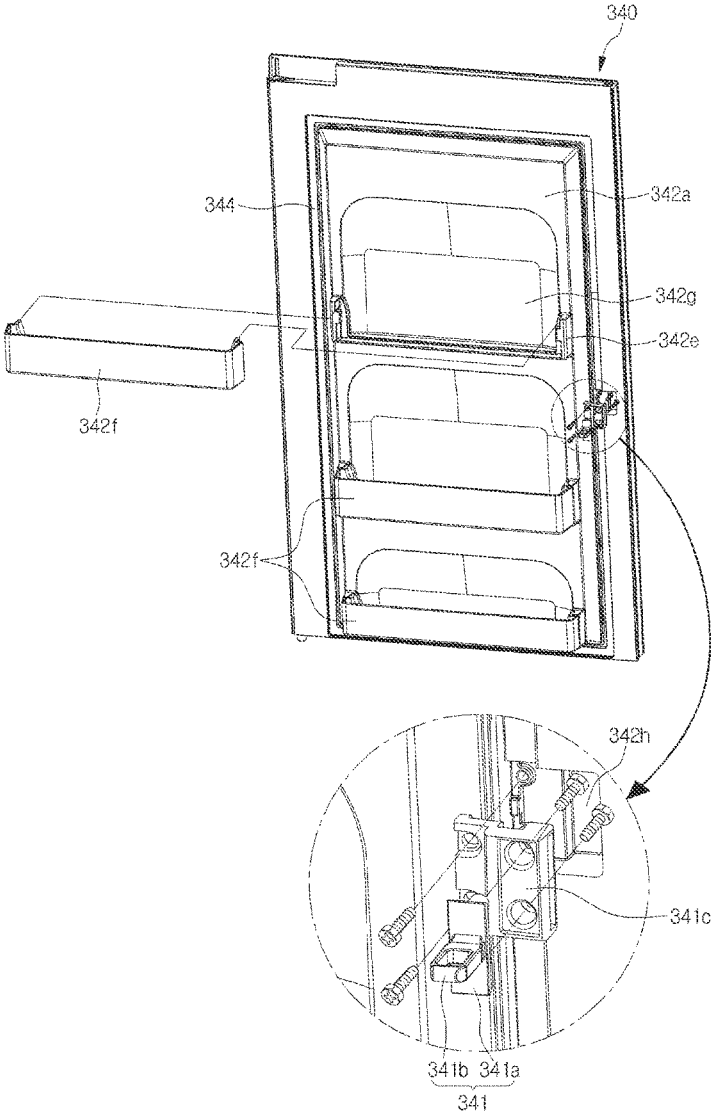
FIG. 81 is an exploded perspective view illustrating the second door.

FIG. 80 is a perspective view illustrating a refrigerator when a second door is opened, according to an embodiment. FIG. 81 is an exploded perspective view illustrating the second door.

Referring to FIGS. 80 to 81, as described according to the previous embodiments, the exterior of the refrigerator 1 may be formed by the cabinet 10 and the doors 20 and 30. The cabinet 10 forms a storage space, and the doors 20 and 30 open and close the storage space. The freezer compartment door 20 may be constituted by a single door, and the refrigerator compartment door 30 may be constituted by the first door 310 and the second door 340.

The front surface of the refrigerator compartment door 30 and the front surface of the freezer compartment door 20 are provided with the grip part 313 to be held for opening and closing the refrigerator compartment door 30 and the freezer compartment door 20. The grip part 313 has a pocket shape, and extends horizontally. The grip part 313 is disposed at a constant height on the refrigerator compartment door 30 and the freezer compartment door 20, and extends in the same line from an outer end of the refrigerator compartment door 30 to an outer end of the freezer compartment door 20.

The grip part 313 may be disposed at a portion that can be easily held by a user, and be disposed in the middle of the vertical height of the freezer compartment door 20 and the refrigerator compartment door 30. A portion of the grip part 313 provided to the refrigerator compartment door 30 may be disposed in the boundary between the first door 310 and the second door 340 to be described later.

A door basket 342f may be removably attached to the rear surface of the second door 340. The door basket 342f may be installed on the protrusion part 342a, and a region provided with the door basket 342f may be provided with a recess 342g. Basket installation parts 342e to which the door basket 342f is removably attached may be disposed at the left and right sides of the protrusion part 342a. Thus, both sides of the door basket 342f and the basket installation parts 342e may have shapes to engage with each other.

When the second door 340 is closed, the door basket 342f may be inserted in the opening 316. When the second door 340 is closed, the door basket 342f does not interfere with structures in the storing device 40. For example, when the second door 340 is closed, the rear surface of the door basket 342f and the rear surface of the first door 310 corresponding to the region provided with the storing device 40 may be disposed in the same vertical surface. That is, the door basket 342f may have a back and forth width not to go into the storing device 40.

Then, when the second door 340 is closed, the rear surface of the door basket 342f is disposed outside the storing device 40 to prevent the interference with food stored in the storing device 40 or baskets. Alternatively, when the second door 340 is closed, the door basket 342f may be disposed between the baskets within the storing device 40.

As described above, the latch hook 341 may be disposed on the rear surface of the second door 340 corresponding to the locking device 60 such that the latch hook 341 is coupled with the locking device 60 according to the rotation of the second door 340.

In detail, the hook fixing part 341a is fixed to a base plate 341c that is a separate member. The base plate 341c is coupled to a hook installation recess 342h in the rear surface of the second door 340. Accordingly, the latch hook 341 is fixed to the rear surface of the second door 340.

The hook installation recess 342h is recessed in the door case 342 that forms the rear surface of the second door 340, so that the base plate 341c is coplanar with the door case 342. In detail, the base plate 341c may have a shape corresponding to the hook installation recess 342h. The front surface of the base plate 341c may have holes with shapes corresponding to fixing protrusions of the hook fixing part 341a. Screws passing through the holes are inserted from the rear side of the base plate 341c into the fixing protrusions, so that the latch hook 341 can be fixed to the base plate 341c.

Screws inserted from the front side of the base plate 341c fix the base plate 341c, coupled with the latch hook 341, to the hook installation recess 342h. That is, the latch hook 341 is coupled to the base plate 341c, and then, the base plate 341c is coupled to the hook installation recess 342h.

This coupling structure will now be described in more detail.

In detail, when a shock or load is applied to the latch hook 341, the latch hook 341 or a portion of the second door 340 provided with the latch hook 341 may be broken. In the current embodiment, instead of directly coupling the latch hook 341 to the door case 342, the latch hook 341 is indirectly fixed to the door case 342 through the base plate 341c. Thus, when the latch hook 341 is broken, the possibility that the door case 342 is also broken is decreased. Only the latch hook 341 may be replaced by removing the latch hook 341 from the base plate 341c, or both the latch hook 341 and the base plate 341c may be replaced. Then, it is unnecessary to replace the door case 342, and thus, the repairing costs can be reduced.

Hereinafter, a coupling structure of the first and second doors will now be described in detail with reference to the accompanying drawings.

Figure 82:
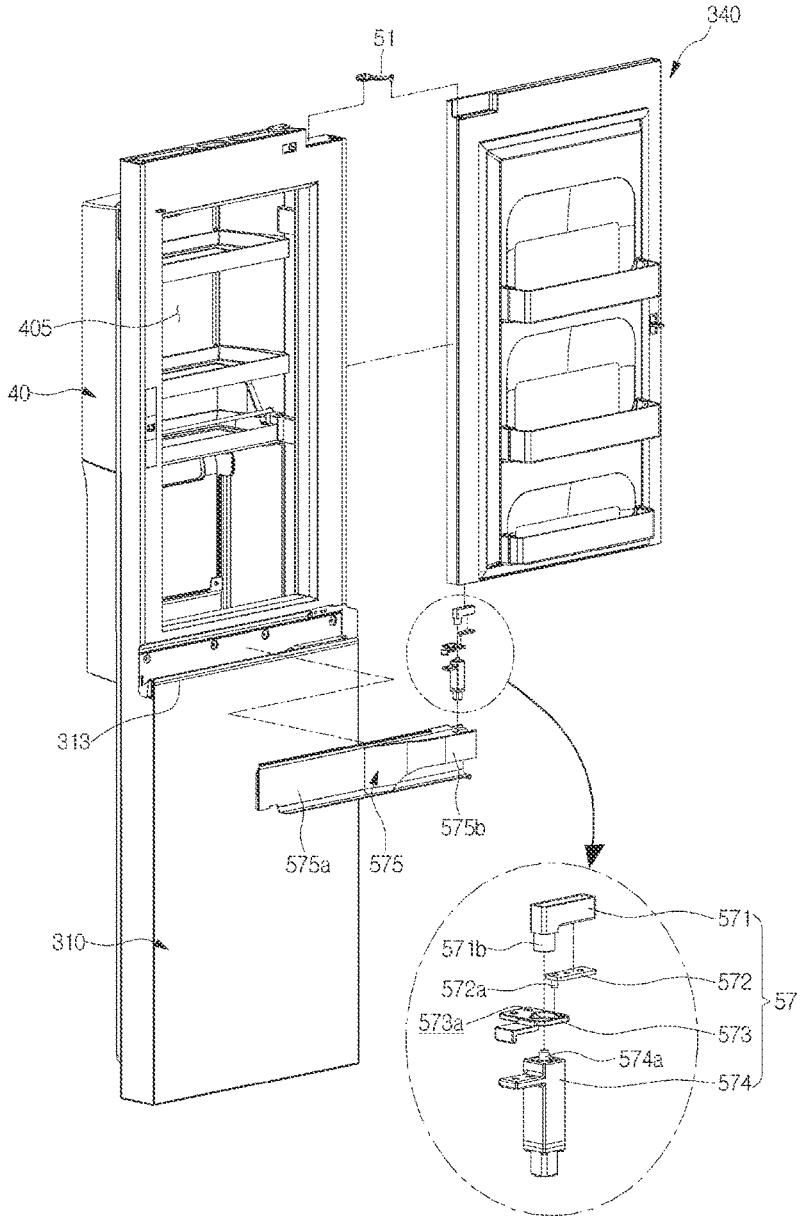
FIG. 82 is an exploded perspective view illustrating a refrigerator compartment door with the second door and a lower hinge.
Figure 83:
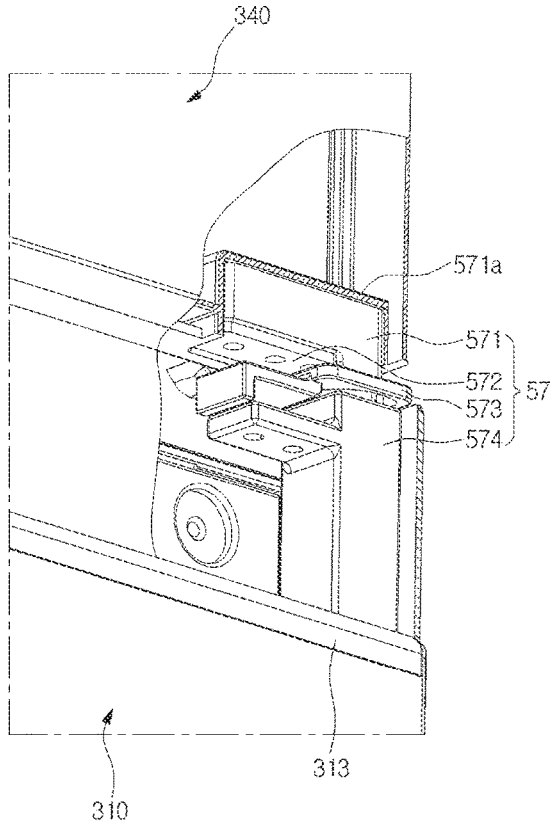
FIG. 83 is a partial cut-away perspective view illustrating the refrigerator compartment door coupled with the second door.

FIG. 82 is an exploded perspective view illustrating the refrigerator compartment door with the second door and the lower hinge. FIG. 83 is a partial cut-away perspective view illustrating the refrigerator compartment door coupled with the second door.

Referring to FIGS. 82 and 83, the upper end of the second door 340 is supported by the second hinge 51, and the lower end of the second door 340 is rotatably installed on the first door 310 through a lower hinge assembly 57. The lower hinge assembly 57 according to the current embodiment is different in configuration from the above-described lower hinge assembly 54.

The lower hinge assembly 57 may include a hinge member 571 fixed to the second door 340, a hinge stopper 572 coupled to the hinge member 571, a damping member 574 installed on the first door 310 and coupled with a rotation shaft 571b of the hinge member 571, and a confinement member 573 installed on the first door 310 to limit a rotation angle of the second door 340.

In detail, the hinge member 571 may be fixed to a hinge installation part 571a provided to the lower end of the second door 340. Then, the hinge member 571 is fixed to the second door 340, and thus, can be rotated with the second door 340. The rotation shaft 571b as the rotation center of the second door 340 passes through the confinement member 573 and is shaft-coupled to the damping member 574.

The hinge stopper 572 is coupled to the lower surface of the hinge member 571 through a coupling member. The hinge stopper 572 may be integrally formed with the hinge member 571. The hinge stopper 572 may include a confinement protrusion 572a that protrudes downward. The confinement protrusion 572a passes through a portion of the confinement member 573. The confinement protrusion 572a rotates together with the second door 340, and interferes with a portion of the confinement member 573 to limit the opening of the second door 340 at a predetermined angle.

The damping member 574 is fixed to the first door 310. The damping member 574 is shaft-coupled to the hinge member 571, and a structure may be disposed within the damping member 574 to decelerate the rotation of the hinge member 571. The damping member 574 may be configured such that the second door 340 automatically rotate until a predetermined angle and is decelerated over the predetermined angle. The above-described structure within the damping member 574 is similar to that of the lower hinge assembly 54 according to the previous embodiments, and a detailed description thereof will be omitted.

The damping member 574 is installed on a grip part decor 575 provided to the first door 310. The grip part decor 575 is installed on the front surface of the first door 310 provided to the grip part 313. That is, the grip part decor 575 is installed on a portion that defines the space between the lower end of the second door 340 and the upper end of the first part 311 of the first door 310. The grip part decor 575 may be additionally provided to the freezer compartment door 20.

The grip part decor 575 may include a thin recess part 575a that is disposed at the opposite side to the rotation shaft of the first door 310, and a thick support part 575b that is disposed at an adjacent side to the rotation shaft. Thus, the grip part 313 provided to the recess part 575a can be held by a user to open the first door 310. The damping member 574 and the confinement member 573 may be installed on the support part 575b.

The confinement member 573 is installed on the upper surface of the support part 575b. The confinement member 573 limits the rotation of the second door 340, and confines the damping member 574.

In detail, the confinement member 573 is fixed to the upper surface of the support part 575b through a screw, and shields the damping member 574 from the upper side when the confinement member 573 is installed on the first door 310. The confinement member 573 has a rotation shaft insertion hole 573a through which a rotation shaft 574a of the damping member 574 is exposed. In more detail, the rotation shaft 571b of the hinge member 571 passes through the rotation shaft insertion hole 573a, and the rotation shaft 574a of the damping member 574 passes through the rotation shaft insertion hole 573a and is inserted into the rotation shaft 571b.

Hereinafter, the opening and closing of the second door will now be described with reference to the accompanying drawings.

Figure 84:
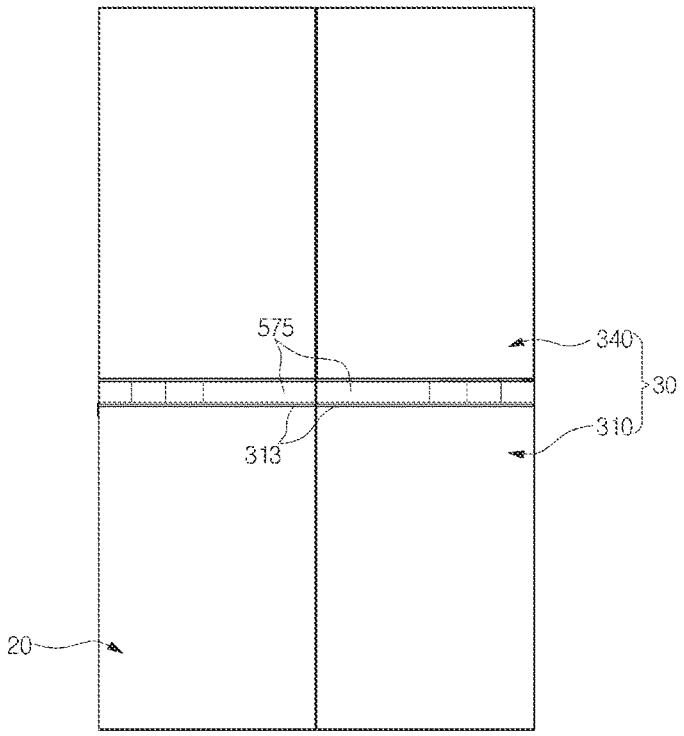
FIG. 84 is a front view illustrating the refrigerator when the second door is closed.
Figure 85:
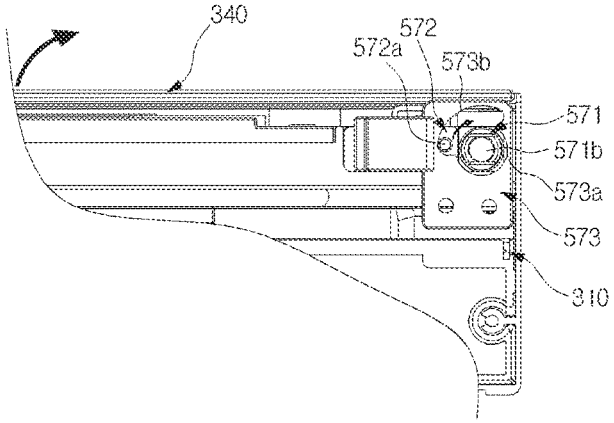
FIG. 85 is a bottom view illustrating a portion of the second door with the lower hinge assembly when the second door is closed.

FIG. 84 is a front view illustrating the refrigerator when the second door is closed. FIG. 85 is a bottom view illustrating a portion of the second door with the lower hinge assembly when the second door is closed.

Referring to FIGS. 84 and 85, the confinement member 573 may have the rotation shaft insertion hole 573a and a confinement protrusion receiving part 573b that receives the confinement protrusion 572a.

In detail, the confinement protrusion receiving part 573b extends along a moving path of the confinement protrusion 572a when the confinement protrusion 572a moves according to the rotation of the second door 340. Thus, when the second door 340 rotates, the confinement protrusion 572a moves within the confinement protrusion receiving part 573b. In detail, while the second door 340 rotates, the confinement protrusion 572a revolves around the rotation shaft 571b.

When the second door 340 is completely closed and opened at a predetermined angle, the confinement protrusion receiving part 573b limits the movement of the confinement protrusion 572a to confine the second door 340.

In detail, the confinement protrusion receiving part 573b has a predetermined curvature, and an end thereof contacts the confinement protrusion 572a when the second door 340 is closed as illustrated in FIG. 85.

Figure 86:
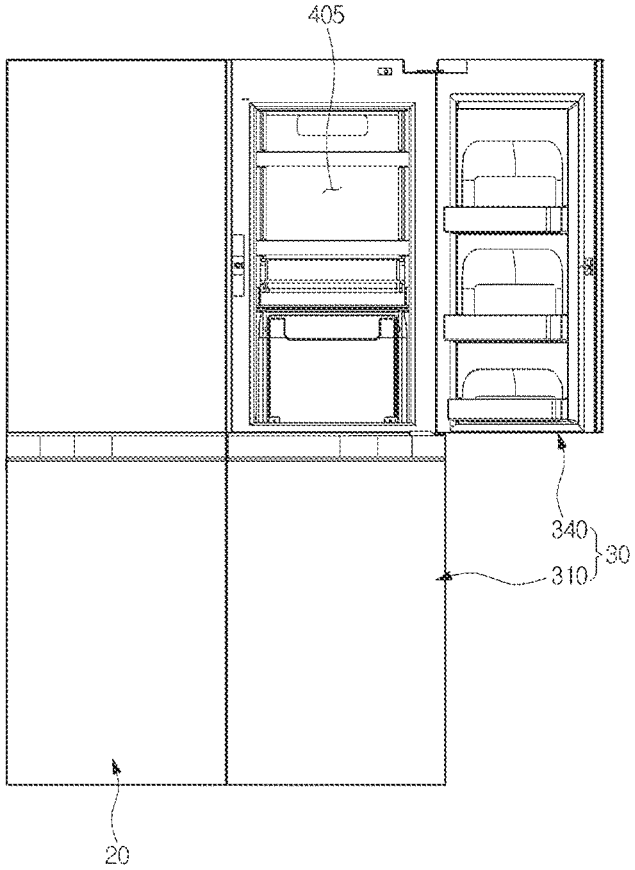
FIG. 86 is a front view illustrating the refrigerator when the second door is opened.
Figure 87:
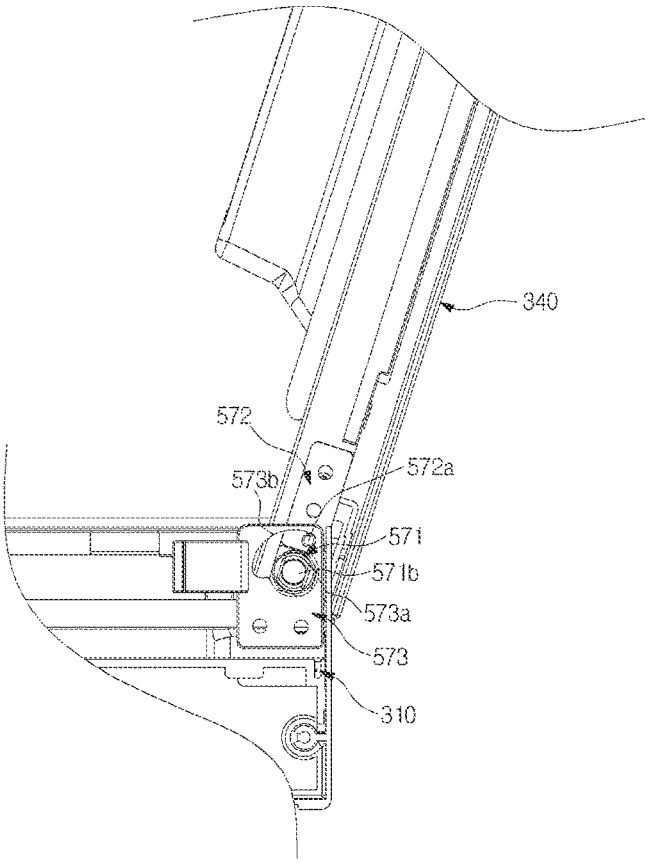
FIG. 87 is a bottom view illustrating a portion of the second door with the lower hinge assembly when the second door is opened.

FIG. 86 is a front view illustrating the refrigerator when the second door is opened. FIG. 87 is a bottom view illustrating a portion of the second door with the lower hinge assembly when the second door is opened.

Referring to FIGS. 86 and 87, the other end of the confinement protrusion receiving part 573b contacts the confinement protrusion 572a when the second door 340 is opened at a predetermined angle (about 100° to 130°). Thus, when the second door 340 is opened at the predetermined angle, the confinement protrusion 572a interferes with the confinement protrusion receiving part 573b to stop the confinement protrusion 572a and limit the rotation of the second door 340.

As such, the rotation angle of the second door 340 is limited by the lower hinge assembly 57 to prevent the leakage of cool air due to an excessive opening of the second door 340. In addition, a collision of the second door 340 with furniture adjacent to the refrigerator 1 can be prevented.

Furthermore, structures that limit the rotation of the second door 340 are not exposed to the outside, thereby preventing, for example, an accident that a user's finger is caught to the structures.

The terms "first", "second", "A", "B", "(a)", and "(b)" can be selectively or exchangeably used for the members. These terms are used only to differentiate one member, component, region, layer, or portion from another one, and the intrinsic qualities, orders or sequences of the members are not limited by these terms. It will be understood that when an element is referred to as being "coupled to", "combined with", or "connected to" another element, it can be directly coupled to, combined with, or connected to the other element or intervening elements may also be present.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A refrigerator comprising: a cabinet; a first storage compartment within the cabinet; a first door having an upper surface, a lower surface, a first side surface, and a second side surface, the first door rotatably configured to open and close at least a portion of the first storage compartment; a storing device that is coupled to the first door and that defines a second storage compartment, the second storage compartment being disposed in the first storage compartment when the first door is oriented in a closed position and the second storage compartment being configured to move with the first door when the first door rotates between opened and closed positions; a second door having an upper surface, a lower surface, a first side surface, and a second side surface, the second door [rotatably mounted to an upper portion of the first door, that is configured to open and close the second storage compartment in a same direction as a rotation direction of the first door, and that is] *being* configured to enable access to the second storage compartment when the first door is oriented in [a] *the* closed position and the second door is oriented in an open position; a first hinge connecting the upper surface of the first door to an upper surface of the cabinet; a second hinge connecting the upper surface of the second door to the upper surface of the first door; a locking unit configured to lock the second door to the first door; and a release member configured to receive a user input, wherein the locking unit is configured to release the second door from the first door based on the release member receiving the user input, and wherein the locking unit also is configured to release the second door from the first door based on a pressing force applied to a front surface of the second door at a location spaced apart from the release member or based on a touch of the user input; wherein the second door, on the upper portion of the first door, is positioned above a lower portion of the first door in a position at which the front surface of the second door is generally coplanar with a front surface of the lower portion of the first door when the second door is oriented in a closed position; and wherein when the second door is oriented in the closed position, the first side surfaces of the first door and the second door are substantially coplanar, the second side surfaces of the first door and the second door are substantially coplanar, and the upper surfaces of the first door and second door are substantially coplanar.

2. The refrigerator according to claim 1, wherein the locking unit comprises:

a latch hook provided to the second door;

a latch cam provided to the first door and configured to catch a portion of the latch hook; and a stopper provided to the first door and configured to limit rotation of the latch cam.

3. The refrigerator according to claim 2, wherein the release member comprises:

a first member provided to the second door; and a second member that is provided to the first door and that links with the first member.

4. The refrigerator according to claim 3, wherein the first member comprises:

an operation button configured to be pressed by a user; and a push rod positioned behind the operation button, the push rod being configured to move together with the operation button, and the second member comprises a latch rod that is pressed by the push rod.

5. The refrigerator according to claim 4, further comprising an elastic member that is wound around an outer circumferential surface of the push rod to return the push rod to an original position of the push rod when pressure on the operation button is released.

6. The refrigerator according to claim 4, further comprising an elastic member that is wound around an outer circumferential surface of the latch rod to return the latch rod to an original position of the latch rod when pressure on the operation button is released.

7. The refrigerator according to claim 3, wherein the first member operates the second member and, based on the first member operating the second member, the second member pushes the stopper in a direction in which the stopper is removed from the latch cam.

8. The refrigerator according to claim 3, wherein the first member comprises an input member that is positioned on the front surface of the second door and that is configured to receive input of an operation command of the release member, and the second member comprises an actuator that is operated according to an electrical signal based on input received by the input member.

9. The refrigerator according to claim 2, further comprising an elastic member that is provided to a rotation shaft of the latch cam and configured to rotate the latch cam to an original position of the latch cam.

10. The refrigerator according to claim 2, further comprising an elastic member having a first end connected to the stopper and a second end connected to the first door, the elastic member being configured to return the stopper to an original position of the stopper.

* * * * *